US008765872B2

(12) United States Patent
Kawabe et al.

(10) Patent No.: US 8,765,872 B2
(45) Date of Patent: Jul. 1, 2014

(54) 4-METHYL-1-PENTENE POLYMER, RESIN COMPOSITION CONTAINING 4-METHYL-1-PENTENE POLYMER, MASTERBATCH THEREOF, AND FORMED PRODUCT THEREOF

(75) Inventors: Kuniaki Kawabe, Ichihara (JP); Masayoshi Sutou, Ichihara (JP); Toshiyuki Itou, Ichihara (JP); Mai Kurihara, Ichihara (JP); Akinori Etoh, Ichihara (JP); Shinichirou Asao, Ichihara (JP); Kenji Sugimura, Iwakuni (JP); Hiroshi Hoya, Chiba (JP); Koji Matsunaga, Yokohama (JP); Yoji Hayakawa, Chiba (JP); Kunihiko Mizumoto, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 443 days.

(21) Appl. No.: 12/987,510

(22) Filed: Jan. 10, 2011

(65) Prior Publication Data
US 2011/0165416 A1    Jul. 7, 2011

Related U.S. Application Data

(63) Continuation-in-part of application No. PCT/JP2009/062579, filed on Jul. 10, 2009.

(30) Foreign Application Priority Data

Jul. 10, 2008 (JP) ................................. 2008-180244
Jul. 10, 2008 (JP) ................................. 2008-180245
Nov. 10, 2008 (JP) ................................. 2008-288069
Jan. 8, 2010 (JP) ................................. 2010-003014

(51) Int. Cl.
*C08L 23/20* (2006.01)
*C08L 77/00* (2006.01)
*C08L 63/00* (2006.01)
*C08F 110/14* (2006.01)
*C08F 4/42* (2006.01)
*C08F 210/14* (2006.01)

(52) U.S. Cl.
USPC ............. 525/55; 525/190; 525/191; 525/122; 525/240; 526/348.6; 526/183; 526/348.3

(58) Field of Classification Search
USPC ......... 525/55, 190, 191, 122, 240; 526/348.6, 526/183, 348.3
See application file for complete search history.

(56) References Cited

U.S. PATENT DOCUMENTS

| | | |
|---|---|---|
| 4,892,851 A | 1/1990 | Ewen et al. |
| 4,952,649 A | 8/1990 | Kioka et al. |
| 4,971,937 A | 11/1990 | Albizzati et al. |
| 5,436,305 A | 7/1995 | Alt et al. |
| 5,539,067 A | 7/1996 | Parodi et al. |
| 5,618,771 A | 4/1997 | Parodi et al. |
| 5,726,262 A | 3/1998 | Kioka et al. |
| 5,948,872 A | 9/1999 | Kioka et al. |
| 6,194,342 B1 | 2/2001 | Parodi et al. |
| 6,369,175 B1 | 4/2002 | Ewen |
| 6,515,085 B1 | 2/2003 | Parodi et al. |
| 6,777,508 B1 | 8/2004 | Parodi et al. |
| 6,939,928 B1 | 9/2005 | Kawai et al. |
| 7,160,949 B2 | 1/2007 | Ota et al. |
| 7,449,533 B2 | 11/2008 | Kawai et al. |
| 7,803,888 B2 | 9/2010 | Kawahara et al. |
| 2004/0158000 A1 | 8/2004 | Yada et al. |
| 2008/0085977 A1 | 4/2008 | Okamoto et al. |

FOREIGN PATENT DOCUMENTS

| | | |
|---|---|---|
| JP | 56-076416 | 6/1981 |
| JP | 56076416 A * | 6/1981 |
| JP | 57-063310 | 4/1982 |
| JP | 58-083006 A | 5/1983 |
| JP | 59-031717 | 2/1984 |
| JP | 61-113604 | 5/1986 |
| JP | 62-209153 | 9/1987 |
| JP | 01-149844 | 6/1989 |
| JP | 02-041303 | 2/1990 |
| JP | 03-000706 | 1/1991 |
| JP | 03-193796 | 8/1991 |
| JP | 04-120170 | 4/1992 |
| JP | 04-218508 | 8/1992 |
| JP | 06-093250 | 4/1994 |
| JP | 09-309982 | 12/1997 |
| JP | 10-226695 | 8/1998 |
| JP | 2001-348559 | 12/2001 |
| JP | 2001-354714 | 12/2001 |
| JP | 2003-105022 | 4/2003 |
| JP | 2003-147135 | 5/2003 |
| JP | 2004-238586 | 8/2004 |
| JP | 2005-200452 | 7/2005 |
| JP | 2005-200453 | 7/2005 |
| JP | 2005200452 A * | 7/2005 |
| JP | 2005200453 A * | 7/2005 |
| JP | 2005-307122 | 11/2005 |
| JP | 2005-325194 | 11/2005 |
| JP | 2005-350601 | 12/2005 |
| JP | 2007-186664 | 7/2007 |
| JP | 2008-144155 | 6/2008 |
| TW | 200422186 A | 11/2004 |
| WO | WO-01/27124 A1 | 4/2001 |
| WO | WO-01/53369 A1 | 7/2001 |
| WO | WO-2004/087775 A1 | 10/2004 |
| WO | WO-2005/121192 A1 | 12/2005 |

* cited by examiner

*Primary Examiner* — Kelechi Egwim
(74) *Attorney, Agent, or Firm* — Foley & Lardner LLP

(57) ABSTRACT

[Object] To provide a resin composition with excellent mold releasability and blocking resistance.
[Solution] A resin composition containing a 4-methyl-1-pentene polymer includes 0.01 to 10 parts by mass of a 4-methyl-1-pentene polymer (B) per 100 parts by mass of at least one resin (A) selected from the group consisting of thermoplastic resins and thermosetting resins, wherein the 4-methyl-1-pentene polymer (B) has (B1) an intrinsic viscosity [η] of 0.01 or more but less than 0.50 dl/g measured at 135° C. in a decalin solvent.

13 Claims, No Drawings

4-METHYL-1-PENTENE POLYMER, RESIN COMPOSITION CONTAINING 4-METHYL-1-PENTENE POLYMER, MASTERBATCH THEREOF, AND FORMED PRODUCT THEREOF

TECHNICAL FIELD

The present invention relates to a 4-methyl-1-pentene polymer and a resin composition containing the 4-methyl-1-pentene polymer. More particularly, the present invention relates to a resin composition containing a 4-methyl-1-pentene polymer and a masterbatch for use in the production of the 4-methyl-1-pentene polymer composition. The present invention also relates to a use of a film and the like produced with the 4-methyl-1-pentene polymer.

The present invention also relates to a resin composition that contains a 4-methyl-1-pentene polymer and a propylene resin composition mainly composed of a propylene polymer, and a formed product of the resin composition. More particularly, the present invention relates to a formed product that is less sticky under various environments from room temperature to high temperatures while maintaining high flexibility and transparency.

The present invention also relates to an olefin polymer and, more particularly, to a new 4-methyl-1-pentene (co)polymer that has a low molecular weight, a narrow molecular weight distribution, and a low proportion of a low-molecular region in the molecular weight distribution.

BACKGROUND ART

Additive agents are often added to thermoplastic and thermosetting resins to achieve the physical properties required for formed products. For example, in formed products such as films, a saturated or unsaturated higher fatty acid amide, a saturated or unsaturated alkylenebisamide, or a fatty acid monoglyceride is added to provide surface lubricity, and an inorganic fine powder, for example, silica, zeolite, talc, calcium carbonate, or diatomaceous earth is added as an anti-blocking agent (hereinafter referred to as an AB agent) to prevent blocking. The inorganic fine powder is combined with the additive agent for providing surface lubricity.

In order to provide surface lubricity, however, a large amount of fatty acid amide must be added. In this case, in extrusion molding of a pelletized resin, a fatty acid amide in a resin has a lower melting point than the resin and therefore melts faster than the resin in an extruder cylinder heated to a high temperature, causing a phenomenon (called discharge pulsation or surging) in which resin pellets still in a solid state slip in the extruder and are not properly conveyed. A fatty acid amide having a lower molecular weight than a resin also causes problems of oily smoke and malodor at high temperatures. Furthermore, there is another problem of bleedout of the additive agent in a formed product.

An increase in the amount of AB agent, such as silica, added to a resin results in excessive bleeding of the AB agent over time or in high-temperature environments, causing deterioration in transparency. The amount of AB agent is therefore within the bounds of not causing deterioration in the transparency of a formed product. Thus, sufficient anti-blocking effects have not been achieved.

Thus, there is a demand for a resin composition that can solve these problems and has a high anti-blocking effect and excellent mold releasability of a formed product.

To obtain a pellet and a masterbatch by adding an additive to thermoplastic resins or thermosetting resins involves melt-kneading. The melt-kneading needs to be carried out with viscosities of both the resins and the additive being controlled so as to fall within a certain range and the melt-kneading temperature maintained at not more than temperature causing resin decomposition so as to inhibit the resin decomposition.

However, it may be difficult to carry out the melt-kneading the resins at temperature of not more than the temperature causing resin decomposition. In particular, some rubber resins having high adhesion, which are thermoplastic elastomers, may need to be kneaded at increased pressure, kneaded for plural times or kneaded at high temperature. The melt-kneading under such conditions may lead to thermoplastic elastomers having deteriorated properties such as decreased molecular weight caused by the resin decomposition. Thus, the addition of an additive to the thermoplastic elastomers has made the equipment and technique necessary for the melt-kneading special, compared with common thermoplastic resins. In addition, the difficulty in the processing of thermoplastic elastomers having particularly high adhesion, i.e., high adhesion and stickiness of the thermoplastic elastomers to a metal roll and a mold, makes kneading time longer and pollutes the mold, and thus leads to problems associated with decreased efficiency of production. Therefore, it has been desired to improve the processing in adding an additive to thermoplastic elastomers.

In recent years, propylene elastomers mainly composed of propylene have been known as soft polyolefin materials that are highly flexible, heat resistant, and transparent, as well as highly environmentally suitable and hygienic (Patent Documents 4 and 5). Unlike conventional olefin elastomers, such propylene elastomers have high transparency, heat resistance (high softening temperature), and scratch resistance and are therefore intended to broaden their product range to a wide variety of uses, such as electric/electronic device components, industrial materials, furniture, stationery, commodities and miscellaneous articles, containers and packages, toys, recreational equipment, and medical supplies. However, the stickiness of a material sometimes causes problems, thus limiting applications of the material.

Known methods for reducing the stickiness of materials involve the addition of slip agents (lubricants). For example, Patent Document 6 specifically discloses a technique of adding a higher fatty acid amide or a higher fatty acid ester to a propylene elastomer.

However, such a slip agent (lubricant) sometimes migrates to the surface of a product, causing a problem of whitening. Another problem is that a higher fatty acid amide or a higher fatty acid ester can be eluted into an alcohol and therefore cannot be used in products that are to be in contact with the alcohol.

In order to avoid such problems, a known technique involves the addition of a wax containing a low-molecular-weight polyolefin. While such a wax is known to be a polypropylene wax or a polyethylene wax, the effects of the wax greatly depend on the compatibility between the wax and a propylene elastomer. For example, because a polyethylene wax lacks compatibility with a propylene elastomer, a product containing these components may have very low transparency. On the other hand, because a polypropylene wax has excellent compatibility with a propylene elastomer, the wax component is not effectively localized in the vicinity of the surface and is likely to produce insufficient stickiness-reducing effects. Thus, there is a demand for a wax having moderate compatibility with a propylene elastomer.

Olefin polymers containing 4-methyl-1-pentene (hereinafter also referred to as 4-methyl-1-pentene polymers) have been used as resins having high transparency, gas permeability, chemical resistance, and releasability, as well as high heat resistance, in various fields, such as medical devices, heat-resistant wires, heat-proof dishes, and releasing materials. In particular, low-molecular-weight 4-methyl-1-pentene polymers have excellent mold releasability.

In general, 4-methyl-1-pentene polymers are produced in the presence of a catalyst composed of a transition metal compound and an organic aluminum compound, that is, a Ziegler catalyst (Patent Document 7). However, a polymer produced in the presence of a Ziegler catalyst has a nonuniform composition of a molecular weight of the polymer and a high proportion of a low-molecular region in a molecular weight distribution, possibly causing a problem of stickiness.

In the meanwhile, a 4-methyl-1-pentene polymer produced in the presence of a metallocene catalyst has been reported (Patent Document 8). The 4-methyl-1-pentene polymer has a uniform molecular weight and composition and also has a high molecular weight for the purpose of improving the balance of various physical properties, for example, thermal properties, such as heat resistance, and dynamic properties.

A low-molecular-weight 4-methyl-1-pentene polymer can be produced by the thermal decomposition of a high-molecular-weight 4-methyl-1-pentene polymer (Patent Document 9). However, such a low-molecular-weight 4-methyl-1-pentene polymer has a wide molecular weight distribution and contains a component having low stereoregularity, thus causing problems of blocking and stickiness.

Thus, there is a demand for a 4-methyl-1-pentene polymer having a low molecular weight and a uniform composition of a molecular weight of the polymer.

CITATION LIST

Patent Literature

PTL 1: Japanese Unexamined Patent Application Publication No. 2005-307122
PTL 2: Japanese Examined Patent Application Publication No. 8-26191
PTL 3: Japanese Unexamined Patent Application Publication No. 6-93250
PTL 4: Japanese Unexamined Patent Application Publication No. 09-309982
PTL 5: International Publication No. WO 2004/087775
PTL 6: Japanese Unexamined Patent Application Publication No. 2005-325194
PTL 7: Japanese Examined Patent Application Publication No. 5-88250
PTL 8: International Publication No. WO 2005/121192
PTL 9: Japanese Examined Patent Application Publication No. 3-76325

SUMMARY OF INVENTION

Technical Problem

It is an object of the present invention to provide a resin composition with excellent mold releasability and blocking resistance.

It is another object of the present invention to provide a formed product that is less sticky under various environments from room temperature to high temperatures without significantly impairing the flexibility and transparency of a propylene elastomer.

It is still another object of the present invention to provide a thermoplastic elastomer composition which has excellent shaping processability and releasability and is obtainable by simplified melt-kneading with good production efficiency.

It is still another object of the present invention to provide a thermoplastic elastomer composition which has excellent mold releasability, adhesion controllability, good compatibility, inhibited discoloration and high transparency while retaining advantages of the thermoplastic elastomer.

It is still another object of the present invention to produce a 4-methyl-1-pentene polymer having particular physical properties to provide a new 4-methyl-1-pentene polymer that has a low molecular weight, a narrow molecular weight distribution, and a low proportion of a low-molecular region in a molecular weight distribution.

Solution to Problem

The present invention includes [1] to [25] described below, for example.

[1] A resin composition containing a 4-methyl-1-pentene polymer, comprising 0.01 to 10 parts by mass of a 4-methyl-1-pentene polymer (B-1) per 100 parts by mass of at least one resin (A) selected from the group consisting of thermoplastic resins and thermosetting resins,
wherein the 4-methyl-1-pentene polymer (B-1) has
(B1) an intrinsic viscosity [η] of 0.01 or more but less than 0.50 dl/g measured at 135° C. in a decalin solvent.

[2] A resin composition containing a 4-methyl-1-pentene polymer, comprising 0.01 to 100 parts by mass of a 4-methyl-1-pentene polymer (B-2) per 100 parts by mass of at least one resin (A) selected from the group consisting of thermoplastic resins and thermosetting resins,
wherein the 4-methyl-1-pentene polymer (B-2) has
(B11) an intrinsic viscosity [η] of 0.01 or more but less than 3.0 dl/g measured at 135° C. in a decalin solvent, and
(B6) satisfies the relationship expressed by the following formula (I):

$$A \leq 0.2 \times [\eta]^{(-1.5)} \quad (I)$$

wherein A denotes the percentage (% by mass) of a component having a polystyrene equivalent molecular weight of 1,000 or less in the 4-methyl-1-pentene polymer as measured by gel permeation chromatography (GPC), and [η] denotes the intrinsic viscosity (dl/g) of the 4-methyl-1-pentene polymer measured in a decalin solvent at 135° C.

[3] The resin composition containing a 4-methyl-1-pentene polymer according to [1] or [2],
wherein the 4-methyl-1-pentene polymer (B-1) or (B-2) is
(B2) a 4-methyl-1-pentene polymer having 50% to 100% by weight of a constitutional unit derived from 4-methyl-1-pentene and 0% to 50% by weight in total of constitutional units derived from at least one olefin selected from olefins having 2 to 20 carbon atoms other than 4-methyl-1-pentene, and has
(B3) a ratio (Mw/Mn) of weight-average molecular weight (Mw) to number-average molecular weight (Mn) in the range of 1.0 to 5.0 as measured by gel permeation chromatography (GPC),
(B4) a melting point (Tm) in the range of 120° C. to 245° C. as measured with a differential scanning calorimeter, and
(B5) a critical surface tension in the range of 22 to 28 mN/m.

[4] The resin composition containing a 4-methyl-1-pentene polymer according to [1], wherein the 4-methyl-1-pentene polymer (B-1)
(B6) satisfies the relationship expressed by the following formula (I):

$$A \leq 0.2 \times [\eta]^{(-1.5)} \quad (I)$$

wherein A denotes the percentage (% by mass) of a component having a polystyrene equivalent molecular weight of 1,000 or less in the 4-methyl-1-pentene polymer as measured by gel permeation chromatography (GPC), and [η] denotes the intrinsic viscosity (dl/g) of the 4-methyl-1-pentene polymer measured in a decalin solvent at 135° C.

[5] The resin composition containing a 4-methyl-1-pentene polymer according to any one of [1] to [4],
wherein the 4-methyl-1-pentene polymer (B-1) or (B-2) has
(B7) 0.001 to 0.5 terminal double bonds per 1000 carbon atoms in the 4-methyl-1-pentene polymer as determined by $^1$H-NMR.

[6] The resin composition containing a 4-methyl-1-pentene polymer according to any one of [1] to [5], wherein the 4-methyl-1-pentene polymer (B-1) or (B-2) is a 4-methyl-1-pentene polymer polymerized in the presence of a metallocene catalyst.

[7] The resin composition containing a 4-methyl-1-pentene polymer according to any one of [1] to [6], wherein the resin (A) is selected from the group consisting of polyolefin resins, polycarbonate resins, thermoplastic polyester resins, and polyamide resins.

[8] The resin composition containing a 4-methyl-1-pentene polymer according to any one of [1] to [6], wherein the resin (A) is an epoxy resin.

[9] The resin composition containing a 4-methyl-1-pentene polymer according to any one of [1] to [6], wherein the resin (A) is a resin having a melting point (Tm) of 200° C. or more.

[10] The resin composition containing a 4-methyl-1-pentene polymer according to [7],
wherein the resin (A) is
a propylene resin composition (X) containing 60 to 100 parts by weight of a propylene polymer (A-1) and 0 to 40 parts by weight of a propylene polymer (A-2) (the total of the (A-1) component and the (A-2) component is 100 parts by weight),
the propylene polymer (A-1) has
(A-1-1) a Shore A hardness in the range of 20 to 94,
(A-1-2) a constitutional unit derived from propylene in the range of 51% to 100% by mole, and
(A-1-3) a melting point less than 100° C. or no melting point as measured by DSC, and
the propylene polymer (A-2) has
(A-2-1) a melting point of 100° C. or more but less than 175° C. as measured by DSC.

[11] The resin composition containing a 4-methyl-1-pentene polymer according to [10],
wherein the propylene polymer (A-1) is
(A-1-4) a copolymer of propylene and ethylene, a copolymer of propylene and an α-olefin having 4 to 20 carbon atoms, or a copolymer of propylene, ethylene, and an α-olefin having 4 to 20 carbon atoms, each containing 51% to 90% by mole of a constitutional unit derived from propylene, 0% to 49% by mole of a constitutional unit derived from ethylene, and 0% to 49% by mole of a constitutional unit derived from an α-olefin having 4 to 20 carbon atoms (the total of the constitutional unit derived from propylene, the constitutional unit derived from ethylene, and the constitutional unit derived from the α-olefin having 4 to 20 carbon atoms is 100% by mole), and has
(A-1-5) an isotactic triad fraction (mm) in the range of 85% to 99.9% as determined by $^{13}$C-NMR, and
the propylene polymer (A-2) has
(A-2-2) an isotactic pentad fraction (mmmm) in the range of 90% to 99.8% as determined by $^{13}$C-NMR.

[12] The resin composition containing a 4-methyl-1-pentene polymer according to [10] or [11],
wherein the propylene polymer (A-1) has
(A-1-6) a ratio (Mw/Mn) of weight-average molecular weight (Mw) to number-average molecular weight (Mn) in the range of 3.5 to 1.2 as measured by gel permeation chromatography (GPC),
(A-1-7) a B value defined by the following equation in the range of 0.8 to 1.3, and

[Equation 1]

$$B = \frac{M_{OE}}{2M_O \cdot M_E} \quad (II)$$

(wherein $M_{OE}$ denotes the mole fraction of the total of a chain of propylene and ethylene and a chain of an α-olefin having 4 or more carbon atoms and ethylene based on all the dyads, $M_O$ denotes the total of the mole fractions of propylene and an α-olefin having 4 or more carbon atoms based on the whole composition of a propylene resin composition (X), and $M_E$ denotes the mole fraction of ethylene based on the whole composition of the propylene resin composition (X))
(A-1-8) a glass transition temperature (Tg) in the range of −10° C. to −50° C. as measured by DSC.

[13] The resin composition containing a 4-methyl-1-pentene polymer according to any one of [10] to [12],
wherein the propylene resin composition (X) has
(X1) a Shore A hardness in the range of 20 to 94, and
(X2) a pressed sheet of the propylene resin composition (X) having a thickness of 2 mm has an internal haze in the range of 0.1% to 15% and a total light transmittance in the range of 80% to 99.9%.

[14] The resin composition containing a 4-methyl-1-pentene polymer according to [1], comprising 0.1 to 7 parts by mass of the 4-methyl-1-pentene polymer (B) per 100 parts by mass of the resin (A).

[15] The resin composition containing a 4-methyl-1-pentene polymer according to [2], comprising 0.01 to 50 parts by mass of the 4-methyl-1-pentene polymer (B) per 100 parts by mass of the resin (A).

[16] A masterbatch for use in the production of a 4-methyl-1-pentene polymer composition, comprising 1 to 900 parts by mass of a 4-methyl-1-pentene polymer (B-1) per 100 parts by mass of at least one resin (A) selected from the group consisting of thermoplastic resins and thermosetting resins,
wherein the 4-methyl-1-pentene polymer (B-1) has
(B1) an intrinsic viscosity [η] of 0.01 or more but less than 0.50 dl/g measured at 135° C. in a decalin solvent.

[17] A masterbatch for use in the production of a 4-methyl-1-pentene polymer composition, comprising 1 to 900 parts by mass of a 4-methyl-1-pentene polymer (B-2) per 100 parts by mass of at least one resin (A) selected from the group consisting of thermoplastic resins and thermosetting resins,
wherein the 4-methyl-1-pentene polymer (B-2) has
(B11) an intrinsic viscosity [η] of 0.01 or more but less than 3.0 dl/g measured at 135° C. in a decalin solvent.

[18] A formed product, comprising a resin composition containing a 4-methyl-1-pentene polymer according to any one of [1] to [15].

[19] The formed product according to [18], wherein the resin composition containing a 4-methyl-1-pentene polymer experienced a shear and/or uniaxial, biaxial, or planar elongational flow in a molten state.

[20] A film comprising a formed product according to [19].

[21] A multilayer film, comprising a film according to [20] and an adhesive layer.

[22] A 4-methyl-1-pentene polymer, comprising (B2) 50% to 100% by weight of a constitutional unit derived from 4-methyl-1-pentene and 0% to 50% by weight in total of constitutional units derived from at least one olefin selected from olefins having 2 to 20 carbon atoms other than 4-methyl-1-pentene, wherein the 4-methyl-1-pentene polymer has (B1) an intrinsic viscosity [η] of 0.01 or more but less than 0.50 dl/g measured at 135° C. in a decalin solvent, and (B3) a ratio (Mw/Mn) of weight-average molecular weight (Mw) to number-average molecular weight (Mn) in the range of 1.0 to 5.0 as measured by gel permeation chromatography (GPC), and (B6) satisfies the relationship expressed by the following formula (I):

$$A \leq 0.2 \times [\eta]^{(-1.5)} \quad (I)$$

wherein A denotes the percentage (% by mass) of a component having a polystyrene equivalent molecular weight of 1,000 or less in the 4-methyl-1-pentene polymer as measured by gel permeation chromatography (GPC), and [η] denotes the intrinsic viscosity (dl/g) of the 4-methyl-1-pentene polymer measured in a decalin solvent at 135° C.

[23] The 4-methyl-1-pentene polymer according to [22] wherein the 4-methyl-1-pentene polymer has (B7) 0.001 to 0.5 terminal double bonds per 1000 carbon atoms in the 4-methyl-1-pentene polymer as determined by $^1$H-NMR.

[24] The 4-methyl-1-pentene polymer according to [22] or [23], wherein polymerization is performed in the presence of a metallocene catalyst.

[25] The 4-methyl-1-pentene polymer according to any one of [22] to [24], wherein the 4-methyl-1-pentene polymer comprises 60% to 100% by weight of a constitutional unit derived from 4-methyl-1-pentene and 0% to 40% by weight in total of constitutional units derived from at least one olefin selected from olefins having 2 to 20 carbon atoms other than 4-methyl-1-pentene.

[26] The resin composition according to [1] to [6], wherein the thermoplastic resins are thermoplastic elastomer (A)'.

Advantageous Effects of Invention

A resin composition containing a 4-methyl-1-pentene polymer according to the present invention has excellent mold releasability and blocking resistance. For example, a resin composition containing a 4-methyl-1-pentene polymer according to the present invention exhibits excellent mold releasability in the formation of films and bottles.

A 4-methyl-1-pentene polymer is more compatible with a base material than fatty acid amides are and has a higher molecular weight than fatty acid amides. A 4-methyl-1-pentene polymer therefore rarely causes bleeding over time. A 4-methyl-1-pentene polymer has a high melting point and melts slowly in a forming machine. Resin pellets therefore do not slip and rarely cause surging in a forming machine. Like general polyolefin skeletons, a 4-methyl-1-pentene polymer contains no heteroatom. Unlike conventional fatty acid amides, therefore, there is no particular problem of malodor or smoke. A 4-methyl-1-pentene polymer skeleton is transparent and is thought to rarely cause deterioration in the transparency of a formed product.

In the case of a propylene resin composition containing a 4-methyl-1-pentene polymer, a formed product can be less sticky under various environments from room temperature to high temperatures while maintaining high flexibility and transparency.

A formed product of a propylene resin composition containing a 4-methyl-1-pentene polymer, in which the 4-methyl-1-pentene polymer is mixed with the propylene resin composition, not only has the advantages of a polypropylene elastomer, such as high transparency, scratch resistance, whitening resistance, and heat resistance, but also is not sticky at high temperatures. Thus, the formed product can be used under a wide variety of temperature conditions.

In the case of a thermoplastic elastomer composition containing a 4-methyl-1-pentene polymer, the thermoplastic elastomer composition can have excellent shaping processability and releasability and be obtained by simplified melt-kneading. The thermoplastic elastomer composition, while retaining the advantages of the resin, has excellent mold releasability and adhesion controllability, inhibited decomposition of the thermoplastic elastomer, good compatibility, inhibited discoloration and high transparency. Moreover, reduced torque in kneading and decreased stickiness to kneading equipment can shorten energy and time necessary for kneading, and therefore it is possible to reduce $CO_2$ and improve production efficiency. Furthermore, the stickiness can be controlled by adjusting the amount and type of the 4-methyl-1-pentene copolymer contained in the thermoplastic elastomer composition.

A 4-methyl-1-pentene polymer according to the present invention has excellent mold releasability as a resin modifier. A 4-methyl-1-pentene polymer itself has high blocking resistance.

DESCRIPTION OF EMBODIMENTS

A first aspect of the present invention is a resin composition containing a 4-methyl-1-pentene polymer, comprising 0.01 to 10 parts by mass of a 4-methyl-1-pentene polymer (B-1) per 100 parts by mass of at least one resin (A) selected from the group consisting of thermoplastic resins and thermosetting resins, wherein the 4-methyl-1-pentene polymer (B-1) has (B1) an intrinsic viscosity [η] of 0.01 or more but less than 0.50 dl/g measured at 135° C. in a decalin solvent.

A second aspect of the present invention is a resin composition containing a 4-methyl-1-pentene polymer, comprising 0.01 to 100 parts by mass of a 4-methyl-1-pentene polymer (B-2) per 100 parts by mass of at least one resin (A) selected from the group consisting of thermoplastic resins and thermosetting resins, wherein the 4-methyl-1-pentene polymer (B-2) has (B11) an intrinsic viscosity [η] of 0.01 or more but less than 3.0 dl/g measured at 135° C. in a decalin solvent, and (B6) satisfies the relationship expressed by the following formula (I):

$$A \leq 0.2 \times [\eta]^{(-1.5)} \quad (I)$$

wherein A denotes the percentage (% by mass) of a component having a polystyrene equivalent molecular weight of 1,000 or less in the 4-methyl-1-pentene polymer as measured by gel permeation chromatography (GPC), and [η] denotes the intrinsic viscosity (dl/g) of the 4-methyl-1-pentene polymer measured in a decalin solvent at 135° C.

A third aspect of the present invention is a 4-methyl-1-pentene polymer comprising 50% to 100% by weight of a constitutional unit derived from 4-methyl-1-pentene and 0% to 50% by weight in total of constitutional units derived from at least one olefin selected from olefins having 2 to 20 carbon atoms other than 4-methyl-1-pentene, wherein the 4-methyl-1-pentene polymer has (B1) an intrinsic viscosity [η] of 0.01 or more but less than 0.50 dl/g measured at 135° C. in a decalin solvent, and (B3) a ratio (Mw/Mn) of weight-average molecular weight (Mw) to number-average molecular weight (Mn) in the range of 1.0 to 5.0 as measured by gel permeation chromatography (GPC), and (B6) satisfies the relationship expressed by the following formula (I):

$$A \leq 0.2 \times [\eta]^{(-1.5)} \quad (I)$$

wherein A denotes the percentage (% by mass) of a component having a polystyrene equivalent molecular weight of 1,000 or less in the 4-methyl-1-pentene polymer as measured by gel permeation chromatography (GPC), and [η] denotes the intrinsic viscosity (dl/g) of the 4-methyl-1-pentene polymer measured in a decalin solvent at 135° C.

1. First Aspect of the Present Invention

A first aspect of the present invention will be described below.

(A) Resins

Thermoplastic Resins and Thermosetting Resins

Examples of the thermoplastic resins and thermosetting resins used as the resin (A) in the present invention include, but are not limited to, the following resins.

A thermoplastic resin for use in the present invention includes a later-described thermoplastic elastomer (A)'. A thermoplastic resin other than the thermoplastic elastomer (A)', although the following resins include those partially containing the resin which is included also in the thermoplastic elastomer (A)', is selected from the group consisting of polyolefin resins (other than 4-methyl-1-pentene polymers (the same shall apply hereinafter)), polycarbonate resins, thermoplastic polyester resins, ABS resins, polyacetal resins, polyamide resins, poly(phenylene oxide) resins, and polyimide resins. A thermosetting resin for use in the present invention is selected from the group consisting of epoxy resins, thermosetting unsaturated polyester resins, and phenolic resins. A composition according to the present invention contains at least one resin selected from the group consisting of the thermoplastic resins and the thermosetting resins. In other words, a composition according to the present invention can contain one of the thermoplastic resins and the thermosetting resins or can contain a combination thereof.

These resins may be any known resins and are appropriately selected in accordance with the use and the composition, the molecular weight, and the like of a 4-methyl-1-pentene polymer described below.

The definitions and the production methods of the thermoplastic resins and the thermosetting resins are well known and are described in publications, such as "Jituyo Purasuchikku Jiten" (edited by Jituyo Purasuchikku Jiten Hensyu Iinkai, Industrial Research Center of Japan, Inc.) and "Purasuchikku Seikei Zairyo Syotorihiki Binran" (issued by The Chemical Daily Co., Ltd., fiscal 2008).

Preferably, the thermoplastic or thermosetting resin is a resin having a small density difference from a 4-methyl-1-pentene polymer. A small density difference between the thermoplastic or thermosetting resin and a 4-methyl-1-pentene polymer results in excellent dispersion of the 4-methyl-1-pentene polymer in the thermoplastic or thermosetting resin, leading to a resin composition having excellent transparency and mold releasability.

More specifically, the density difference between the resin (A) and a 4-methyl-1-pentene polymer preferably ranges from 0 to 1500 kg/m$^3$, more preferably 1 to 600 kg/m$^3$, still more preferably 5 to 400 kg/m$^3$, still more preferably 10 to 150 kg/m$^3$, particularly preferably 10 to 100 kg/m$^3$. Examples of a preferred specific combination include a combination of a polypropylene resin and a 4-methyl-1-pentene polymer.

Among these, the thermoplastic or thermosetting resin is preferably a polyolefin resin, a polycarbonate resin, a thermoplastic polyester resin, or a polyamide resin, particularly preferably a polyolefin resin. These resins are exemplified below.

The resins (1) to (8) exemplified below are thermoplastic resins. The thermoplastic resins of the invention also include the thermoplastic elastomer (A)', which collectively refers to a thermoplastic resin having elasticity.

(1) Polyolefin Resins

Polyolefin resins (other than 4-methyl-1-pentene polymers (the same shall apply hereinafter)) for use in the present invention are not particularly limited and may be conventionally known polyolefin resins. Specific examples include polyethylene resins, such as low-density polyethylenes and high-density polyethylenes, polypropylene resins, poly(ethylene terephthalate) resins, poly(vinyl chloride) resins (chlorinated polyolefins), ethylene vinyl acetate copolymers, ethylene methacrylic acid acrylate copolymers and cyclic olefin polymers. Among these, low-density polyethylenes, high-density polyethylenes, and polypropylene resins are preferably used. As described above, polypropylene resins having a small density difference from a 4-methyl-1-pentene polymer are more preferably used. Examples of the polypropylene resins include propylene resin compositions described below.

(1-1) Propylene Resin Compositions

Among the (1) olefin resins described above, a preferred olefin resin is a propylene resin composition (X) that contains 60 to 100 parts by weight of a propylene polymer (A-1) and 0 to 40 parts by weight of a propylene polymer (A-2) having a melting point of 100° C. or more but less than 175° C. as measured by DSC (the total of the (A-1) component and the (A-2) component is 100 parts by weight).

Propylene Polymer (A-1)

The propylene polymer (A-1) in the present invention preferably complies with the following (A-1-1) to (A-1-3).

(A-1-1) The Shore A hardness ranges from 20 to 94, preferably 25 to 90, more preferably 25 to 85.

(A-1-2) A constitutional unit derived from propylene ranges from 51% to 100% by mole, preferably 51% to 90% by mole, more preferably 60% to 80% by mole.

(A-1-3) The melting point measured by DSC is less than 100° C. or is not observed. Preferably, the melting point measured by DSC is less than 90° C. or is not observed. More preferably, the melting point measured by DSC is less than 80° C. or is not observed.

Satisfying these physical properties can provide a propylene resin composition (X) having excellent flexibility, heat resistance, transparency, and low-temperature characteristics (a low glass transition temperature).

The propylene polymer (A-1) that satisfies the physical properties described above may have any molecular structure (three-dimensional structure) and, more specifically, may have an isotactic structure, a syndiotactic structure, or an atactic structure. In particular, the isotactic structure is preferred in terms of excellent formability (a high solidification rate), mechanical strength, or heat resistance.

In general, a propylene polymer (A-1) that complies with the requirements (A-1-1) to (A-1-3) described above can be produced by (1) selecting a catalyst to reduce the molecular structure regularity (stereoregularity) of the propylene polymer (A-1) or (2) copolymerizing propylene with a comonomer other than propylene. A propylene polymer (A-1) having an isotactic structure should be produced by the method (2).

The propylene polymer (A-1) in the present invention is preferably a copolymer of propylene and ethylene, a copolymer of propylene and α-olefin, or a copolymer of propylene, ethylene, and α-olefin. More specifically, the propylene polymer (A-1) preferably complies with the following requirements (A-1-4) and (A-1-5).

(A-1-4) A copolymer of propylene and ethylene, a copolymer of propylene and an α-olefin having 4 to 20 carbon atoms, or a copolymer of propylene, ethylene, and an α-olefin having 4 to 20 carbon atoms, each containing 51% to 90% by mole of a constitutional unit derived from propylene, 0% to 49% by mole of a constitutional unit derived from ethylene, and 0% to 49% by mole of a constitutional unit derived from an α-olefin having 4 to 20 carbon atoms (the total of the constitutional unit derived from propylene, the constitutional unit derived from ethylene, and the constitutional unit derived from the α-olefin having 4 to 20 carbon atoms is 100% by mole).

Preferably, a copolymer of propylene, ethylene, and an α-olefin having 4 to 20 carbon atoms that contains preferably 51% to 90% by mole, more preferably 60% to 89% by mole, still more preferably 62% to 88% by mole, of a constitutional unit derived from propylene, preferably 7% to 24% by mole, more preferably 8% to 20% by mole, still more preferably 8% to 18% by mole, of a constitutional unit derived from ethylene, and preferably 3% to 25% by mole, more preferably 3% to 20% by mole, still more preferably 4% to 20% by mole, of a constitutional unit derived from an α-olefin having 4 to 20 carbon atoms (the total of the constitutional unit derived from propylene, the constitutional unit derived from ethylene, and the constitutional unit derived from an α-olefin having 4 to 20 carbon atoms is 100% by mole).

(A-1-5) An isotactic triad fraction (mm) in the range of 85% to 99.9%, preferably 87% to 99.8%, as determined by $^{13}$C-NMR.

The propylene polymer (A-1) in the present invention particularly preferably complies with the following (A-1-6) to (A-1-8).

(A-1-6) The ratio (Mw/Mn) of weight-average molecular weight (Mw) to number-average molecular weight (Mn) ranges from 3.5 to 1.2, preferably 3.0 to 1.4, more preferably 2.6 to 1.6, as measured by gel permeation chromatography (GPC).

A propylene polymer (A-1) having a molecular weight distribution within the range described above is preferred in terms of low stickiness due to a small amount of low molecular weight components.

(A-1-7) A B value defined by the following equation ranges from 0.8 to 1.3, preferably 0.9 to 1.2, more preferably 0.9 to 1.1.

[Equation 2]

$$B = \frac{M_{OE}}{2M_O \cdot M_E} \quad (II)$$

wherein $M_{OE}$ denotes the mole fraction of the total of a chain of propylene and ethylene and a chain of an α-olefin having 4 or more carbon atoms and ethylene based on all the dyads, $M_O$ denotes the total of the mole fractions of propylene and an α-olefin having 4 or more carbon atoms based on the whole composition of a propylene resin composition (X), and $M_E$ denotes the mole fraction of ethylene based on the whole composition of the propylene resin composition (X).

A propylene polymer (A-1) having a B value within the range described above is preferred in terms of excellent compatibility with a propylene polymer (A-2) described below. A B value above the range described above is indicative of a molecular primary structure similar to an alternating copolymer in which the monomers (propylene, ethylene, and α-olefin having 4 to 20 carbon atoms) are alternately bonded to one another. Such a propylene polymer (A-1) has poor compatibility with the propylene polymer (A-2). A B value below the range described above is indicative of a molecular primary structure similar to a block copolymer in which each of the monomers is closely spaced. In this case, the propylene polymer (A-1) also has poor compatibility with the propylene polymer (A-2).

(A-1-8) The glass transition temperature (Tg) ranges from −10° C. to −50° C., preferably −15° C. to −40° C., as measured by DSC.

This means that a propylene polymer (A-1) having a glass transition temperature (Tg) within the range described above has high stereoregularity (a little inversion), a narrow composition distribution, and a uniform molecular structure. This also improves the low-temperature characteristics of the propylene resin composition (X) in the present invention and is therefore very preferable.

The propylene polymer (A-1) in the present invention preferably further complies with the following (A-1-9).

(A-1-9) The melt flow rate (MFR) (ASTM D1238, 230° C. under a load of 2.16 kg) preferably ranges from 0.01 to 200 g/10 minutes, more preferably 0.05 to 100 g/10 minutes, still more preferably 0.1 to 50 g/10 minutes.

A MFR within this range results in an improvement in the strength and impact resistance of the propylene resin composition (X) in the present invention or an improvement in formability in the processing of the propylene resin composition (X).

The propylene polymer (A-1) in the present invention can be produced by any method. The propylene polymer (A-1) can be produced by the polymerization of propylene or the copolymerization of propylene, ethylene, and/or another α-olefin in the presence of a known catalyst with which an olefin can be stereospecifically polymerized in an isotactic or syndiotactic structure, for example, a catalyst mainly composed of a solid titanium component and an organometallic compound or a metallocene catalyst that contains a metallocene compound as one component of the catalyst. A propylene polymer (A-1) according to a particularly preferred embodiment that complies with the requirements (A-1-4) to (A-1-8) can be produced by the copolymerization of propylene, ethylene, and α-olefin having 4 to 20 carbon atoms in the presence of a metallocene catalyst. Examples of the metallocene catalyst include catalysts described in International Publication WO 2004-087775, for example, catalysts described in Examples e1 to e5.

A propylene polymer (A-1) within the ranges described above has a particular comonomer composition and high stereoregularity and therefore exhibits excellent low-temperature characteristics (a low glass transition temperature) and high breaking strength. The propylene polymer (A-1) also has improved compatibility with the propylene polymer (A-2). Thus, the propylene resin composition (X) containing the propylene polymer (A-1) has improved transparency.

Propylene Polymer (A-2):

Examples of the propylene polymer (A-2) in the present invention include a propylene homopolymer or copolymers of propylene and at least one α-olefin having 2 to 20 carbon atoms, including ethylene but excluding propylene. Examples of α-olefins having 2 to 20 carbon atoms other than propylene include ethylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene. Preferred α-olefins are ethylene and α-olefins having 4 to 10 carbon atoms.

Specific embodiments of the propylene polymer (A-2) include the following polymers. A homopolypropylene having high heat resistance (in general, a known homopolypropylene containing less than 3% by mole of a copolymerization component of α-olefin having 2 to 20 carbon atoms, including ethylene but excluding propylene), a block polypropylene having an excellent balance between heat resistance and flexibility (in general, a known block polypropylene containing 3% to 35% by weight of a n-decane-eluted rubber component), or a flexible transparent random polypropylene (in general, a known random polypropylene containing 3% by mole or more but less than 20% by mole, preferably 3% by mole or more but less than 10% by mole, of a copolymerization component of α-olefin having 2 to 20 carbon atoms, including ethylene but excluding propylene) can be selected for each purpose. If necessary, a plurality of propylene polymers (A-2) can be used in combination. For example, at least two components having different melting points or rigidity (for example, a random polypropylene and a homopolypropylene) may be used.

The propylene polymer (A-2) in the present invention preferably complies with the following (A-2-1).

(A-2-1) The propylene polymer (A-2) in the present invention preferably has a melting point of 100° C. or more but less than 175° C., more preferably in the range of 115° C. to 170° C., still more preferably 130° C. to 170° C., as measured by DSC.

The propylene polymer (A-2) in the present invention preferably complies with the following (A-2-2).

(A-2-2) The propylene polymer (A-2) in the present invention may have an isotactic structure or a syndiotactic structure and particularly preferably has an isotactic structure having an isotactic pentad fraction (mmmm) in the range of 90% to 99.8%, preferably 93% to 99.7%, more preferably 95% to 99.6%.

Use of such a propylene polymer (A-2) is preferred because the propylene polymer (A-2) is highly compatible with the propylene-ethylene copolymer, the propylene-α-olefin copolymer, or the propylene-ethylene-α-olefin copolymer that complies with the requirements (A-1-1) to (A-1-5) or (A-1-1) to (A-1-8) described above as a preferred embodiment of the propylene polymer (A-1) and therefore the propylene resin composition (X) has excellent physical properties.

The propylene polymer (A-2) in the present invention more preferably complies with the following (A-2-3).

(A-2-3) The melt flow rate (MFR) (ASTM D1238, 230° C. under a load of 2.16 kg) of the propylene polymer (A-2) in the present invention is not particularly limited and preferably ranges from 0.01 to 1000 g/10 minutes, more preferably 0.05 to 400 g/10 minutes, still more preferably 0.1 to 100 g/10 minutes.

The propylene polymer (A-2) in the present invention can be produced by any method, including known methods, for example, by the polymerization of propylene or the copolymerization of propylene and another α-olefin using a Ziegler catalyst or a metallocene catalyst. The Ziegler catalyst contains a solid catalyst component containing magnesium, titanium, halogen, and an electron donor as essential components, an organic aluminum compound, and an electron donor. The metallocene catalyst contains a metallocene compound as one component of the catalyst.

Propylene Resin Composition (X):

The propylene resin composition (X) for use in the present invention contains the propylene polymer (A-1) alone or a mixture of the propylene polymer (A-1) and the propylene polymer (A-2).

The propylene polymer (A-2) in the propylene resin composition (X) can improve physical properties, such as mechanical properties and heat resistance, of the propylene resin composition (X). When the propylene resin composition (X) according to the present invention is applied to uses that require heat resistance, the inclusion of the propylene polymer (A-2) is very effective and preferred.

The propylene resin composition (X) preferably contains 60 to 100 parts by weight, more preferably 70 to 97 parts by weight, still more preferably 75 to 95 parts by weight, of the propylene polymer (A-1) and preferably 0 to 40 parts by weight, more preferably 3 to 30 parts by weight, still more preferably 5 to 25 parts by weight, of the propylene polymer (A-2) (the total of the (A-1) component and the (A-2) component is 100 parts by weight).

The propylene resin composition (X) for use in the present invention can be produced by any method, for example, by producing the propylene polymer (A-1) and the propylene polymer (A-2) simultaneously or successively to produce the composition, by mixing the propylene polymer (A-1) and the propylene polymer (A-2) each independently produced, or by first producing one of the propylene polymer (A-1) and the propylene polymer (A-2) and then adding the first product in the subsequent process of producing the other of the propylene polymer (A-1) and the propylene polymer (A-2).

The propylene resin composition (X) in the present invention may contain another polymer as an optional component without compromising the objects of the present invention. The amount of the optional polymer is preferably, but not limited to, in the range of approximately 0.1 to 30 parts by weight per 100 parts by weight of the propylene resin composition (X) in the present invention.

Preferably, the optional polymer is an ethylene polymer or copolymer mainly composed of ethylene (51% by mole or more). The ethylene polymer or copolymer improves the flexibility and the low-temperature characteristics of the propylene resin composition (X).

According to one embodiment of the present invention, the propylene resin composition (X) consists of the propylene polymer (A-1) and the propylene polymer (A-2) as the polymer components without another elastomer or resin. Such a propylene resin composition (X) has high transparency.

If necessary, the propylene resin composition (X) in the present invention may contain an additive agent, such as a weathering stabilizer, a heat stabilizer, an antistatic agent, an anti-slip agent, an anti-blocking agent, an anti-fogging agent, a nucleating agent, a lubricant, a pigment, a dye, a plasticizer, an age resister, a hydrochloric acid absorbent, an antioxidant, and/or a copper inhibitor, without compromising the objects of the present invention.

The propylene resin composition (X) in the present invention may be graft-modified with a polar monomer. More specifically, this means that at least one or both of the propylene polymer (A-1) and the propylene polymer (A-2) of the propylene resin composition (X) are graft-modified with a polar monomer.

The propylene resin composition (X) in the present invention preferably has the following physical properties (X1) and (X2).

(X1) The Shore A hardness ranges from 20 to 94, preferably 25 to 90, more preferably 25 to 85.

(X2) A pressed sheet having a thickness of 2 mm has an internal haze in the range of 0.1% to 15% and a total light transmittance in the range of 80% to 99.9%, preferably an internal haze in the range of 0.1% to 10% and a total light transmittance in the range of 85% to 99.9%.

When the physical properties of the propylene resin composition (X) in the present invention comply with (X1) and (X2), the resulting formed product suitably has high flexibility and transparency.

The propylene resin composition (X) for use in the present invention more preferably has the following physical property (X3).

(X3) The melt flow rate (MFR) (ASTM D1238, 230° C. under a load of 2.16 kg) is, but not limited to, in the range of 0.01 to 1000 g/10 minutes, preferably 0.05 to 400 g/10 minutes, more preferably 0.1 to 100 g/10 minutes.

(2) Polycarbonate Resins

Polycarbonate resins for use in the present invention are not particularly limited and may be conventionally known polycarbonate resins.

Typically, polycarbonate resins are produced by a reaction between an aromatic diol (for example, bisphenol A) and phosgene. Preferably, the polycarbonate resin in the present invention is diethylene glycol diallyl carbonate.

Such polycarbonate resins are commercially available and include NOVAREX (trade name, Mitsubishi Chemical Co.), Panlite (trade name, Teijin Chemicals Ltd.), and Lexan (trade name, GE Plastics Japan Ltd.), which are preferably used in the present invention.

(3) Thermoplastic Polyester Resins

Thermoplastic polyester resins for use in the present invention are not particularly limited and may be conventionally known thermoplastic polyester resins.

Typically, thermoplastic polyester resins are produced by the polycondensation of a dicarboxylic acid and a diol. In the present invention, poly(ethylene terephthalate), poly(butylene terephthalate), polyethylene-2,6-naphthalene dicarboxylate, and poly(cyclohexane terephthalate) are preferably used.

Such thermoplastic polyester resins are commercially available and include Rynite (trade name, DuPont Japan Ltd.), which can preferably be used in the present invention.

(4) ABS Resins

ABS resins for use in the present invention are not particularly limited and may be conventionally known ABS resins.

Typically, ABS resins are impact-resistant resins produced by graft polymerization between polybutadiene and acrylonitrile and styrene. In the present invention, preferably, the polybutadiene component ranges from 5% to 40% by weight, and the weight ratio (styrene/acrylonitrile) of the styrene component to the acrylonitrile component ranges from 70/30 to 80/20.

Such ABS resins are commercially available and include Stylac (trade name, Asahi Kasei Co.) and Cyclolac (trade name, Ube Cyclon, Ltd.), which can preferably be used in the present invention.

(5) Polyacetal Resins

Polyacetal resins for use in the present invention are not particularly limited and may be conventionally known polyacetal resins.

Typically, polyacetal resins are produced by the ring-opening polymerization of formalin or trioxane and, if desired, ethylene oxide in the presence of a cationic catalyst and have a polyoxymethylene chain as a main skeleton. Preferably, the polyacetal resin in the present invention is a copolymer-type polyacetal resin.

Such polyacetal resins are commercially available and include Iupital (trade name, Mitsubishi Engineering-Plastics Co.), which can preferably be used in the present invention.

(6) Polyamide Resins

Polyamide resins for use in the present invention are not particularly limited and may be conventionally known polyamide resins.

Typically, polyamide resins can be produced by the polycondensation of a diamine and a dicarboxylic acid or the ring-opening polymerization of caprolactam. Preferably, the polyamide resin in the present invention is a polycondensation product between an aliphatic diamine and an aliphatic or aromatic dicarboxylic acid.

Such polyamide resins are commercially available and include Leona (trade name, Asahi Kasei Co.), Zytel (trade name, DuPont Japan Ltd.), and Amilan CM1041LO (trade name, Toray Industries, Inc.), which can preferably be used in the present invention.

(7) Poly(phenylene oxide) Resins

Poly(phenylene oxide) resins for use in the present invention are not particularly limited and may be conventionally known poly(phenylene oxide) resins.

Typically, poly(phenylene oxide) resins are produced by the oxidative coupling of 2,6-dimethylphenol in the presence of a copper catalyst. Modified poly(phenylene oxide) resins produced, for example, by blending a poly(phenylene oxide) resin with another resin may also be used in the present invention.

Preferably, the poly(phenylene oxide) resin in the present invention is a blend-modified product of a styrene polymer.

Such poly(phenylene oxide) resins are commercially available and include Xyron (trade name, Asahi Kasei Co.) and Iupiace (trade name, Mitsubishi Engineering-Plastics Co.), which can preferably be used in the present invention.

(8) Polyimide Resins

Polyimide resins for use in the present invention are not particularly limited and may be conventionally known polyimide resins.

Typically, polyimide resins are produced by the polycondensation of a tetracarboxylic acid and a diamine, which produces an imide bond in the main skeleton. In the present invention, polyimide resins are preferably produced from a pyromellitic dianhydride and a diaminodiphenyl ether.

Such polyimide resins are commercially available and include Vespel (trade name, DuPont Japan Ltd.), which can preferably be used in the present invention. Thermoplastic elastomer (A)'

Theromoplastic elastomer (A)' for use in the present invention is not particularly limited and known thermoplastic elastomers can be used. Examples thereof include olefin-based rubbers, styrene butadiene rubbers, butadiene rubbers, urethane rubbers, acrylic rubbers, nitrile rubbers, fluororubbers, silicone rubbers, chloroprene rubbers, polysulfide rubbers, epichlorohydrin rubbers and natural rubbers. To be specific, the olefin-based rubbers are preferably contained. Examples of the olefin rubbers include butyl-based rubbers and ethylene propylene rubbers. The definition and production method thereof are known and are described in publications such as "Jituyo Purasuchikku Jiten" (edited by Jituyo Purasuchikku Jiten Hensyu Iinkai, Industrial Research Center of Japan, Inc.) and "Properties and processing of rubbers" (Kobunshi Kogaku Koza (Polymer Engineering Course), edited by Society of Polymer Science, Japan, published by Chijin Shokan Co., Ltd.). The composition of the invention using these thermoplastic elastomers can be used, for example for automobile and aircraft materials such as tires, hoses and tubes and insulating materials such as wire coating.

The thermoplastic elastomers (A)' can be used singly or in combination of two or more kinds.

Butyl-based rubbers and polyisobutylenes, which are preferable examples of the thermoplastic elastomers (A)' in the invention, are described in detail hereinafter.

The butyl-based rubbers, which are the thermoplastic elastomers (A)', are not particularly limited and known butyl rubbers can be used, with polyisobutylenes and butyl rubbers being preferable examples. The polyisobutylenes are viscous polymers obtainable by polymerizing isobutylenes, a butane-butene fraction obtained when butadiene is removed from a C-4 fraction commonly obtainable in industrial naphtha cracking, or a mixture thereof. The butyl rubbers are obtainable by copolymerizing isobutylenes and isoprenes. The polymerization is preferably carried out in the presence of acid catalysts such as aluminum chloride, boron trifluoride, silica/alumina and cation exchange resins, in particular, a Friedel-Crafts catalyst.

The viscosity average molecular weight of the polybutylenes is preferably between $5 \times 10^3$ and $4 \times 10^6$, preferably between $4 \times 10^4$ and $4 \times 10^6$. Polyisobutylenes having a viscosity average molecular weight smaller than the above range may cause blocking or bleeding when the resin composition of the invention is shaped. Polyisobutylenes having a viscosity average molecular weight larger than the above range is so hard that the handling thereof is difficult.

As long as the viscosity average molecular weight is within the above range, the polyisobutylenes can be used in combination of two or more kinds. The viscosity average molecular weight can be obtained for example by the following known method (BASF TECHNICAL INFORMATION TI/EVO 1417e, January, 2009 edition).

Preferable examples of the polyisobutylenes and butyl rubbers include isobutylene homopolymers and isobutylene/isoprene copolymers. Such polyisobutylenes and butyl rubbers are commercially available: for example, products with trade names of Oppanol (BASF Japan Ltd.), Himol (Nippon Oil Corporation), JSR Butyl (JSR Corporation) and Exxon Butyl (ExxonMobile Chemical). These examples are particularly preferable in the invention.

The 4-methyl-1-pentene polymer (B) is an oligomer having a polyolefin skeleton and has a bulky skeleton with a side chain including a branched structure, and therefore is easily compatible with olefin-based rubbers or olefin-based resins, compared with other additives such as fatty acid amides. The 4-methyl-1-pentene polymer (B) has adequate compatibility especially with polybutene-based rubbers, which have a similar skeleton. Thus, as thermoplastic elastomer (A)' of the thermoplastic resins, for example, such sticky resins as butyl rubbers exemplified above are easily compatible with the 4-methyl-1-penten polymer (B).

Adequately high compatibility between the two components enables uniform kneading even when an excessive amount of the 4-methyl-1-pentene polymer (B) is added to the thermoplastic elastomer (A)', and minimizes the chance of inhibiting the characteristics inherent in the thermoplastic elastomer (A)', whereby excellent shaping processability and releasability can be developed. Furthermore, the bleedout apparent over time is unlikely to occur and thus is unlikely to lead to the problems such as the occurrence of malodor and smoke.

Moreover, the 4-methyl-1-pentene polymer (B) is transparent, and therefore does not inhibit the transparency of the thermoplastic elastomer (A)'.

The 4-methyl-1-pentene polymer (B) has a higher melting point than that of polyolefin-based waxes, and therefore the 4-methyl-1-pentene polymer (B) itself is unlikely to be decomposed even when kneading temperature is high. The 4-methyl-1-pentene polymer (B) also can inhibit the decomposition of the thermoplastic elastomer (A)'. That is, the decomposition of the thermoplastic elastomer (A)' can be inhibited even when the resin composition of the invention is kneaded under such conditions as high temperature and high pressure. Although the mechanism of inhibiting the decomposition of the thermoplastic elastomer (A)' in kneading is not limited, it is presumed that kneading is carried out with the thermoplastic elastomer (A)' being adequately coated with the 4-methyl-1-pentene polymer and the surface-coating 4-methyl-1-pentene polymer inhibits the occurrence of shear energy, leading to the inhibition of the decomposition of the thermoplastic elastomer (A)'.

The following resins (9) to (11) are thermosetting resins, and the resins before heat curing will be described below.

(9) Epoxy Resins

Epoxy resins for use in the present invention are not particularly limited and may be conventionally known epoxy resins.

Typically, epoxy resins are produced by reacting an aromatic diol (for example, bisphenol A) with an epichlorohydrin in the presence of an alkaline. Preferred epoxy resins in the present invention are bisphenol A epoxy resins, bisphenol F epoxy resins, and bisphenol S epoxy resins each having an epoxy equivalent in the range of 170 to 5000.

Such epoxy resins are commercially available and include Epomik (trade name, Mitsui Petrochemical Industries, Ltd.), Epiclon (trade name, Dainippon Ink and Chemicals, Inc.), and Sumiepoxy (trade name, Sumitomo Chemical Co., Ltd.), which can preferably be used in the present invention.

(10) Thermosetting Unsaturated Polyester Resins

Thermosetting unsaturated polyester resins for use in the present invention are not particularly limited and may be conventionally known thermosetting unsaturated polyester resins.

Typically, thermosetting unsaturated polyester resins are produced by the esterification reaction between an aliphatic unsaturated dicarboxylic acid and an aliphatic diol. Preferably, the thermosetting unsaturated polyester resin in the present invention is produced by the esterification reaction between an unsaturated dicarboxylic acid, such as maleic acid or fumaric acid, and a diol, such as ethylene glycol or diethylene glycol.

Such thermosetting unsaturated polyester resins are commercially available and include Rigolac (trade name, Showa Highpolymer Co., Ltd.) and Sumikon (trade name, Sumitomo Bakelite Co., Ltd.), which can preferably be used in the present invention.

(11) Phenolic Resins

Phenolic resins for use in the present invention are not particularly limited and may be conventionally known phenolic resins.

The present invention encompasses both novolak and resole resins. Preferably, the phenolic resin is a novolak resin to be cured with hexamethylenetetramine or a solid resole resin mainly containing a dimethylene ether bond.

Such phenolic resins are commercially available and include Sumikon PM (trade name, Sumitomo Bakelite Co., Ltd.) and Nikkalite (trade name, NIHON GOSEI KAKO CO., LTD.), which can preferably be used in the present invention.

B. 4-Methyl-1-Pentene Polymer (B-1)

(B1) A 4-methyl-1-pentene polymer for use in the present invention has an intrinsic viscosity [η] of 0.01 or more but less than 0.50 dl/g, preferably in the range of 0.02 to 0.45 dl/g, more preferably 0.03 to 0.40 dl/g, measured at 135° C. in a decalin solvent. A 4-methyl-1-pentene polymer having an intrinsic viscosity [η] in this range has excellent mold releasability as a resin modifier. The intrinsic viscosity [η] can be reduced, for example, by increasing the hydrogen supply. The intrinsic viscosity [η] can also be controlled by the type of catalyst or polymerization temperature. For example, while the polymerization temperature generally ranges from −50° C. to 400° C. in the production using a metallocene catalyst as described below in a synthesis example, the polymerization temperature preferably ranges from 10° C. to 300° C., more preferably 10° C. to 250° C., to produce a 4-methyl-1-pentene polymer having an intrinsic viscosity [η] in the suitable range. When a 4-methyl-1-pentene polymer is thermally decomposed to produce a 4-methyl-1-pentene polymer, the 4-methyl-1-pentene polymer of the base material before thermal decomposition can be thermally decomposed at a temperature in the range of 200° C. to 500° C., preferably 250° C. to 480° C., more preferably 300° C. to 450° C., to produce a 4-methyl-1-pentene polymer having a desired [η].

(B2) A 4-methyl-1-pentene polymer for use in the present invention preferably contains 50% to 100% by weight, more preferably 60% to 100% by weight, still more preferably 70% to 100% by weight, of a constitutional unit derived from 4-methyl-1-pentene and preferably 0% to 50% by weight, more preferably 0% to 40% by weight, still more preferably 0% to 30% by weight, in total of constitutional units derived from at least one olefin selected from olefins having 2 to 20 carbon atoms other than 4-methyl-1-pentene (the constitutional units of the 4-methyl-1-pentene polymer are 100% by weight in total). Examples of the olefin having 2 to 20 carbon atoms other than 4-methyl-1-pentene for use in a 4-methyl-1-pentene polymer for use in the present invention include straight- and branched-chain α-olefins, cyclic olefins, aromatic vinyl compounds, conjugated dienes, nonconjugated polyenes, and functionalized vinyl compounds.

More specifically, examples of the straight- and branched-chain α-olefins for use in a 4-methyl-1-pentene polymer for use in the present invention include straight-chain α-olefins having 2 to 20, preferably 2 to 10, carbon atoms, such as ethylene, propylene, 1-butene, 1-pentene, 1-hexene, 1-octene, 1-decene, 1-dodecene, 1-tetradecene, 1-hexadecene, 1-octadecene, and 1-eicosene; and preferably 5 to 20, more preferably 5 to 10, carbon atoms, branched-chain α-olefins, such as 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, and 3-ethyl-1-hexene.

Examples of the cyclic olefins include cyclic olefins having 3 to 20, preferably 5 to 15, carbon atoms, such as cyclopentene, cycloheptene, norbornene, 5-methyl-2-norbornene, tetracyclododecene, and vinylcyclohexane.

Examples of the aromatic vinyl compounds include styrene and mono and polyalkylstyrenes, such as α-methylstyrene, o-methylstyrene, m-methylstyrene, p-methylstyrene, o,p-dimethylstyrene, o-ethylstyrene, m-ethylstyrene, and p-ethylstyrene.

Examples of the conjugated dienes include conjugated dienes having 4 to 20, preferably 4 to 10, carbon atoms, such as 1,3-butadiene, isoprene, chloroprene, 1,3-pentadien, 2,3-dimethylbutadiene, 4-methyl-1,3-pentadien, 1,3-pentadien, 1,3-hexadiene, and 1,3-octadiene.

Examples of the nonconjugated polyenes include nonconjugated polyenes having 5 to 20, preferably 5 to 10, carbon atoms, such as 1,4-pentadien, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene.

Examples of the functionalized vinyl compounds include olefins containing a hydroxy group, halogenated olefins, acrylic acid, propionic acid, unsaturated carboxylic acids, such as 3-butenoic acid, 4-pentenoic acid, 5-hexenoic acid, 6-heptenoic acid, 7-octenoic acid, 8-nonenoic acid, and 9-decenoic acid, unsaturated amines, such as allylamine, 5-hexeneamine, and 6-hepteneamine, unsaturated acid anhydrides, such as (2,7-octadienyl)succinic anhydride, pentapropenylsuccinic anhydride, and exemplary compounds of the unsaturated carboxylic acids described above in which the carboxy group was substituted by a carboxylic anhydride group, unsaturated carboxylic acid halides, such as exemplary compounds of the unsaturated carboxylic acids described above in which the carboxy group was substituted by a carboxylic acid halide group, and unsaturated epoxy compounds, such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene, and 11-epoxy-1-undecene.

The olefins containing a hydroxy group may be any olefin compounds containing a hydroxy group and include terminal hydroxylated olefin compounds. Specific examples of the terminal hydroxylated olefin compounds include straight-chain hydroxylated α-olefins having 2 to 20, preferably 2 to 10, carbon atoms, such as vinyl alcohol, allyl alcohol, hydroxylated-1-butene, hydroxylated-1-pentene, hydroxylated-1-hexene, hydroxylated-1-octene, hydroxylated-1-decene, hydroxylated-1-dodecene, hydroxylated-1-tetradecene, hydroxylated-1-hexadecene, hydroxylated-1-octadecene, and hydroxylated-1-eicosene; and preferably 5 to 20, more preferably 5 to 10, carbon atoms, branched-chain hydroxylated α-olefins, such as hydroxylated-3-methyl-1-butene, hydroxylated-4-methyl-1-pentene, hydroxylated-3-methyl-1-pentene, hydroxylated-3-ethyl-1-pentene, hydroxylated-4,4-dimethyl-1-pentene, hydroxylated-4-methyl-1-hexene, hydroxylated-4,4-dimethyl-1-hexene, hydroxylated-4-ethyl-1-hexene, and hydroxylated-3-ethyl-1-hexene.

Specific examples of the halogenated olefins include halogenated α-olefins having the group 17 atoms of the periodic table, such as chlorine, bromine, and iodine, for example, straight-chain halogenated α-olefins having 2 to 20, preferably 2 to 10, carbon atoms, such as halogenated vinyls, halogenated-1-butenes, halogenated-1-pentenes, halogenated-1-hexenes, halogenated-1-octenes, halogenated-1-decenes, halogenated-1-dodecenes, halogenated-1-tetradecenes, halogenated-1-hexadecenes, halogenated-1-octadecenes, and halogenated-1-eicosenes; and preferably 5 to 20, more preferably 5 to 10, carbon atoms, branched-chain halogenated α-olefins, such as halogenated-3-methyl-1-butenes, halogenated-4-methyl-1-pentenes, halogenated-3-methyl-1-pentenes, halogenated-3-ethyl-1-pentenes, halogenated-4,4-dimethyl-1-pentenes, halogenated-4-methyl-1-hexenes, halogenated-4,4-dimethyl-1-hexenes, halogenated-4-ethyl-1-hexenes, and halogenated-3-ethyl-1-hexenes.

The olefins to be used in combination with 4-methyl-1-pentene may be used alone or in combination. In particular, the olefins to be suitably used in combination with 4-methyl-1-pentene include ethylene, propylene, 1-butene, 1-pentene, 1-hexene, 3-methyl-1-butene, 3-methyl-1-pentene, 3-ethyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, vinylcyclohexane, and styrene.

(B3) A 4-methyl-1-pentene polymer for use in the present invention preferably has a ratio (Mw/Mn) of weight-average molecular weight (Mw) to number-average molecular weight (Mn) in the range of 1.0 to 5.0, more preferably 1.0 to 4.5, still more preferably 1.0 to 4.0, particularly preferably 1.0 to 3.5, as determined by gel permeation chromatography (GPC). Mw/Mn within the range described above allows reduction in the amount of components in a low-molecular-weight region of the molecular weight distribution. Such a 4-methyl-1-pentene polymer used as a resin modifier can reduce the stickiness of a formed product. Mw/Mn within the range described above also allows reduction in the amount of high-molecular-weight components. Such a 4-methyl-1-pentene polymer can be well dispersed in a formed product and exert a smaller influence on dynamic properties. A polymer having such a molecular weight distribution can be produced by thermal decomposition of a polymer having a wide molecular weight distribution, if necessary, followed by solvent fractionation. Preferably, a polymer having such a molecular weight distribution can be produced in the presence of a metallocene catalyst described below to produce a 4-methyl-1-pentene polymer.

(B4) A 4-methyl-1-pentene polymer for use in the present invention preferably has a melting point (Tm) in the range of 120° C. to 245° C., more preferably 130° C. to 240° C., still more preferably 140° C. to 235° C., as measured with a differential scanning calorimeter. A 4-methyl-1-pentene polymer having a melting point (Tm) in this range has an excellent balance between molding processability when used as a resin modifier and blocking resistance during the storage of the 4-methyl-1-pentene polymer. In the case that the 4-methyl-1-pentene polymer is a 4-methyl-1-pentene homopolymer, the melting point depends on the number-average molecular weight (Mn). For example, the melting point of a 4-methyl-1-pentene homopolymer can be decreased by decreasing the molecular weight of the 4-methyl-1-pentene homopolymer. In the case that the 4-methyl-1-pentene polymer is a copolymer of 4-methyl-1-pentene and an olefin having 2 to 20 carbon atoms, the melting point of the 4-methyl-1-pentene polymer depends on the number-average molecular weight (Mn) and can be controlled by the ratio of the olefin having 2 to 20 carbon atoms to 4-methyl-1-pentene in polymerization and the type of the olefin. For example, the melting point of the resulting polymer can be decreased by increasing the ratio of the olefin to 4-methyl-1-pentene.

The melting point was measured with a differential scanning calorimeter (DSC) by increasing the temperature of approximately 5 mg of a sample in an aluminum pan to 280° C., holding at 280° C. for five minutes, cooling the sample to 30° C. at 10° C./min, holding at 30° C. for five minutes, and then increasing the temperature at 10° C./min, during which an endothermic peak was measured as a melting point.

(B5) A 4-methyl-1-pentene polymer for use in the present invention preferably has a critical surface tension in the range of 22 to 28 mN/m, more preferably 23 to 27.5 mN/m, still more preferably 24 to 27.5 mN/m, particularly preferably 24.5 to 27.5 mN/m. A 4-methyl-1-pentene polymer having a critical surface tension in this range can impart excellent mold releasability to a formed product. Such a critical surface tension depends on the 4-methyl-1-pentene constitutional unit in the 4-methyl-1-pentene polymer. In order to achieve the suitable critical surface tension described above, the amount of 4-methyl-1-pentene constitutional unit ranges from 50% to 100% by weight, preferably 60% to 100% by weight, more preferably 70% to 100% by weight, particularly preferably 80% to 100% by weight.

(B6) Preferably, a 4-methyl-1-pentene polymer for use in the present invention has a relationship expressed by the following formula (I) between molecular weight and intrinsic viscosity.

$$A \leq 0.2 \times [\eta]^{(-1.5)} \quad (I)$$

wherein A denotes the percentage (% by mass) of a component having a polystyrene equivalent molecular weight of 1,000 or less in the 4-methyl-1-pentene polymer as measured by gel permeation chromatography (GPC), and $[\eta]$ denotes the intrinsic viscosity (dl/g) of the 4-methyl-1-pentene polymer measured at 135° C. in a decalin solvent.

Use of a 4-methyl-1-pentene polymer that satisfies the condition expressed by the formula (I) can improve the mold releasability of a formed product without impairing the dynamic properties of the formed product. A polymer that satisfies the relation expressed by the formula (I) can be produced by primarily removing components having a molecular weight of 1,000 or less, for example, by solvent fractionation. Use of a metallocene catalyst described below tends to yield a polymer having a narrow molecular weight distribution, often yielding a polymer that satisfies the formula (I) without using solvent fractionation.

In general, in the shape processing of a resin that contains a 4-methyl-1-pentene polymer having a low intrinsic viscosity as a resin modifier, the 4-methyl-1-pentene polymer having a lower molecular weight in a molten state is expected to be localized in the vicinity of inner walls of a forming machine, such as a screw, a barrel, and a die, to reduce shear acting on the inner walls. When the localized state is maintained also in a solidification process of a formed product in a die, the 4-methyl-1-pentene polymer tends to exist in the surface layer of the formed product, thereby improving the mold releasability of the formed product. In contrast to the improvement in mold releasability, however, the 4-methyl-1-pentene polymer itself may be adhered to each other or may impair the dynamic physical properties of a formed product. In some cases, a formed product has insufficient mold releasability.

As a result of investigations, the present inventors found that the proportion of components having a molecular weight of 1,000 or less in a 4-methyl-1-pentene polymer is very important in terms of intrinsic viscosity. Although a detailed mechanism for that is not clear, components having a molecular weight of 1,000 or less in a 4-methyl-1-pentene polymer are probably particularly sticky. It is therefore presumed that a 4-methyl-1-pentene polymer cannot produce sufficient mold releasability as a resin modifier when the proportion of components having a molecular weight of 1,000 or less exceeds a certain value. At such a proportion, it is also presumed that a 4-methyl-1-pentene polymer itself tends to be adhered to each other. Components having a particularly low molecular weight, for example, as low as 1,000 or less are also presumed to cause deterioration in dynamic physical properties. In particular, the effects of components having a molecular weight of 1,000 or less tend to increase with a decrease in the molecular weight of a (B) 4-methyl-1-pentene polymer.

The formula (I) defines the allowable percentage of components having a molecular weight of 1,000 or less in consideration of the effects of the molecular weight of a (B) 4-methyl-1-pentene polymer.

(B7) A 4-methyl-1-pentene polymer for use in the present invention preferably has 0.001 to 100, more preferably 0.001 to 0.5, still more preferably 0.001 to 0.4, particularly preferably 0.001 to 0.3, terminal double bonds per 1000 carbon atoms in the 4-methyl-1-pentene polymer as determined by $^1$H-NMR. Although such a number of terminal double bonds can be formed by thermal decomposition, they can preferably be formed by producing a 4-methyl-1-pentene polymer in the presence of a Ziegler catalyst, more preferably a metallocene catalyst described below.

(B8) A 4-methyl-1-pentene polymer for use in the present invention preferably has an iodine value in the range of 0.001 to 180 g/100 g, more preferably 0.001 to 0.9 g/100 g, still more preferably 0.001 to 0.7 g/100 g, most preferably 0.001 to 0.5 g/100 g. Although a polymer having such an iodine value may be produced by the conventional thermal decomposition of a 4-methyl-1-pentene polymer, it is more preferably produced by the polymerization of 4-methyl-1-pentene in the presence of a metallocene catalyst described below.

The iodine value of a 4-methyl-1-pentene polymer was measured by the following method. Two grams of a 4-methyl-1-pentene polymer is dissolved in 100 ml of decalin at 150° C. and is left to stand at room temperature until the solution is cooled to 50° C. 20 ml of acetic acid containing 1 mmol iodine monochloride is then added to the solution. After the solution was left to stand in a dark place for 30 minutes while stirring sometimes, 20 ml of 10% aqueous potassium iodide was added to the solution. The solution was titrated with 0.1 N aqueous sodium thiosulfate. The iodine value indicating the number of grams of iodine bonding to 100 g of a sample was calculated by using the following equation.

Iodine value=1.269(B−A)/C

A and B denote sodium thiosulfate (ml) consumed by titration of the sample and in a blank test, respectively. C denotes the number of grams of the sample.

Since a 4-methyl-1-pentene polymer for use in the present invention tends to be localized on the surface, a large number of double bonds probably result in deterioration in the quality of the 4-methyl-1-pentene polymer owing to oxygen in the air. A decrease in molecular weight probably accelerates this tendency. Thus, the 4-methyl-1-pentene polymer preferably has an iodine value in the range described above.

(B9) A 4-methyl-1-pentene polymer for use in the present invention preferably contains a n-decane soluble fraction in the range of 0.01% to 99% by weight, more preferably 0.01% to 80% by weight, still more preferably 0.01% to 40% by weight (based on 100% by weight of the 4-methyl-1-pentene polymer), at 10° C. Although a 4-methyl-1-pentene polymer having such a n-decane soluble fraction may be produced by thermal decomposition or in the presence of a Ziegler catalyst, it is preferably produced in the presence of a metallocene catalyst described below. The n-decane soluble fraction was measured by dissolving approximately 3 g of a 4-methyl-1-pentene polymer in 450 ml of n-decane at 145° C., cooling the solution to 10° C., removing a n-decane insoluble fraction by filtration, and recovering a n-decane soluble from the filtrate.

(B10) A 4-methyl-1-pentene polymer for use in the present invention preferably has a dyad isotacticity in the range of 70% to 99%, more preferably 80% to 99%, still more preferably 90% to 99%, particularly preferably 93% to 99%, as determined by $^{13}$C-NMR. Although a polymer having such a dyad isotacticity may be produced by the conventional thermal decomposition of a 4-methyl-1-pentene polymer, it is preferably obtained by producing a 4-methyl-1-pentene polymer in the presence of a Ziegler catalyst, such as a magnesium-compound-supported titanium catalyst, more preferably a metallocene catalyst described below. The dyad isotacticity was measured by the following method.

The dyad isotacticity of a 4-methyl-1-pentene polymer is defined as the percentage of the directions of the isobutyl branches that are the same when two 4-methyl-1-pentene units bonded to each other via a head-to-tail linkage in a polymer chain are represented in a planar zigzag structure. The dyad isotacticity was calculated from a $^{13}$C-NMR spectrum by using the following equation.

Dyad isotacticity(%)=[m/(m+r)]×100 wherein m and r denote absorption intensities resulting from the main-chain methylene of 4-methyl-1-pentene units bonded to each other via a head-to-tail linkage expressed by the following formulae.

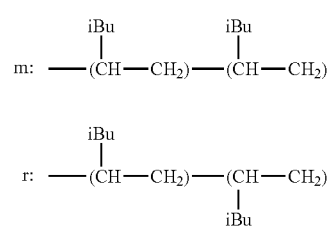

[Formula 1]

The $^{13}$C-NMR spectrum was measure with a nuclear magnetic resonance spectrometer having a $^1$H resonance frequency of 400 MHz. In a NMR sample tube (5 mmφ), a sample was completely dissolved in approximately 0.5 ml of hexachlorobutadiene, o-dichlorobenzene, or 1,2,4-trichlorobenzene to which approximately 0.05 ml of a lock solvent deuterated benzene was added. The $^{13}$C-NMR spectrum was measured at 120° C. by complete proton decoupling. Measurement conditions include a flip angle of 45° and a pulse interval of 5 sec or more. The chemical shift of benzene was set at 127.7 ppm. The chemical shifts of other carbon peaks were determined on the basis of this reference.

A peak area in the range of 41.5 to 43.3 ppm was divided at the minimum point of a peak profile into a first area on the high-magnetic field side and a second area on the low-magnetic field side. In the first area, main-chain methylenes denoted by m in two 4-methyl-1-pentene units bonded to each other resonate. A peak of methylene linked to a comonomer also overlaps with the first area. Thus, an integrated value m was calculated by doubling the peak area derived from the comonomer at 34.5 to 35.5 ppm and subtracting it from the first area.

In the second area, main-chain methylenes denoted by r in two 4-methyl-1-pentene units bonded to each other resonate. An integrated value thereof was denoted by r.

For example, NMR measurements are performed as described below. 0.35 g of a sample is dissolved in 2.0 ml of hexachlorobutadiene by the application of heat. After the solution is filtered through a glass filter (G2), 0.5 ml of deuterated benzene is added to the filtrate. The filtrate is then transferred into an NMR tube having an inner diameter of 10 mm. $^{13}$C-NMR measurements are performed at 120° C. with a GX-500 NMR spectrometer manufactured by JEOL Ltd. The number of scans is 10,000 or more.

C. Resin Composition Containing 4-Methyl-1-Pentene Polymer

A resin composition containing a 4-methyl-1-pentene polymer contains 0.01 to 10 parts by mass, preferably 0.1 to 7 parts by mass, more preferably 0.2 to 5 parts by mass, of a 4-methyl-1-pentene polymer (B-1) per 100 parts by mass of at least one resin (A) selected from the group consisting of thermoplastic resins and thermosetting resins.

2. Second Aspect of the Present Invention

A second aspect of the present invention will be described below.

A. Resins

Examples of resins include the resins described in the first aspect of the present invention. More specifically, the thermoplastic resin is selected from the group consisting of polyolefin resins, polycarbonate resins, thermoplastic polyester resins, ABS resins, polyacetal resins, polyamide resins, poly(phenylene oxide) resins, and polyimide resins. The thermosetting resin is selected from the group consisting of epoxy resins, thermosetting unsaturated polyester resins, and phenolic resins. A composition according to the present invention can contain one of the thermoplastic resins and the thermosetting resins or can contain a combination thereof.

These resins may be any known resins and are appropriately selected in accordance with the use and the composition, the molecular weight, and the like of a 4-methyl-1-pentene polymer described below.

Preferably, the thermoplastic or thermosetting resin is a resin having a small density difference from a 4-methyl-1-pentene polymer. A small density difference between the thermoplastic or thermosetting resin and a 4-methyl-1-pentene polymer results in excellent dispersion of the 4-methyl-1-pentene polymer in the thermoplastic or thermosetting resin, leading to a resin composition having excellent transparency and mold releasability.

More specifically, the density difference between the resin (A) and a 4-methyl-1-pentene polymer ranges from 0 to 1500 kg/m$^3$, preferably 1 to 600 kg/m$^3$, more preferably 5 to 400 kg/m$^3$. Examples of a preferred specific combination include a combination of a polyamide resin and a 4-methyl-1-pentene polymer. Among these, the thermoplastic or thermosetting resin is preferably a polyolefin resin, a polycarbonate resin, a thermoplastic polyester resin, or a polyamide resin, more preferably a thermoplastic polyester resin or a polyamide resin, particularly preferably a polyamide resin.

Among these resins, resins having a melting point (Tm) of 200° C. or more are preferred. The melting point (Tm) range is preferably 205° C. or more, more preferably 210° C. or more, and preferably 500° C. or less, more preferably 400° C. or less, still more preferably 350° C. or less. The melting point was measured with a differential scanning calorimeter (DSC) by increasing the temperature of approximately 10 mg of a sample in an aluminum pan to melt the sample, cooling the sample to 30° C. at 10° C./min, and then increasing the temperature at 10° C./min, during which an endothermic peak was measured as a melting point. For heat-resistant resins that are thermally decomposed before the melting point (Tm) is observed, the thermal decomposition temperature is considered as the melting point (Tm).

Examples of resins having a melting point (Tm) of 200° C. or more include polycarbonate resins, thermoplastic polyester resins, and polyamide resins. Examples of commercially available products include Amilan CM1041LO (manufactured by Toray Industries, Inc., polyamide resin, melting point: 225° C.) and Novaduran 5020 (manufactured by Mitsubishi Engineering-Plastics Co., poly(butylene terephthalate) resin, melting point: 224° C.)

The reason that resins having a melting point (Tm) of 200° C. or more are preferred is that, since a resin composition containing a 4-methyl-1-pentene polymer is shaped at high temperatures of 200° C. or more, the resins having a melting point (Tm) of 200° C. or more can be well dispersed in the resin composition containing the 4-methyl-1-pentene polymer having a relatively high melting point among polyolefins, thereby providing a resin composition having excellent transparency and mold releasability.

B. 4-Methyl-1-Pentene Polymer (B-2)

(B11) A 4-methyl-1-pentene polymer for use in the present invention has an intrinsic viscosity [η] of 0.01 or more but less than 3.0 dl/g measured at 135° C. in a decalin solvent and preferably has a lower limit of 0.02 dl/g or more, more preferably 0.03 dl/g or more, still more preferably 0.1 dl/g or more, particularly preferably 0.5 dl/g or more. A 4-methyl-1-pentene polymer for use in the present invention preferably has an upper limit of less than 2.5 dl/g, more preferably less than 2.0 dl/g, still more preferably less than 1.5 dl/g.

A 4-methyl-1-pentene polymer having such an intrinsic viscosity [η] can be produced by controlling the hydrogen supply, the type of catalyst, and the polymerization temperature in polymerization in the same way as in the first aspect of the present invention. In general, a decrease in hydrogen supply or polymerization temperature often results in an increase in [η]. A 4-methyl-1-pentene polymer having an intrinsic viscosity [η] in this range has excellent mold releasability as a resin modifier.

(B2) A 4-methyl-1-pentene polymer for use in the present invention preferably contains 50% to 100% by weight, more preferably 60% to 100% by weight, still more preferably 70% to 100% by weight, of a constitutional unit derived from 4-methyl-1-pentene and preferably 0% to 50% by weight, more preferably 0% to 40% by weight, still more preferably 0% to 30% by weight, in total of constitutional units derived from at least one olefin selected from olefins having 2 to 20 carbon atoms other than 4-methyl-1-pentene (the constitutional units of the 4-methyl-1-pentene polymer are 100% by weight in total).

Examples of the olefin having 2 to 20 carbon atoms other than 4-methyl-1-pentene for use in a 4-methyl-1-pentene polymer for use in the present invention include straight- and branched-chain α-olefins, cyclic olefins, aromatic vinyl compounds, conjugated dienes, nonconjugated polyenes, and functionalized vinyl compounds.

More specifically, examples of the straight- and branched-chain α-olefins for use in a 4-methyl-1-pentene polymer for use in the present invention include straight-chain α-olefins having 2 to 20, preferably 2 to 10, carbon atoms, such as ethylene, propylene, 1-butene, 1-pentene, 1-hexene, 1-octene, 1-decene, 1-dodecene, 1-tetradecene, 1-hexadecene, 1-octadecene, and 1-eicosene; and preferably 5 to 20, more preferably 5 to 10, carbon atoms, branched-chain α-olefins, such as 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, and 3-ethyl-1-hexene.

Examples of the cyclic olefins include cyclic olefins having 3 to 20, preferably 5 to 15, carbon atoms, such as cyclopentene, cycloheptene, norbornene, 5-methyl-2-norbornene, tetracyclododecene, and vinylcyclohexane.

Examples of the aromatic vinyl compounds include styrene and mono and polyalkylstyrenes, such as α-methylstyrene, o-methylstyrene, m-methylstyrene, p-methylstyrene, o,p-dimethylstyrene, o-ethylstyrene, m-ethylstyrene, and p-ethylstyrene.

Examples of the conjugated dienes include conjugated dienes having 4 to 20, preferably 4 to 10, carbon atoms, such as 1,3-butadiene, isoprene, chloroprene, 1,3-pentadien, 2,3-dimethylbutadiene, 4-methyl-1,3-pentadien, 1,3-pentadien, 1,3-hexadiene, and 1,3-octadiene.

Examples of the nonconjugated polyenes include nonconjugated polyenes having 5 to 20, preferably 5 to 10, carbon atoms, such as 1,4-pentadien, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene.

Examples of the functionalized vinyl compounds include olefins containing a hydroxy group, halogenated olefins, acrylic acid, propionic acid, unsaturated carboxylic acids, such as 3-butenoic acid, 4-pentenoic acid, 5-hexenoic acid, 6-heptenoic acid, 7-octenoic acid, 8-nonenoic acid, and 9-decenoic acid, unsaturated amines, such as allylamine, 5-hexeneamine, and 6-hepteneamine, unsaturated acid anhydrides, such as (2,7-octadienyl)succinic anhydride, pentapropenyl-succinic anhydride, and exemplary compounds of the unsaturated carboxylic acids described above in which the carboxy group was substituted by a carboxylic anhydride group, unsaturated carboxylic acid halides, such as exemplary compounds of the unsaturated carboxylic acids described above in which the carboxy group was substituted by a carboxylic acid halide group, and unsaturated epoxy compounds, such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene, and 11-epoxy-1-undecene.

The olefins containing a hydroxy group may be any olefin compounds containing a hydroxy group and include terminal hydroxylated olefin compounds. Specific examples of the terminal hydroxylated olefin compounds include straight-chain hydroxylated α-olefins having 2 to 20, preferably 2 to 10, carbon atoms, such as vinyl alcohol, allyl alcohol, hydroxylated-1-butene, hydroxylated-1-pentene, hydroxylated-1-hexene, hydroxylated-1-octene, hydroxylated-1-decene, hydroxylated-1-dodecene, hydroxylated-1-tetradecene, hydroxylated-1-hexadecene, hydroxylated-1-octadecene, and hydroxylated-1-eicosene; and preferably 5 to 20, more preferably 5 to 10, carbon atoms, branched-chain hydroxylated α-olefins, such as hydroxylated-3-methyl-1-butene, hydroxylated-4-methyl-1-pentene, hydroxylated-3-methyl-1-pentene, hydroxylated-3-ethyl-1-pentene, hydroxylated-4,4-dimethyl-1-pentene, hydroxylated-4-methyl-1-hexene, hydroxylated-4,4-dimethyl-1-hexene, hydroxylated-4-ethyl-1-hexene, and hydroxylated-3-ethyl-1-hexene.

Specific examples of the halogenated olefins include halogenated α-olefins having the group 17 atoms of the periodic table, such as chlorine, bromine, and iodine, for example, straight-chain halogenated α-olefins having 2 to 20, preferably 2 to 10, carbon atoms, such as halogenated vinyls, halogenated-1-butenes, halogenated-1-pentenes, halogenated-1-hexenes, halogenated-1-octenes, halogenated-1-decenes, halogenated-1-dodecenes, halogenated-1-tetradecenes, halogenated-1-hexadecenes, halogenated-1-octadecenes, and halogenated-1-eicosenes; and preferably 5 to 20, more preferably 5 to 10, carbon atoms, branched-chain halogenated α-olefins, such as halogenated-3-methyl-1-butenes, halogenated-4-methyl-1-pentenes, halogenated-3-methyl-1-pentenes, halogenated-3-ethyl-1-pentenes, halogenated-4,4-dimethyl-1-pentenes, halogenated-4-methyl-1-hexenes, halogenated-4,4-dimethyl-1-hexenes, halogenated-4-ethyl-1-hexenes, and halogenated-3-ethyl-1-hexenes.

The olefins to be used in combination with 4-methyl-1-pentene may be used alone or in combination. In particular, the olefins to be suitably used in combination with 4-methyl-1-pentene include ethylene, propylene, 1-butene, 1-pentene, 1-hexene, 3-methyl-1-butene, 3-methyl-1-pentene, 3-ethyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, vinylcyclohexane, and styrene.

(B3-2) A 4-methyl-1-pentene polymer for use in the present invention preferably has a ratio (Mw/Mn) of weight-average molecular weight (Mw) to number-average molecular weight (Mn) in the range of 1.0 to 15.0, more preferably 1.0 to 10.0, next preferably 1.0 to 8.0, still more preferably 1.0 to 5.0, particularly preferably 1.0 to 4.0, as determined by gel permeation chromatography (GPC).

Mw/Mn within the range described above allows reduction in the amount of components in a low-molecular-weight region of the molecular weight distribution. Such a 4-methyl-1-pentene polymer used as a resin modifier can reduce the stickiness of a formed product. Mw/Mn within the range described above also allows reduction in the amount of high-molecular-weight components. Such a 4-methyl-1-pentene polymer can be well dispersed in a formed product and exert a smaller influence on dynamic properties. A polymer having such a molecular weight distribution can be produced by thermal decomposition of a polymer having a wide molecular weight distribution, if necessary, followed by solvent fractionation. Preferably, a polymer having such a molecular weight distribution can be produced in the presence of a metallocene catalyst described below to produce a 4-methyl-1-pentene polymer.

(B4) A 4-methyl-1-pentene polymer for use in the present invention preferably has a melting point (Tm) in the range of 120° C. to 245° C., more preferably 130° C. to 240° C., still more preferably 140° C. to 235° C., as measured with a differential scanning calorimeter. A 4-methyl-1-pentene polymer having a melting point (Tm) in this range has an excellent balance between molding processability when used as a resin modifier and blocking resistance during the storage of the 4-methyl-1-pentene polymer. In the case that the 4-methyl-1-pentene polymer is a 4-methyl-1-pentene homopolymer, the melting point depends on the number-average molecular weight (Mn). For example, the melting point of a 4-methyl-1-pentene homopolymer can be decreased by decreasing the molecular weight of the 4-methyl-1-pentene homopolymer. In the case that the 4-methyl-1-pentene polymer is a copolymer of 4-methyl-1-pentene and an olefin having 2 to 20 carbon atoms, the melting point of the 4-methyl-1-pentene polymer depends on the number-average molecular weight (Mn) and can be controlled by the ratio of the olefin having 2 to 20 carbon atoms to 4-methyl-1-pentene in polymerization and the type of the olefin. For example, the melting point of the resulting polymer can be decreased by increasing the ratio of the olefin to 4-methyl-1-pentene.

The melting point was measured by the method described in the first aspect of the present invention.

(B5) A 4-methyl-1-pentene polymer for use in the present invention preferably has a critical surface tension in the range of 22 to 28 mN/m, more preferably 23 to 27.5 mN/m, still more preferably 24 to 27.5 mN/m, particularly preferably 24.5 to 27.5 mN/m. A 4-methyl-1-pentene polymer having a critical surface tension in this range can impart excellent mold releasability to a formed product. Such a critical surface tension depends on the 4-methyl-1-pentene constitutional unit in the 4-methyl-1-pentene polymer. In order to achieve the suitable critical surface tension described above, the amount of 4-methyl-1-pentene constitutional unit ranges from 50% to 100% by weight, preferably 60% to 100% by weight, more preferably 70% to 100% by weight, particularly preferably 80% to 100% by weight.

(B6) A 4-methyl-1-pentene polymer for use in the present invention has a relationship expressed by the following formula (I) between molecular weight and intrinsic viscosity.

$$A \leq 0.2 \times [\eta]^{(-1.5)} \quad (I)$$

wherein A denotes the percentage (% by mass) of a component having a polystyrene equivalent molecular weight of 1,000 or less in the 4-methyl-1-pentene polymer as measured by gel permeation chromatography (GPC), and $[\eta]$ denotes the intrinsic viscosity (dl/g) of the 4-methyl-1-pentene polymer measured at 135° C. in a decalin solvent.

Use of a 4-methyl-1-pentene polymer that satisfies the condition expressed by the formula (I) can improve the mold releasability of a formed product without impairing the dynamic properties of the formed product. A polymer that satisfies the relation expressed by the formula (I) can be produced by primarily removing components having a molecular weight of 1,000 or less, for example, by solvent fractionation. Use of a metallocene catalyst described below tends to yield a polymer having a narrow molecular weight distribution, often yielding a polymer that satisfies the formula (I) without using solvent fractionation.

In general, in the shape processing of a resin that contains a 4-methyl-1-pentene polymer having a low intrinsic viscosity as a resin modifier, the 4-methyl-1-pentene polymer having a lower molecular weight in a molten state is expected to be localized in the vicinity of inner walls of a forming machine, such as a screw, a barrel, and a die, to reduce shear acting on the inner walls. When the localized state is maintained also in a solidification process of a formed product in a die, the 4-methyl-1-pentene polymer tends to exist in the surface layer of the formed product, thereby improving the mold releasability of the formed product. In contrast to the improvement in mold releasability, however, the 4-methyl-1-pentene polymer itself may be adhered to each other or may impair the dynamic physical properties of a formed product. In some cases, a formed product has insufficient mold releasability.

As a result of investigations, the present inventors found that the proportion of components having a molecular weight of 1,000 or less in a 4-methyl-1-pentene polymer is very important in terms of intrinsic viscosity. Although a detailed mechanism for that is not clear, components having a molecular weight of 1,000 or less in a 4-methyl-1-pentene polymer are probably particularly sticky. It is therefore presumed that a 4-methyl-1-pentene polymer cannot produce sufficient mold releasability as a resin modifier when the proportion of components having a molecular weight of 1,000 or less exceeds a certain value. At such a proportion, it is also presumed that a 4-methyl-1-pentene polymer itself tends to be adhered to each other. Components having a particularly low molecular weight, for example, as low as 1,000 or less are also presumed to cause deterioration in dynamic physical properties. In particular, the effects of components having a molecular weight of 1,000 or less tend to increase with a decrease in the molecular weight of a (B) 4-methyl-1-pentene polymer.

The formula (I) defines the allowable percentage of components having a molecular weight of 1,000 or less in consideration of the effects of the molecular weight of a (B) 4-methyl-1-pentene polymer.

(B7) A 4-methyl-1-pentene polymer for use in the present invention preferably has 0.001 to 100, more preferably 0.001 to 0.5, still more preferably 0.001 to 0.4, particularly preferably 0.001 to 0.3, terminal double bonds per 1000 carbon atoms in the 4-methyl-1-pentene polymer as determined by $^1$H-NMR. Although such a number of terminal double bonds can be formed by thermal decomposition, they can preferably be formed by producing a 4-methyl-1-pentene polymer in the presence of a Ziegler catalyst, more preferably a metallocene catalyst described below.

(B8) A 4-methyl-1-pentene polymer for use in the present invention preferably has an iodine value in the range of 0.001 to 180 g/100 g, more preferably 0.001 to 0.9 g/100 g, still more preferably 0.001 to 0.7 g/100 g, most preferably 0.001 to 0.5 g/100 g. Although a polymer having such an iodine value may be produced by the conventional thermal decomposition of a 4-methyl-1-pentene polymer, it is more preferably produced by the polymerization of 4-methyl-1-pentene in the presence of a metallocene catalyst described below.

The iodine value of a 4-methyl-1-pentene polymer was measured in the same way as in the first aspect of the present invention.

Since a 4-methyl-1-pentene polymer for use in the present invention tends to be localized on the surface, a large number of double bonds probably result in deterioration in the quality of the 4-methyl-1-pentene polymer owing to oxygen in the air. A decrease in molecular weight probably accelerates this tendency. Thus, the 4-methyl-1-pentene polymer preferably has an iodine value in the range described above.

(B9) A 4-methyl-1-pentene polymer for use in the present invention preferably contains a n-decane soluble fraction in the range of 0.01% to 99% by weight, more preferably 0.01% to 80% by weight, still more preferably 0.01% to 40% by weight (based on 100% by weight of the 4-methyl-1-pentene polymer), at 10° C. Although a 4-methyl-1-pentene polymer having such a n-decane soluble fraction may be produced by thermal decomposition or in the presence of a Ziegler catalyst, it is preferably produced in the presence of a metallocene catalyst described below. The n-decane soluble fraction was measured by dissolving approximately 3 g of a 4-methyl-1-pentene polymer in 450 ml of n-decane at 145° C., cooling the solution to 10° C., removing a n-decane insoluble fraction by filtration, and recovering a n-decane soluble from the filtrate.

(B10) A 4-methyl-1-pentene polymer for use in the present invention preferably has a dyad isotacticity in the range of 70% to 99%, more preferably 80% to 99%, still more preferably 90% to 99%, particularly preferably 93% to 99%, as determined by $^{13}$C-NMR. Although a polymer having such a dyad isotacticity may be produced by the conventional thermal decomposition of a 4-methyl-1-pentene polymer, it is preferably obtained by producing a 4-methyl-1-pentene polymer in the presence of a Ziegler catalyst, such as a magnesium-compound-supported titanium catalyst, more preferably a metallocene catalyst described below. The dyad isotacticity was measured in the same way as in the first aspect of the present invention.

C. Resin Composition Containing 4-Methyl-1-Pentene Polymer

A resin composition containing a 4-methyl-1-pentene polymer contains 0.01 to 100 parts by mass, preferably 0.01 to 50 parts by mass, more preferably 0.01 to 20 parts by mass, particularly preferably 0.01 to 10 parts by mass, of a 4-methyl-1-pentene polymer (B-2) per 100 parts by mass of at least one resin (A) selected from the group consisting of thermoplastic resins and thermosetting resins.

3. Third Aspect of the Present Invention

A third aspect of the present invention will be described below.

4-Methyl-1-Pentene Polymer (B2) A 4-methyl-1-pentene polymer according to the present invention contains (A) 50% to 100% by weight of a constitutional unit derived from 4-methyl-1-pentene and (B) 0% to 50% by weight in total of constitutional units derived from at least one olefin selected from olefins having 2 to 20 carbon atoms other than 4-methyl-1-pentene.

A 4-methyl-1-pentene polymer according to the present invention contains preferably 60% to 100% by weight, more preferably 70% to 100% by weight, of a constitutional unit derived from 4-methyl-1-pentene and preferably 0% to 40% by weight, more preferably 0% to 30% by weight, in total of constitutional units derived from at least one olefin selected from olefins having 2 to 20 carbon atoms other than 4-methyl-1-pentene (the constitutional units of the 4-methyl-1-pentene polymer are 100% by weight in total).

Examples of the olefin having 2 to 20 carbon atoms other than 4-methyl-1-pentene for use in a 4-methyl-1-pentene polymer according to the present invention include straight- and branched-chain α-olefins, cyclic olefins, aromatic vinyl compounds, conjugated dienes, nonconjugated polyenes, and functionalized vinyl compounds.

More specifically, examples of the straight- and branched-chain α-olefins for use in a 4-methyl-1-pentene polymer according to the present invention include straight-chain α-olefins having 2 to 20, preferably 2 to 10, carbon atoms, such as ethylene, propylene, 1-butene, 1-pentene, 1-hexene, 1-octene, 1-decene, 1-dodecene, 1-tetradecene, 1-hexadecene, 1-octadecene, and 1-eicosene; and preferably 5 to 20, more preferably 5 to 10, carbon atoms, branched-chain α-olefins, such as 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, and 3-ethyl-1-hexene.

Examples of the cyclic olefins include cyclic olefins having 3 to 20, preferably 5 to 15, carbon atoms, such as cyclopentene, cycloheptene, norbornene, 5-methyl-2-norbornene, tetracyclododecene, and vinylcyclohexane.

Examples of the aromatic vinyl compounds include styrene and mono and polyalkylstyrenes, such as α-methylstyrene, o-methylstyrene, m-methylstyrene, p-methylstyrene, o,p-dimethylstyrene, o-ethylstyrene, m-ethylstyrene, and p-ethylstyrene.

Examples of the conjugated dienes include conjugated dienes having 4 to 20, preferably 4 to 10, carbon atoms, such as 1,3-butadiene, isoprene, chloroprene, 1,3-pentadien, 2,3-dimethylbutadiene, 4-methyl-1,3-pentadien, 1,3-pentadien, 1,3-hexadiene, and 1,3-octadiene.

Examples of the nonconjugated polyenes include nonconjugated polyenes having 5 to 20, preferably 5 to 10, carbon atoms, such as 1,4-pentadien, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene.

Examples of the functionalized vinyl compounds include olefins containing a hydroxy group, halogenated olefins, acrylic acid, propionic acid, unsaturated carboxylic acids, such as 3-butenoic acid, 4-pentenoic acid, 5-hexenoic acid, 6-heptenoic acid, 7-octenoic acid, 8-nonenoic acid, and 9-decenoic acid, unsaturated amines, such as allylamine, 5-hexeneamine, and 6-hepteneamine, unsaturated acid anhydrides, such as (2,7-octadienyl)succinic anhydride, pentapropenylsuccinic anhydride, and exemplary compounds of the unsaturated carboxylic acids described above in which the carboxy group was substituted by a carboxylic anhydride group, unsaturated carboxylic acid halides, such as exemplary compounds of the unsaturated carboxylic acids described above in which the carboxy group was substituted by a carboxylic acid halide group, and unsaturated epoxy compounds, such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene, and 11-epoxy-1-undecene.

The olefins containing a hydroxy group may be any olefin compounds containing a hydroxy group and include terminal hydroxylated olefin compounds. Specific examples of the terminal hydroxylated olefin compounds include straight-chain hydroxylated α-olefins having 2 to 20, preferably 2 to 10, carbon atoms, such as vinyl alcohol, allyl alcohol, hydroxylated-1-butene, hydroxylated-1-pentene, hydroxylated-1-hexene, hydroxylated-1-octene, hydroxylated-1-decene, hydroxylated-1-dodecene, hydroxylated-1-tetradecene, hydroxylated-1-hexadecene, hydroxylated-1-octadecene, and hydroxylated-1-eicosene; and preferably 5 to 20, more preferably 5 to 10, carbon atoms, branched-chain hydroxylated α-olefins, such as hydroxylated-3-methyl-1-butene, hydroxylated-4-methyl-1-pentene, hydroxylated-3-methyl-1-pentene, hydroxylated-3-ethyl-1-pentene, hydroxylated-4,4-dimethyl-1-pentene, hydroxylated-4-methyl-1-hexene, hydroxylated-4,4-dimethyl-1-hexene, hydroxylated-4-ethyl-1-hexene, and hydroxylated-3-ethyl-1-hexene.

Specific examples of the halogenated olefins include halogenated α-olefins having the group 17 atoms of the periodic table, such as chlorine, bromine, and iodine, for example, straight-chain halogenated α-olefins having 2 to 20, preferably 2 to 10, carbon atoms, such as halogenated vinyls, halogenated-1-butenes, halogenated-1-pentenes, halogenated-1-hexenes, halogenated-1-octenes, halogenated-1-decenes, halogenated-1-dodecenes, halogenated-1-tetradecenes, halogenated-1-hexadecenes, halogenated-1-octadecenes, and halogenated-1-eicosenes; and preferably 5 to 20, more preferably 5 to 10, carbon atoms, branched-chain halogenated α-olefins, such as halogenated-3-methyl-1-butenes, halogenated-4-methyl-1-pentenes, halogenated-3-methyl-1-pentenes, halogenated-3-ethyl-1-pentenes, halogenated-4,4-dimethyl-1-pentenes, halogenated-4-methyl-1-hexenes, halogenated-4,4-dimethyl-1-hexenes, halogenated-4-ethyl-1-hexenes, and halogenated-3-ethyl-1-hexenes.

The olefins to be used in combination with 4-methyl-1-pentene may be used alone or in combination. In particular, the olefins to be suitably used in combination with 4-methyl-1-pentene include ethylene, propylene, 1-butene, 1-pentene, 1-hexene, 3-methyl-1-butene, 3-methyl-1-pentene, 3-ethyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, vinylcyclohexane, and styrene.

(B1) A 4-methyl-1-pentene polymer according to the present invention has an intrinsic viscosity [η] of 0.01 or more but less than 0.50 dl/g, preferably in the range of 0.02 to 0.45 dl/g, more preferably 0.03 to 0.40 dl/g, measured at 135° C. in a decalin solvent. A 4-methyl-1-pentene polymer having such an intrinsic viscosity [η] can be produced by controlling the hydrogen supply, the type of catalyst, and the polymerization temperature in polymerization in the same way as in the first aspect of the present invention.

A 4-methyl-1-pentene polymer having an intrinsic viscosity [η] in this range has excellent mold releasability as a resin modifier, is well dispersed in resin, and exerts a small influence on dynamic physical properties.

(B3) A 4-methyl-1-pentene polymer according to the present invention has a ratio (Mw/Mn) of weight-average molecular weight (Mw) to number-average molecular weight (Mn) in the range of 1.0 to 5.0, preferably 1.0 to 4.5, more preferably 1.0 to 4.0, particularly preferably 1.0 to 3.5, as determined by gel permeation chromatography (GPC). Mw/Mn within the range described above allows reduction in the amount of components in a low-molecular-weight region of the molecular weight distribution. Such a 4-methyl-1-pentene polymer used as a resin modifier can reduce the stickiness of a formed product. Mw/Mn within the range described above also allows reduction in the amount of high-molecular-weight components. Such a 4-methyl-1-pentene polymer can be well dispersed in a formed product and exert a smaller influence on dynamic properties. A polymer having such a molecular weight distribution can be produced by thermal decomposition of a polymer having a wide molecular weight distribution, if necessary, followed by solvent fractionation. Preferably, a polymer having such a molecular weight distribution can be produced in the presence of a metallocene catalyst described below to produce a 4-methyl-1-pentene polymer.

(B6) A 4-methyl-1-pentene polymer according to the present invention has a relationship expressed by the following formula (I) between molecular weight and intrinsic viscosity.

$$A \leq 0.2 \times [\eta]^{(-1.5)} \quad (I)$$

wherein A denotes the percentage (% by mass) of a component having a polystyrene equivalent molecular weight of 1,000 or less in the 4-methyl-1-pentene polymer as measured by gel permeation chromatography (GPC), and $[\eta]$ denotes the intrinsic viscosity (dl/g) of the 4-methyl-1-pentene polymer measured at 135° C. in a decalin solvent.

A 4-methyl-1-pentene polymer that satisfies the condition expressed by the formula (I) has high blocking resistance. A 4-methyl-1-pentene polymer blended with another resin can improve the mold releasability of a formed product without impairing the dynamic properties of the formed product. A 4-methyl-1-pentene polymer that satisfies the condition expressed by the formula (I) can be produced by primarily removing components having a molecular weight of 1,000 or less, for example, by solvent fractionation and can preferably be produced in the presence of a metallocene catalyst described below. Use of a metallocene catalyst described below tends to yield a polymer having a narrow molecular weight distribution, often yielding a polymer that satisfies the formula (I) without using solvent fractionation.

In general, in the shape processing of a thermoplastic resin that contains a 4-methyl-1-pentene polymer having a low intrinsic viscosity as a resin modifier, the 4-methyl-1-pentene polymer having a lower molecular weight in a molten state is expected to be localized in the vicinity of inner walls of a forming machine, such as a screw, a barrel, and a die, to reduce shear acting on the inner walls. When the localized state is maintained also in a solidification process of a formed product in a die, the 4-methyl-1-pentene polymer tends to exist in the surface layer of the formed product, thereby improving the mold releasability of the formed product. In contrast to the improvement in mold releasability, however, the 4-methyl-1-pentene polymer itself may be adhered to each other or may impair the dynamic physical properties of a formed product. In some cases, a formed product has insufficient mold releasability.

As a result of investigations, the present inventors found that the proportion of components having a molecular weight of 1,000 or less in a 4-methyl-1-pentene polymer is very important in terms of intrinsic viscosity. Although a detailed mechanism for that is not clear, components having a molecular weight of 1,000 or less in a 4-methyl-1-pentene polymer are probably particularly sticky. It is therefore presumed that a 4-methyl-1-pentene polymer cannot produce sufficient mold releasability as a resin modifier when the proportion of components having a molecular weight of 1,000 or less exceeds a certain value. At such a proportion, it is also presumed that a 4-methyl-1-pentene polymer itself tends to be adhered to each other. Components having a particularly low molecular weight, for example, as low as 1,000 or less are also presumed to cause deterioration in dynamic physical properties. In particular, the effects of components having a molecular weight of 1,000 or less tend to increase with a decrease in the molecular weight of a (B) 4-methyl-1-pentene polymer.

The formula (I) defines the allowable percentage of components having a molecular weight of 1,000 or less in consideration of the effects of the molecular weight of a (B) 4-methyl-1-pentene polymer.

(B4) A 4-methyl-1-pentene polymer according to the present invention preferably has a melting point (Tm) in the range of 120° C. to 245° C., more preferably 130° C. to 240° C., still more preferably 140° C. to 235° C., as measured with a differential scanning calorimeter. A 4-methyl-1-pentene polymer having a melting point (Tm) in this range has an excellent balance between molding processability when used as a resin modifier and blocking resistance during the storage of the 4-methyl-1-pentene polymer. In the case that the 4-methyl-1-pentene polymer is a 4-methyl-1-pentene homopolymer, the melting point depends on the number-average molecular weight (Mn). For example, the melting point of a 4-methyl-1-pentene homopolymer can be decreased by decreasing the molecular weight of the 4-methyl-1-pentene homopolymer. In the case that the 4-methyl-1-pentene polymer is a copolymer of 4-methyl-1-pentene and an olefin having 2 to 20 carbon atoms, the melting point of the 4-methyl-1-pentene polymer depends on the number-average molecular weight (Mn) and can be controlled by the ratio of the olefin having 2 to 20 carbon atoms to 4-methyl-1-pentene in polymerization and the type of the olefin. For example, the melting point of the resulting polymer can be decreased by increasing the ratio of the olefin to 4-methyl-1-pentene.

The melting point was measured by the method described in the first aspect of the present invention.

(B5) A 4-methyl-1-pentene polymer for use in the present invention preferably has a critical surface tension in the range of 22 to 28 mN/m, more preferably 23 to 27.5 mN/m, still more preferably 24 to 27.5 mN/m, particularly preferably 24.5 to 27.5 mN/m. A 4-methyl-1-pentene polymer having a critical surface tension in this range can impart excellent mold releasability to a formed product. Such a critical surface tension depends on the 4-methyl-1-pentene constitutional unit in the 4-methyl-1-pentene polymer. In order to achieve the suitable critical surface tension described above, the amount of 4-methyl-1-pentene ranges from 50% to 100% by weight, preferably 60% to 100% by weight, more preferably 70% to 100% by weight, particularly preferably 80% to 100% by weight.

(B7) A 4-methyl-1-pentene polymer according to the present invention preferably has 0.001 to 100, more preferably 0.001 to 0.5, still more preferably 0.001 to 0.4, particularly preferably 0.001 to 0.3, terminal double bonds per 1000 carbon atoms in the 4-methyl-1-pentene polymer as determined by $^1$H-NMR. Although such a number of terminal double bonds can be formed by thermal decomposition, they can preferably be formed by producing a 4-methyl-1-pentene polymer in the presence of a Ziegler catalyst, more preferably a metallocene catalyst described below.

(B8) A 4-methyl-1-pentene polymer according to the present invention preferably has an iodine value in the range of 0.001 to 180 g/100 g, more preferably 0.001 to 0.9 g/100 g, still more preferably 0.001 to 0.7 g/100 g, particularly preferably 0.001 to 0.5 g/100 g.

Although a polymer having such an iodine value may be produced by the conventional thermal decomposition of a 4-methyl-1-pentene polymer, it is more preferably produced by the polymerization of 4-methyl-1-pentene in the presence of a metallocene catalyst described below.

The iodine value of a 4-methyl-1-pentene polymer was measured in the same way as in the first aspect of the present invention.

Since a 4-methyl-1-pentene polymer according to the present invention tends to be localized on the surface, a large number of double bonds probably result in deterioration in the quality of the 4-methyl-1-pentene polymer owing to oxygen in the air. A decrease in molecular weight probably accelerates this tendency. Thus, the 4-methyl-1-pentene polymer preferably has an iodine value in the range described above.

(B9) A 4-methyl-1-pentene polymer according to the present invention preferably contains a n-decane soluble fraction in the range of 0.01% to 99% by weight, more preferably 0.01% to 80% by weight, still more preferably 0.01% to 40% by weight (based on 100% by weight of the 4-methyl-1-pentene polymer), at 10° C. Although a 4-methyl-1-pentene polymer having such a n-decane soluble fraction may be produced by thermal decomposition or in the presence of a Ziegler catalyst, it is preferably produced in the presence of a metallocene catalyst described below. The n-decane soluble fraction was measured by dissolving approximately 3 g of a 4-methyl-1-pentene polymer in 450 ml of n-decane at 145° C., cooling the solution to 10° C., removing a n-decane insoluble fraction by filtration, and recovering a n-decane soluble from the filtrate.

(B10) A 4-methyl-1-pentene polymer according to the present invention preferably has a dyad isotacticity in the range of 70% to 99%, more preferably 80% to 99%, still more preferably 90% to 99%, particularly preferably 93% to 99%, as determined by $^{13}$C-NMR. Although a polymer having such a dyad isotacticity may be produced by the conventional thermal decomposition of a 4-methyl-1-pentene polymer, it is preferably obtained by producing a 4-methyl-1-pentene polymer in the presence of a Ziegler catalyst, such as a magnesium-compound-supported titanium catalyst, more preferably a metallocene catalyst described below. The dyad isotacticity was measured in the same way as in the first aspect of the present invention.

4. Method for Producing 4-Methyl-1-Pentene Polymer

Methods for producing the 4-methyl-1-pentene polymers described in the first, second, and third aspects of the present invention will be described below.

The 4-methyl-1-pentene polymers described in the first, second, and third aspects of the present invention may be produced by direct polymerization of olefins or thermal decomposition of a high-molecular-weight 4-methyl-1-pentene polymer. 4-methyl-1-pentene polymers thus produced may be purified by solvent fractionation utilizing a difference in solubility in solvent or molecular distillation utilizing a difference in boiling point.

The production of a 4-methyl-1-pentene polymer for use in the present invention suitably includes the use of conventionally known catalysts, for example, magnesium-supported titanium catalysts described in Japanese Unexamined Patent Application Publication No. 57-63310, Japanese Unexamined Patent Application Publication No. 58-83006, Japanese Unexamined Patent Application Publication No. 3-706, Japanese Patent No. 3476793, Japanese Unexamined Patent Application Publication No. 4-218508, and Japanese Unexamined Patent Application Publication No. 2003-105022 and metallocene catalysts described in International Publication WO 01/53369, International Publication WO 01/27124, Japanese Unexamined Patent Application Publication No. 3-193796, and Japanese Unexamined Patent Application Publication No. 02-41303. The magnesium-supported titanium catalyst is particularly preferably a magnesium-supported titanium catalyst containing a polyether as an electron donor component because a polymer having a relatively narrow molecular weight distribution tends to be obtained.

A metallocene catalyst is preferably used in the third aspect of the present invention.

The metallocene catalyst is suitably an olefin polymerization catalyst containing a metallocene compound having the following general formula (1) or (2).

[Formula 2]

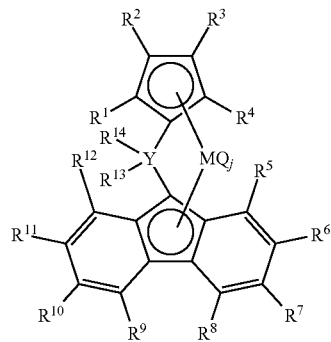

(1)

[Formula 3]

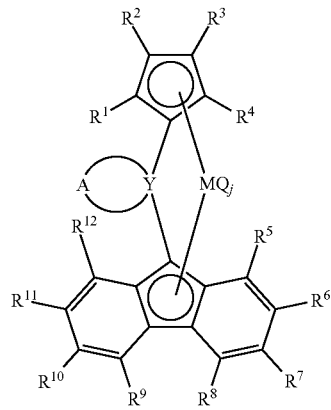

(2)

wherein $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ are selected from hydrogen, hydrocarbon groups, and hydrocarbon groups containing silicon and may be the same or different from each other. The adjacent substituents $R^1$ to $R^4$ may be bonded to each other to form a ring. The adjacent substituents $R^5$ to $R^{12}$ may be bonded to each other to form a ring. A denotes a bivalent hydrocarbon group having 2 to 20 carbon atoms and may contain an unsaturated bond and/or an aromatic ring. A may contain two or more ring structures, including a ring formed by A and Y. M denotes a metal selected from the group 4 elements of the periodic table. Y denotes carbon or silicon. Q denotes halogen, a hydrocarbon group, an anion ligand, or a neutral ligand to which lone-pair electrons can coordinate. Qs may be the same or different from each other. j denotes an integer in the range of 1 to 4.

$R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ in the general formula (1) or (2) are selected from hydrogen, hydrocarbon groups, and hydrocarbon groups containing silicon and may be the same or different from each other.

Examples of the hydrocarbon groups preferably include alkyl groups having 1 to 20 carbon atoms, arylalkyl groups having 7 to 20 carbon atoms, aryl groups having 6 to 20 carbon atoms, and alkylaryl groups having 7 to 20 carbon atoms. The hydrocarbon groups may have one or more ring structures. Specific examples of the hydrocarbon groups include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, 1-methyl-1-cyclohexyl, 1-adamantyl, 2-adamantyl, 2-methyl-2-adamantyl, menthyl, norbornyl, benzyl, 2-phenylethyl, 1-tetrahydronaphthyl, 1-methyl-1-tetrahydronaphthyl, phenyl, naphthyl, and tolyl.

The hydrocarbon groups containing silicon are preferably alkylsilyl or arylsilyl groups each having 1 to 4 silicon atoms and 3 to 20 carbon atoms and specifically include trimethylsilyl, tert-butyldimethylsilyl, and triphenylsilyl. Preferably, $R^1$ and $R^3$ denote hydrogen, and $R^2$ denotes a hydrocarbon group or a hydrocarbon group containing silicon. More preferably, $R^2$ denotes a bulky substituent. Particularly preferably, $R^2$ denotes a substituent having 4 or more carbon atoms.

The adjacent substituents $R^5$ to $R^{12}$ on the fluorene ring may be bonded to each other to form a ring. Examples of such a substituted fluorenyl group include benzofluorenyl, dibenzofluorenyl, octahydrodibenzofluorenyl, and octamethyloctahydrodibenzofluorenyl.

The substituents $R^5$ to $R^{12}$ on the fluorene ring preferably display bilateral symmetry, that is, $R^5=R^{12}$, $R^6=R^{11}$, $R^7=R^{10}$, and $R^8=R^9$ in terms of ease with which the metallocene compound can be synthesized. Unsubstituted fluorene, 3,6-disubstituted fluorene, 2,7-disubstituted fluorene, or 2,3,6,7-tetrasubstituted fluorene is more preferred. The positions 3, 6, 2, and 7 on the fluorene ring correspond to $R^7$, $R^{10}$, $R^6$, and $R^{11}$, respectively.

$R^{13}$ and $R^{14}$ in the general formula (1) are selected from hydrogen and hydrocarbon groups and may be the same or different. Preferred specific examples of the hydrocarbon groups include those described above.

Y denotes carbon or silicon. In the general formula (1), $R^{13}$ and $R^{14}$ are bonded to Y to form a substituted methylene group or a substituted silylene group as a cross-link. Preferred specific examples include methylene, dimethylmethylene, diisopropylmethylene, methyl tert-butylmethylene, dicyclohexylmethylene, methylcyclohexylmethylene, methylphenylmethylene, diphenylmethylene, methylnaphthylmethylene, dinaphthylmethylene, dimethylsilylene, diisopropylsilylene, methyl tert-butylsilylene, dicyclohexylsilylene, methylcyclohexylsilylene, methylphenylsilylene, diphenylsilylene, methylnaphthylsilylene, and dinaphthylsilylene.

In the general formula (2), Y is bonded to A to form a cycloalkylidene group or a cyclomethylenesilylene group. A is a bivalent hydrocarbon group having 2 to 20 carbon atoms and may contain an unsaturated bond and/or an aromatic ring. Preferred specific examples of the cycloalkylidene group or the cyclomethylenesilylene group include cyclopropylidene, cyclobutylidene, cyclopentylidene, cyclohexylidene, cycloheptylidene, bicyclo[3.3.1]nonylidene, norbornylidene, adamantylidene, tetrahydronaphthylidene, dihydroindanylidene, cyclodimethylenesilylene, cyclotrimethylenesilylene, cyclotetramethylenesilylene, cyclopentamethylenesilylene, cyclohexamethylenesilylene, and cycloheptamethylenesilylene.

M in the general formulae (1) and (2) denotes a metal selected from the group 4 elements of the periodic table. Examples of M include titanium, zirconium, and hafnium.

Q denotes halogen, a hydrocarbon group having 1 to 20 carbon atoms, an anion ligand, or a neutral ligand to which lone-pair electrons can coordinate. Qs may be the same or different from each other. Specific examples of halogen include fluorine, chlorine, bromine, and iodine. Specific examples of the hydrocarbon group include those described above. Specific examples of the anion ligand include alkoxy groups, such as methoxy, tert-butoxy, and phenoxy, carboxylate groups, such as acetates and benzoates, and sulfonate groups, such as mesylates and tosylates. Specific examples of the neutral ligand to which lone-pair electrons can coordinate include organophosphorus compounds, such as trimethylphosphine, triethylphosphine, triphenylphosphine, and diphenylmethylphosphine, and ethers, such as tetrahydrofuran, diethyl ether, dioxane, and 1,2-dimethoxyethane. Qs may be the same or different from each other. Preferably, at least one of Qs is halogen or an alkyl group.

Specific examples of the metallocene compound in the present invention suitably include compounds described in International Publication No. WO 01/27124. However, these compounds do not limit the scope of the present invention.

Among these compounds, metallocene compounds having the general formula (1) are preferred in terms of molecular weight distribution and terminal structure.

In the production of a 4-methyl-1-pentene polymer in the presence of a metallocene catalyst in the present invention, the components of the catalyst are at least one compound selected from (i) metallocene compounds having the general formula (1) or (2), (ii) (ii-1) organometallic compounds, (ii-2) organic aluminum oxy compounds, and (ii-3) compounds that can react with the metallocene compounds (I) to form an ion pair, and, if necessary, (iii) a fine particle carrier.

The components of the catalyst can be used as a polymerization catalyst by a generally known method, for example, a method described in International Publication No. WO 01/27124.

In the present invention, polymerization can be performed by a liquid-phase polymerization method, such as solution polymerization or suspension polymerization, or a gas-phase polymerization method. In the liquid-phase polymerization method, an inert hydrocarbon solvent may be used. Specific examples of the inert hydrocarbon solvent includes aliphatic hydrocarbons, such as propane, butane, pentane, hexane, heptane, octane, decane, dodecane, and kerosene; alicyclic hydrocarbons, such as cyclopentane, cyclohexane, and methylcyclopentane; aromatic hydrocarbons, such as benzene, toluene, and xylene; halogenated hydrocarbons, such as ethylene chloride, chlorobenzene, and dichloromethane; and mixtures thereof. Olefins including 4-methyl-1-pentene to be polymerized can be used as solvents.

In polymerization, the amount of component (i) generally ranges from $10^{-8}$ to $10^{-2}$ mole, preferably $10^{-7}$ to $10^{-3}$ mole, per liter of reaction volume.

The amount of the component (ii-1) is such that the molar ratio [(ii-1)/M] of the component (ii-1) to a transition metal atom (M) in the component (i) generally ranges from 0.01 to 5000, preferably 0.05 to 2000. The amount of the component (ii-2) is such that the molar ratio [(ii-2)/M] of an aluminum atom in the component (ii-2) to a transition metal atom (M) in the component (i) generally ranges from 10 to 5000, preferably 20 to 2000. The amount of the component (ii-3) is such that the molar ratio [(ii-3)/M] of the component (ii-3) to a transition metal atom (M) in the component (i) generally ranges from 1 to 10, preferably 1 to 5.

The temperature of polymerization of an olefin using such an olefin polymerization catalyst generally ranges from −50° C. to 400° C., preferably 10° C. to 300° C., more preferably 10° C. to 250° C. An excessively low polymerization temperature results in a decrease in polymerization activity per unit catalyst and is therefore industrially unfavorable.

The polymerization pressure generally ranges from normal pressure to a gauge pressure of 10 MPa, preferably normal pressure to a gauge pressure of 5 MPa. The polymerization reaction can be performed by a batch, semicontinuous, or continuous process. The polymerization can also be performed in two or more stages under different reaction conditions.

In the polymerization, hydrogen can be added to control the molecular weight or intrinsic viscosity [η] of a product polymer or polymerization activity. The appropriate amount of hydrogen ranges from approximately 0.001 to 100,000 NL per kg of olefin.

When a 4-methyl-1-pentene polymer for use in the present invention is produced by polymerization, different types of 4-methyl-1-pentene polymers can be produced by adjusting the amounts of 4-methyl-1-pentene and olefin having 2 to 20 carbon atoms to be charged, the type of polymerization catalyst, the polymerization temperature, or the amount of hydrogen to be added in polymerization and thereby controlling the melting point, stereoregularity, molecular weight, or intrinsic viscosity [η]. When a 4-methyl-1-pentene polymer for use in the present invention is produced by thermal decomposition, the temperature and time of decomposition of a 4-methyl-1-pentene polymer base can be controlled to obtain the intended molecular weight and intrinsic viscosity [η].

5. Other Components of Resin Composition Containing 4-Methyl-1-Pentene Polymer in First and Second Aspects of the Present Invention If necessary, a resin composition containing a 4-methyl-1-pentene polymer according to the present invention may contain an effective amount of any additive agent without compromising the objects and advantages of the present invention. Examples of the additive agent include a flame retardant, such as brominated bisphenols, brominated epoxy resins, brominated polystyrenes, brominated polycarbonates, triphenyl phosphate, phosphonic amide, and red phosphorus, a flame retardant aid, such as antimony trioxide and sodium antimonate, a heat stabilizer, such as phosphate and phosphite, an antioxidant, such as hindered phenols, a heat-resistant agent, a weathering agent, a light stabilizer, a mold-release agent, a flow modifier, a colorant, a pigment, a lubricant, an antistatic agent, a nucleating agent, a plasticizer, and a foaming agent. A resin composition containing a 4-methyl-1-pentene polymer according to the present invention may also contain a known wax or a known mold-release agent, such as a silicone-modified polyolefin wax, a silicone-polyethylene block copolymer, or a silicone mold-release agent. The amounts of these components preferably range from 0% to 50% by weight, more preferably 0% to 10% by weight, particularly preferably 0% to 5% by weight.

A propylene resin composition (Y) containing a 4-methyl-1-pentene polymer that contains the propylene resin composition (X) as the resin (A) may contain another polymer as an optional component without compromising the objects of the present invention. The amount of the optional polymer is preferably, but not limited to, in the range of approximately 0.1 to 30 parts by weight per 100 parts by weight of the propylene resin composition (X) in the propylene resin composition (Y) containing a 4-methyl-1-pentene polymer according to the present invention.

Preferably, the optional polymer is an ethylene polymer or copolymer mainly composed of ethylene (51% by mole or more). The ethylene polymer or copolymer improves the flexibility and the low-temperature characteristics of the propylene resin composition (Y) containing a 4-methyl-1-pentene polymer.

If necessary, the propylene resin composition (Y) containing a 4-methyl-1-pentene polymer that contains the propylene resin composition (X) as the resin (A) may contain an additive agent, such as a weathering stabilizer, a heat stabilizer, an antistatic agent, an anti-slip agent, an anti-blocking agent, an anti-fogging agent, a nucleating agent, a lubricant, a pigment, a dye, a plasticizer, an age resister, a hydrochloric acid absorbent, an antioxidant, and/or a copper inhibitor, without compromising the objects of the present invention.

6. Method for Producing Resin Composition Containing 4-Methyl-1-Pentene Polymer in First and Second Aspects of the Present Invention A method for producing a resin composition containing a 4-methyl-1-pentene polymer according to the present invention may be any method. For example, the resin (A), the 4-methyl-1-pentene polymer (B-1) or (B-2), and other optional components are appropriately mixed simultaneously or in any order in a tumbler, a V-type blender, a Nauta mixer, a Banbury mixer, a kneading roll, or a single- or twin-screw extruder.

When the propylene resin composition (X) is used as the resin (A), a propylene resin composition (Y) containing a 4-methyl-1-pentene polymer preferably contains 0.01 to 10 parts by mass, more preferably 0.1 to 7 parts by mass, still more preferably 0.2 to 5 parts by mass, of the 4-methyl-1-pentene polymer (B-1) or (B-2) per 100 parts by weight of the propylene resin composition (X).

The mixture of the propylene resin composition (X) and the 4-methyl-1-pentene polymer (B-1) or (B-2) may be of any form. A preferred embodiment is a mixture of the propylene resin composition (X) and the 4-methyl-1-pentene polymer (B-1) or (B-2) in a solid form (generally referred to as "dry blend") or in a melt-blended form, produced by the methods described above. The melt-blended form also includes blending the 4-methyl-1-pentene polymer (B-1) or (B-2) in the production of the propylene resin composition (X) from a propylene polymer (A-1) and a propylene polymer (A-1) or (A-2) to produce a propylene resin composition (Y) containing a 4-methyl-1-pentene polymer simultaneously with the production of the propylene resin composition (X).

7. Masterbatch for use in Production of 4-Methyl-1-Pentene Polymer Composition

In the present invention, a 4-methyl-1-pentene resin composition according to the present invention is generally produced by mixing the resin (A) and the 4-methyl-1-pentene polymer (B-1) or (B-2) in a single step. However, when the resin (A) and the 4-methyl-1-pentene polymer (B-1) or (B-2) have a large difference in molecular weight or melt viscosity at the forming temperature, or when the amount of 4-methyl-1-pentene polymer (B-1) or (B-2) is small, the 4-methyl-1-pentene polymer (B-1) or (B-2) may be insufficiently dispersed in the resin (A). Thus, the performance expected as the effects of the addition of the 4-methyl-1-pentene polymer (B-1) or (B-2), such as improvement in mold releasability, is sometimes insufficient with respect to the amount of the 4-methyl-1-pentene polymer (B-1) or (B-2). The production of a 4-methyl-1-pentene resin composition by mixing the resin (A) and the 4-methyl-1-pentene polymer (B-1) or (B-2) in a single step as described above may cause fluctuations in the discharge rate of a forming machine, raising problems with productivity. In the above-mentioned method, a well-shaped raw material resin, such as pellets, can be transported pneumatically or by suction through a pipe into a mixer or an extruder hopper. A low-molecular-weight component may alter the shape and may be fused, stick, or adhere to the inner wall of the pipe.

In accordance with a production method preferred in such a case, a masterbatch that contains the resin (A) and the 4-methyl-1-pentene polymer (B-1) or (B-2) such that the ratio of the 4-methyl-1-pentene polymer (B-1) or (B-2) to the resin (A) is higher than the ratio in the final composition, that is, a 4methyl-1-pentene polymer composition according to the present invention, is prepared in advance, and then an additional resin (A) and the masterbatch are mixed to produce a 4-methyl-1-pentene polymer composition according to the present invention.

The masterbatch preferably contains 1 to 900 parts by mass, preferably 3 to 300 parts by mass, more preferably 5 to 100 parts by mass, particularly preferably 5 to 50 parts by mass, of the 4-methyl-1-pentene polymer (B-1) per 100 parts by mass of the resin (A).

The masterbatch contains 1 to 900 parts by mass, preferably 3 to 300 parts by mass, more preferably 5 to 100 parts by mass, particularly preferably 5 to 50 parts by mass, of the 4-methyl-1-pentene polymer (B-2) per 100 parts by mass of the resin (A).

As a matter of course, a masterbatch according to the present invention may contain components such as the known additive agents described above.

Such a masterbatch can be produced by a known mixing method using a tumbler, a mixer, a blender, a roll, or an extruder, as described above. A 4-methyl-1-pentene polymer composition can also be produced from the resin (A) and the masterbatch in the same way.

8. Other Components of 4-Methyl-1-Pentene Polymer in Third Aspect of the Present Invention If necessary, a 4-methyl-1-pentene polymer according to the third aspect of the present invention may contain an effective amount of any additive agent without compromising the objects and advantages of the present invention. Examples of the additive agent include a flame retardant, such as brominated bisphenols, brominated epoxy resins, brominated polystyrenes, brominated polycarbonates, triphenyl phosphate, phosphonic amide, and red phosphorus, a flame retardant aid, such as antimony trioxide and sodium antimonate, a heat stabilizer, such as phosphate and phosphite, an antioxidant, such as hindered phenols, a heat-resistant agent, a weathering agent, a light stabilizer, a mold-release agent, a flow modifier, a colorant, a pigment, a lubricant, an antistatic agent, a nucleating agent, a plasticizer, and a foaming agent.

9. Uses and Formed Products

A formed product of the resin composition containing a 4-methyl-1-pentene polymer in the first and second aspects of the present invention is produced from the resin composition containing a 4-methyl-1-pentene polymer by a known forming method, such as an extrusion molding method, an injection molding method, a solution casting method, or an inflation molding method, particularly preferably an extrusion molding method. A formed product of a resin composition containing a 4-methyl-1-pentene polymer according to the present invention generally has a shape of a sheet, a film, a pipe, a tube, a profile for a window frame or a housing material, or a laminate, preferably a sheet, a film, a pipe, or a tube, particularly preferably a sheet or a film. A formed product of a resin composition containing a 4-methyl-1-pentene polymer according to the present invention is also preferably a product formed by primary forming, such as extrusion molding, injection molding, or solution casting, followed by blow molding or drawing. For film or sheet products, preferably, a resin composition containing a 4-methyl-1-pentene polymer is formed into a sheet, for example, by a T-die extrusion molding method, and the sheet is uniaxially or biaxially stretched.

These films are preferably used to make the best use of their high melting point. More specifically, the films may be semiconductor process films.

The films and sheets formed of a resin composition containing a 4-methyl-1-pentene polymer are also preferably used to make the best use of their mold releasability. More specifically, the films may be used as adhesive films that include a known adhesive layer on the films. Examples of the adhesive layer include an acrylic adhesive layer, an ester adhesive layer, an olefin adhesive layer, and a urethane adhesive layer. These adhesive layers can contain a material having suitable adhesion to a base material of interest.

Other uses include polarizing plate protective films and flat-panel display (FPD) protective films. These protective films have a multilayer structure composed of a protective layer for a polarizing plate or a FPD, the adhesive layer described above, and a 4-methyl-1-pentene polymer film.

A formed product formed of the propylene resin composition (Y) containing a 4-methyl-1-pentene polymer that contains the propylene resin composition (X) as the resin (A) can be produced by directly forming the propylene resin composition (Y) containing a 4-methyl-1-pentene polymer or adding the 4-methyl-1-pentene polymer during forming the propylene resin composition (X) (for example, the 4-methyl-1-pentene polymer is fed into a forming machine (extruder) during forming the propylene resin composition (X) in the forming machine (extruder)).

A method for processing the formed product of a propylene resin composition (Y) containing a 4-methyl-1-pentene polymer is preferably a method for forming a propylene resin composition (Y) containing a 4-methyl-1-pentene polymer in a molten state involving a shear and/or uniaxial, biaxial, or planar elongational flow. Although any known method may be used, specific examples of the forming method primarily involving a shear flow include known forming methods, such as extrusion molding, injection molding, and melt-blown molding. Specific examples of the forming method primarily involving a uniaxial, biaxial, or planar elongational flow include known forming methods, such as T-die (film) molding, blow molding, and drawing. The molten state, as used herein, refers to the range of the melting point of the composition X or more but less than 350° C., preferably 170° C. to 350° C.

Since the propylene resin composition (X) is thermodynamically incompatible with a 4-methyl-1-pentene polymer, the 4-methyl-1-pentene polymer is probably localized on the surface of the formed product. Because of the effects of a 4-methyl-1-pentene polymer (B) having high heat resistance and low tackiness, the stickiness of the formed product is reduced under various environments from room temperature to high temperatures.

Preferred embodiments of a formed product produced using the propylene resin composition (Y) containing a 4-methyl-1-pentene polymer as a resin composition containing a 4-methyl-1-pentene polymer include a sheet, a film, a pipe and tube, a bottle, a fiber, and a tape. Representative examples of the uses of these formed products include, but are not limited to, the following.

Cap liners, gaskets, glass interliners, doors, doorframes, window frames, cornices, baseboards, open frames, flooring, ceiling materials, wallpaper, stationery, office supplies, non-slip sheets, building skin materials, pipes, electric wires, sheaths, wire harnesses, protective film adhesive layers, hot-melt adhesive materials, sanitary goods, medical bags and tubes, nonwoven fabrics, elastic materials, fibers, shoe soles, shoe midsoles, insoles, soles, sandals, packaging films, sheets, food packaging films (outer layers, inner layers, sealants, monolayers), stretch films, plastic wraps, dishes, retort pouches, oriented films, and gas-permeable films.

In the third aspect of the present invention, a 4-methyl-1-pentene polymer according to the present invention is used as a resin having high transparency, gas permeability, chemical resistance, and releasability, as well as excellent mold releasability and heat resistance, in various fields, such as medical devices, heat-resistant wires, heat-proof dishes, and releasing materials.

A 4-methyl-1-pentene polymer according to the present invention can be used for formed products, such as films, bottles, and cases, as a thermoplastic or thermosetting resin composition in which the 4-methyl-1-pentene polymer is blended with a thermoplastic or thermosetting resin, providing excellent mold releasability and water repellency. In injection molding, a 4-methyl-1-pentene polymer according to the present invention can provide excellent metal mold releasability.

EXAMPLES

While the present invention will now be more specifically described in the following examples, the present invention is not limited to these examples.

In the present invention and examples, unless otherwise specified, properties are measured in the following manner.
Composition Compositions were determined by $^{13}$C-NMR spectrum analysis.
Intrinsic Viscosity Intrinsic viscosities were measured in a decalin solvent at 135° C. The specific viscosity ηsp of approximately 20 mg of a sample dissolved in 15 ml of decalin was measured in an oil bath at 135° C. After the decalin solution was diluted with 5 ml of the decalin solvent, the specific viscosity ηsp was measured in the same manner. This dilution was performed twice. ηsp/C extrapolated to a concentration (C) of 0 was determined as the intrinsic viscosity.

$$[\eta]=\lim(\eta sp/C)(C \to 0 \text{ [molecular weight]})$$

Molecular Weight Distribution

The ratio (Mw/Mn) of weight-average molecular weight (Mw) to number-average molecular weight (Mn) was determined by GPC measurement under the following conditions. The weight-average molecular weight and the number-average molecular weight were determined by the following conversion method using a calibration curve, which was prepared with a commercially available monodisperse standard polystyrene.

Apparatus: Gel permeation chromatograph Alliance GPC2000 (manufactured by Waters Co.)
Solvent: o-dichlorobenzene
Column: TSK-gel column (manufactured by Tosoh Co.)×4
Flow rate: 1.0 ml/min
Sample: 0.15 mg/mL o-dichlorobenzene solution
Temperature: 140° C.
Molecular weight conversion: PS equivalent/general-purpose calibration The coefficient of the Mark-Houwink viscosity equation described below was used in the calculation of the general-purpose calibration.

The coefficient for polystyrene (PS): KPS=1.38×10$^{-4}$, aPS=0.70

The coefficient for polyethylene (PE): KPE=5.06×10$^{-4}$, aPE=0.70
Melting Point (4-methyl-1-pentene polymer)

The melting point was measured with a differential scanning calorimeter (DSC) by increasing the temperature of approximately 5 mg of a sample in an aluminum pan to 280° C., holding at 280° C. for five minutes, cooling the sample to 30° C. at 10° C./min, holding at 30° C. for five minutes, and then increasing the temperature at 10° C./min, during which an endothermic peak was measured as a melting point.
Critical Surface Tension The contact angle was measured with an image processing, solid-liquid interface analysis system (Dropmaster 500 manufactured by Kyowa Interface Science Co., Ltd.) at 23° C. and 50% RH. Four liquid mixtures for a wetting tension test having a known surface tension (ethylene glycol monoethyl ether/formamide, surface tension: 31, 34, 37, and 40 mN/m) were dropped on a test sample. The measurement was performed for five test samples. The mean value of the measurements was calculated. Points (5 or more) defined by cos θ calculated from the contact angle θ (Y-axis) and the surface tensions of the test liquid mixtures (X-axis) were plotted on the X-Y coordinates. The surface tension (X-axis) corresponding to a point of intersection between a straight line obtained from these points by the least squares method and cos θ=1 was determined as a critical surface tension (mN/m).

The test samples used for the measurement of critical surface tension were prepared as described below. The critical surface tension of each test sample was measured.

A 4-methyl-1-pentene polymer was cast on a SUS plate. In the casting, the 4-methyl-1-pentene polymer was melted on the SUS plate at 250° C. for five minutes in a nitrogen atmosphere and was then cooled to normal temperature to be solidified. The critical surface tension of this test sample was measured.

The measurement of the critical surface tension was performed on a chill-rolled surface of a film sample.
Number of Terminal Double Bonds The terminal double bonds of a 4-methyl-1-pentene polymer according to the present invention are classified into vinyl, vinylidene, disubstituted internal olefin, and trisubstituted internal olefin double bonds. The total amount of the terminal double bonds is determined by $^1$H-NMR.

In the $^1$H-NMR measurement of a 4-methyl-1-pentene polymer, two (H1) of three proton peaks derived from the vinyl group are observed in the range of approximately 4.8 to 5.0 ppm, and the remaining one proton peak (H1') is observed in the range of approximately 5.7 to 5.9 ppm.

Two proton peaks (H2) derived from the vinylidene group are observed at approximately 4.7 ppm.

Two proton peaks (H3) derived from the disubstituted internal olefin are observed in the range of approximately 5.2 to 5.4 ppm. One proton peak (H4) derived from the trisubstituted internal olefin is observed in the range of approximately 5.0 to 5.2 ppm.

The number of terminal double bonds L (/1000 carbon atoms) is calculated by L=[2×(H1+H1')+3×(H2+H3)+6×H4]×1000/3Ha, wherein Ha denotes the integrated value of all the protons.

After 20 mg of a sample was completely dissolved in approximately 0.5 ml of deuterated o-dichlorobenzene in an NMR sample tube (5 mmϕ), $^1$H-NMR was measured at 120° C. with a JNM-ECX400P nuclear magnetic resonance spectrometer manufactured by JEOL Ltd.

Mold Releasability (Examples 20 to 22 and Reference Examples to 8)

Three parts by mass of a 4-methyl-1-pentene polymer was mixed (dry-blended) with 100 parts by mass of a polypropylene resin (Prime Polypro F113G, manufactured by Prime Polymer Co., Ltd., polypropylene homopolymer, melt flow rate=3 g/10 minutes). The mixture was then extruded with a 20 mmϕ single-screw extruder equipped with a T-die having a lip width of 240 mm (manufactured by Tanaka Iron Works Co., Ltd.). A molten mixture was extruded from the T-die at a cylinder temperature of 230° C. and a die temperature of 230° C. The extrudate was then taken up at a chill-roll temperature of 40° C. and a take-up speed of 1.0 m/min to produce a cast film having a thickness of 50 μm.

A hundred parts by mass of a polyamide resin (Amilan CM1041LO, manufactured by Toray Industries, Inc.) mixed (dry-blended) with 10 parts by mass of a 4-methyl-1-pentene polymer was directly fed into a hopper of a 20 mmϕ single-screw extruder equipped with a T-die having a lip width of 240 mm (manufactured by Tanaka Iron Works Co., Ltd.). A molten mixture was extruded from the T-die at a cylinder temperature of 300° C. and a die temperature of 300° C. The extrudate was then taken up at a chill-roll temperature of 40° C. and a take-up speed of 1.0 m/min to produce a cast film having a thickness of 50 μm.

In accordance with JIS Z1707, two film samples having a width of 15 mm were cut from the cast film and were superposed such that non-chill-rolled surfaces of the film samples face each other. Heat seal was performed with a heat sealer manufactured by Tester Sangyo Co., Ltd. at a sealing temperature of 170° C. for a polypropylene resin film or 230° C. for a polyamide resin film, at a sealing width of 5 mm, for a sealing time of 1.0 s, at a sealing pressure of 0.2 MPa, and at a lower bar temperature of 70° C. The heat-seal strength (N/15 mm) was then measured at 23° C. and a test speed of 300 mm/min with a five-head universal testing machine manufactured by Intesco Co., Ltd.

The mold releasability for polypropylene and polyamide was assessed in accordance with the criteria described below.

Mold Releasability for Polypropylene
The heat-seal strength of a polypropylene resin film is
Excellent: less than 0.3 N/15 mm
Fair: 0.3 or more but less than 1.0 N/15 mm
Poor: 1.0 N/15 mm or more Mold Releasability for Polyamide
The heat-seal strength of a polyamide resin film is
Excellent: less than 1.5 N/15 mm
Fair: 1.5 or more but less than 3.0 N/15 mm
Poor: 3.0 N/15 mm or more Blocking Resistance A 4-methyl-1-pentene polymer was pulverized in a small mill and was placed at 40° C. under a load of 400 g/cm$^2$ for 24 hours to evaluate blocking.

The blocking resistance is
Excellent: easily broken by hand
Fair: not easily but forcibly broken by hand
Poor: not broken even forcibly by hand Low-Temperature Mold Releasability In accordance with ASTM D1893, two 10 cm×15 cm film samples were superposed such that a chill-rolled surface of one film faces a surface of the other film opposite a chill-rolled surface of the other film. The laminate was aged at 50° C. under a load of 40 kg for three days. The peel strength (mN/cm) was then measured at 23° C. and a test speed of 200 mm/min with a peel tester manufactured by Intesco Co., Ltd.

High-Temperature Mold Releasability

In accordance with JIS Z1707, two film samples having a width of 15 mm were superposed such that non-chill-rolled surfaces of the film samples face each other, and were heat-sealed with a heat sealer manufactured by Tester Sangyo Co., Ltd. at a sealing temperature of 140° C. (Examples 13 to 17 and Comparative Example 9), 170° C. (Examples 1 to 9 and Comparative Examples 1 to 6), or 190° C. and 230° C. (Examples 10 to 12, Reference Examples 1 to 4, and Comparative Examples 7 and 8), at a sealing width of 5 mm, for a sealing time of 1.0 s, at a sealing pressure of 0.2 MPa, and at a lower bar temperature of 70° C. The heat-seal strength (N/15 mm) was measured at 23° C. and a test speed of 300 mm/min with a five-head universal testing machine manufactured by Intesco Co., Ltd.

Total Haze (Examples 1 to 9 and Comparative Examples 1 to 6)

The total hazes of films having the same thickness were measured in accordance with JIS K7105.

Tensile Strength

The tensile yield stress was measured in a tensile test at 23° C. and a speed of 200 mm/min in accordance with JIS K6781.

Film Appearance

The film appearance was visually inspected and evaluated in accordance with the following criteria.
Good: transparent and uniform
Poor: opaque or streaks B Value The B value was determined through $^{13}$C-NMR spectrum analysis by a method described in Japanese Unexamined Patent Application Publication No. 2007-186664.

Stereoregularity (mm or mmmm)

Stereoregularity was determined by $^{13}$C-NMR spectrum analysis.

The isotactic triad fraction (mm) was determined by the method described in International Publication WO 2004-087775 on page 21 line 7 to page 26 line 6.

The isotactic pentad fraction (mmmm) was calculated by the method described in a prior publication (Japanese Unexamined Patent Application Publication No. 2003-147135).

Melting Point and Glass Transition Temperature (Propylene Polymer)

On the basis of an exothermic/endothermic curve of DSC, Tm was defined as the temperature of the maximum melting peak during heating. A sample in an aluminum pan was (i) heated to 200° C. at 100° C./min and held at 200° C. for five minutes, (ii) cooled to −50° C. at 20° C./min, and then (iii) heated to 200° C. at 20° C./min. The exothermic/endothermic curve thus obtained was analyzed.

Shore A Hardness

After heating a sample with a hydraulic heat press set (100 μm Lumirror (a PET film) was used as a mold-releasing film in press forming) at 190° C. for five minutes, the sample was pressed at 10 MPa for 2 minutes and cooled at 20° C. at a pressure of 10 MPa for four minutes to form a sheet having a predetermined thickness. After the sheet was aged at room temperature for 72 hours, a needle of an A-type measuring instrument was pushed against the sheet, and the instrument was immediately read (in accordance with ASTM D-2240). The thickness of the sheet was 2 mm for the propylene polymer (A) and the propylene resin composition (X) and 1 mm for the propylene resin composition (Y) as described in the example.

Melt Flow Rate (MFR)

The MFR was measured at 190° C. or 230° C. under a load of 2.16 kg in accordance with ASTM D-1238.

Transparency (Internal Haze, Total Haze, and Light Transmittance) (Examples 18 and 19 and Comparative Examples 10 to 17)

The amount of diffuse transmission light and the total amount of transmitted light of a sheet having a thickness of 2 mm for the propylene resin composition (X) and a sheet having a thickness of 1 mm for the propylene resin composition (Y) as described in the example were measured in a cyclohexanol solution with a digital turbidimeter "NDH-2000" manufactured by Nippon Denshoku Industries Co., Ltd. using a C light source. The hazes were calculated by using the following equations.

Internal haze=100×(Amount of diffuse transmission light)/(Total amount of transmitted light)

Total haze=100×(Amount of diffuse transmission light)/(Total amount of transmitted light)

Total transmittance=100×(Total amount of transmitted light)/(Amount of incident light)

Tackiness

First, an extruded sheet (having a thickness of 1 mm) formed by the method described in the example was cut into a sample having a length of 120 mm (in the MD direction) and a width of 12.7 mm. Samples were superposed such that the same sides of the samples face each other. The resulting specimen was placed under a load of 2.5 kgf for 24 hours (processing temperature=23° C., 50° C.). After the specimen was left to stand at 23° C. for one day under no load, the peel strength of the specimen was measured (T-peel, peel rate=200 mm/min).

Adhesive Mold Releasability

An acrylic adhesive tape (manufactured by Nitto Denko Co., No. 31B) was attached to a surface of a film opposite a chill-rolled surface of the film by moving a 2-kg hand rubber roller back and forth twice on the film. The film was cut into a piece having a width of 25 mm and was aged at 23° C. for one hour. The 180° peel strength (N/50 mm) was then measured at 23° C. and a test speed of 300 mm/min with a peel tester manufactured by Intesco Co., Ltd.

Examples of First and Second Aspects of the Present Invention

Synthesis Example 1

Synthesis of 4-Methyl-1-Pentene Polymer (1-b)

A 500 ml side-arm flask was charged with 150 g of a 4-methyl-1-pentene polymer (DX820 manufactured by Mitsui Chemicals, Inc.) and was heated to 360° C. on a sand bath while nitrogen was passed through the flask. After the polymer on the wall of the flask was melted, the temperature was held at this temperature for two hours while stirring to thermally decompose the 4-methyl-1-pentene polymer. Cooling to normal temperature yielded a pyrolysate of the 4-methyl-1-pentene polymer. The pyrolysate had an intrinsic viscosity $[\eta]$ of 0.17 dl/g and Mw=21700, Mn=4840, and Mw/Mn=4.48, as determined by GPC. The percentage A (% by mass) of a component having a polystyrene equivalent molecular weight of 1000 or less in the polymer was 3.94, and the number of terminal double bonds was 3.6/1000 carbon atoms. Table 1 shows the properties of the pyrolysate.

Synthesis Example 2

Synthesis of 4-Methyl-1-Pentene Polymer (2-b)

Preparation of Catalyst Solution

A glass flask sufficiently purged with nitrogen was charged with 0.5 µmol isopropyl(3-t-butyl-5-methylcyclopentadienyl) (3,6-di-t-butylfluorenyl)zirconium dichloride and then 0.25 mmol (in terms of Al atom) of a solution of MMAO manufactured by Tosoh Finechem Co. (product name MMAO-3A) in hexane as a promoter to prepare a catalyst solution.

Polymerization

A glass autoclave having an internal volume of one liter equipped with a stirrer and sufficiently purged with nitrogen was charged with 400 ml of decane and 100 ml of 4-methyl-1-pentene and was left to stand at 30° C. for 10 minutes while hydrogen (six liter/h) was passed through the autoclave. 0.25 mmol triisobutylaluminum and then the catalyst solution prepared as described above were added to the autoclave to initiate polymerization. After the polymerization was performed at atmospheric pressure and 30° C. for one hour while hydrogen (six liter/h) was continuously supplied, a small amount of methanol was added to terminate the polymerization. The polymer solution was poured into four liter of a methanol/acetone mixture (volume ratio 4/1), and the polymer was recovered by filtration. The polymer was dried at 80° C. under reduced pressure for 10 hours, yielding 15.5 g of the polymer. The polymer had an intrinsic viscosity $[\eta]$ of 0.08 dl/g and Mw=9040, Mn=4650, and Mw/Mn=1.94, as determined by GPC. The percentage A (% by mass) of a component having a polystyrene equivalent molecular weight of 1000 or less in the polymer was 1.37, and the number of terminal double bonds was 0.1/1000 carbon atoms. Table 1 shows the properties of the polymer.

Synthesis Example 3

Synthesis of 4-Methyl-1-Pentene Polymer (3-b)

Preparation of Catalyst Solution

A glass flask sufficiently purged with nitrogen was charged with 1 µmol isopropyl(3-t-butyl-5-methylcyclopentadienyl) (3,6-di-t-butylfluorenyl)zirconium dichloride and then 0.5 mmol (in terms of Al atom) of a solution of MMAO manufactured by Tosoh Finechem Co. (product name MMAO-3A) in hexane as a promoter to prepare a catalyst solution.

Polymerization

A glass autoclave having an internal volume of one liter equipped with a stirrer and sufficiently purged with nitrogen was charged with 561 ml of decane, 180 ml of 4-methyl-1-pentene, and Dialen D168 (registered trademark) (9 ml) and was left to stand at 30° C. for 10 minutes while hydrogen (six liter/h) was passed through the autoclave. Dialen D168 is a mixture of high-purity hexadecene and octadecene, manufactured by Mitsubishi Chemical Co. 0.375 mmol triisobutylaluminum and then the catalyst solution prepared as described above were added to the autoclave to initiate polymerization.

After the polymerization was performed at atmospheric pressure and 30° C. for one hour while hydrogen (six liter/h) was continuously supplied, a small amount of methanol was added to terminate the polymerization. The polymer solution was poured into four liter of a methanol/acetone mixture (volume ratio 4/1), and the polymer was recovered by filtration. The polymer was dried at 80° C. under reduced pressure for 10 hours, yielding 37.6 g of the polymer. The polymer had an intrinsic viscosity [η] of 0.13 dl/g and Mw=15900, Mn=4010, and Mw/Mn=3.97, as determined by GPC. The percentage A (% by mass) of a component having a polystyrene equivalent molecular weight of 1000 or less in the polymer was 2.86, and the number of terminal double bonds was 0.2/1000 carbon atoms. Table 1 shows the properties of the polymer.

Synthesis Example 4

Synthesis of 4-Methyl-1-Pentene Polymer (4-b)

An olefin polymerization catalyst that contains a known magnesium-compound-supported titanium catalyst component was used to copolymerize 4-methyl-1-pentene with 1-decene, yielding a 4-methyl-1-pentene polymer (4-b). Table 1 shows the analysis results and properties of the 4-methyl-1-pentene polymer produced in the present synthesis example.

sui Chemicals, Inc.) and was heated to 360° C. on a sand bath while nitrogen was passed through the flask. After the polymer on the wall of the flask was melted, the temperature was held at this temperature for two hours while stirring to thermally decompose the 4-methyl-1-pentene polymer. Cooling to normal temperature yielded a pyrolysate of the 4-methyl-1-pentene polymer. Table 1 shows the analysis results and properties of the 4-methyl-1-pentene polymer produced in the present synthesis example.

Synthesis Example 6

Synthesis of 4-Methyl-1-Pentene Polymer (6-b)

A 500 ml side-arm flask was charged with 150 g of a 4-methyl-1-pentene polymer (DX820 manufactured by Mitsui Chemicals, Inc.) and was heated to 375° C. on a sand bath while nitrogen was passed through the flask. After the polymer on the wall of the flask was melted, the temperature was held at this temperature for two hours while stirring to thermally decompose the 4-methyl-1-pentene polymer. Cooling to normal temperature yielded a pyrolysate of the 4-methyl-1-pentene polymer. Table 1 shows the analysis results and properties of the 4-methyl-1-pentene polymer produced in the present synthesis example.

TABLE 1

Properties of 4-methyl-1-pentene polymers

| | Synthesis example 1 1-b | Synthesis example 2 2-b | Synthesis example 3 3-b | Synthesis example 4 4-b | Synthesis example 5 5-b | Synthesis example 6 6-b |
|---|---|---|---|---|---|---|
| Composition | 4MP1 component 95.9 wt %, C10 component 4.1 wt % | 4MP1 component 100 wt % | 4MP1 component 93.5 wt %, C16 and C18 components 6.5 wt % | 4MP1 component 97.5 wt %, C10 component 2.5 wt % | 4MP1 component 86.1 wt %, C16 and C18 components 13.9 wt % | 4MP1 component 92.2 wt %, C10 component 7.8 wt % |
| [η]dL/g | 0.17 | 0.08 | 0.13 | 1.14 | 0.10 | 0.08 |
| Mn | 4840 | 4650 | 4010 | 76300 | 2440 | 1860 |
| Mw | 21700 | 9040 | 15900 | 272000 | 10200 | 7160 |
| Mw/Mn | 4.48 | 1.94 | 3.97 | 3.56 | 4.18 | 3.85 |
| Melting point (° C.) | 217 | 212 | 192 | 231 | 195 | 192 |
| Critical surface tension (mN/m) | 25.4 | 26.8 | 27.0 | 24.0 | 25.1 | 26.3 |
| $0.2 \times [\eta]^{(-1.5)}$ | 2.85 | 8.52 | 4.27 | 0.16 | 6.32 | 8.84 |
| A value | 3.94 | 1.37 | 2.86 | 0 | 8.34 | 13.35 |
| Number of terminal double bonds (/1000 carbon atoms) | 3.6 | 0.1 | 0.2 | 0.2 | 5.7 | 8.2 |

Table 1 shows the analysis results and properties of the 4-methyl-1-pentene polymer produced in the present synthesis example.

Synthesis Example 5

Synthesis of 4-Methyl-1-Pentene Polymer (5-b)

A 500 ml side-arm flask was charged with 150 g of a 4-methyl-1-pentene polymer (DX310 manufactured by Mit-

Synthesis Example 7

Synthesis of Propylene Polymer (a-1-1)

16.4% by mole ethylene, 77.7% by mole propylene, 5.9% by mole 1-butene, and diphenylmethylene(3-tert-butyl-5-ethylcyclopentadienyl) (2,7-di-tert-butylfluorenyl)zirconium dichloride/methylaluminoxane (manufactured by Tosoh Finechem Co., 0.3 mmol in terms of aluminum) as a polymerization catalyst/promoter, prepared by the method described in Japanese Unexamined Patent Application Publication No. 2007-186664 were polymerized in a hexane solution in continuous polymerization facilities to produce a propylene polymer (a-1-1), which was a propylene-ethylene-α-olefin copolymer. Table 5 shows physical properties.

Synthesis Example 8

Synthesis of Propylene Polymer (a-1-2)

A propylene polymer (a-1-2), which was a propylene-ethylene-α-olefin copolymer, was produced in the same manner as in Synthesis Example 1 except that 13.7% by mole ethylene, 67.0% by mole propylene, and 19.3% by mole 1-butene were used. Table 5 shows physical properties.

Example 1

Ninety-five parts by mass of a polypropylene resin (Prime Polypro J106G, manufactured by Prime Polymer Co., Ltd., polypropylene homopolymer, melt flow rate=15 g/10 minutes) and five parts by mass of a 4-methyl-1-pentene polymer (1-b) were melt-kneaded at 240° C. with a twin-screw extruder (intermeshing counter-rotating twin-screw, manufactured by Haake) to produce masterbatch pellets of a polypropylene/4-methyl-1-pentene polymer. The melt flow rate was measured at a temperature of 230° C. under a load of 2.16 kg in accordance with ASTM D1238.

Ten parts by mass of the masterbatch pellets were then mixed (dry-blended) with 90 parts by mass of a polypropylene resin (Prime Polypro B221WA, manufactured by Prime Polymer Co., Ltd., random polypropylene, melt flow rate=0.5 g/10 minutes). The resulting mixture was then melt-kneaded in a 20 mmφ single-screw extruder (manufactured by Tanaka Iron Works Co., Ltd.) equipped with a T-die having a lip width of 240 mm at a cylinder temperature of 210° C., a die temperature of 210° C., and a screw speed of 25 rpm to extrude a molten mixture from the T-die. The extrudate was then taken up at a chill-roll temperature of 20° C. and a take-up speed of 1.0 m/min to produce a cast film having a thickness of 50 μm.

The physical properties of a film thus formed were measured and shown in Table 2.

Example 2

A cast film was produced in the same way as in Example 1 except that 20 parts by mass of the masterbatch pellets formed in Example 1 were mixed (dry-blended) with 80 parts by mass of the polypropylene resin (Prime Polypro B221WA, manufactured by Prime Polymer Co., Ltd., random polypropylene, melt flow rate=0.5 g/10 minutes).

The physical properties of a film thus formed were measured and shown in Table 2.

Example 3

Ninety parts by mass of a polypropylene resin (Prime Polypro J702, manufactured by Prime Polymer Co., Ltd., block polypropylene, melt flow rate=2 g/10 minutes) and 10 parts by mass of a 4-methyl-1-pentene polymer (2-b) were melt-kneaded at 270° C. with a twin-screw extruder (intermeshing counter-rotating twin-screw, manufactured by Haake) to produce masterbatch pellets of a polypropylene/4-methyl-1-pentene polymer. The melt flow rate was measured at a temperature of 230° C. under a load of 2.16 kg in accordance with ASTM D1238.

Only the polypropylene resin (Prime Polypro J702, manufactured by Prime Polymer Co., Ltd., block polypropylene, melt flow rate=2 g/10 minutes) was then melt-kneaded at 270° C. in a twin-screw extruder (intermeshing counter-rotating twin-screw, manufactured by Haake) in the same way as described above to produce masterbatch pellets of polypropylene alone.

Ten parts by mass of the masterbatch pellets of the polypropylene/4-methyl-1-pentene polymer were then mixed (dry-blended) with 90 parts by mass of the masterbatch pellets of polypropylene alone. The resulting mixture was then melt-kneaded in a 20 mmφ single-screw extruder (manufactured by Tanaka Iron Works Co., Ltd.) equipped with a T-die having a lip width of 240 mm at a cylinder temperature of 230° C., a die temperature of 230° C., and a screw speed of 25 rpm to extrude a molten mixture from the T-die. The extrudate was then taken up at a chill-roll temperature of 40° C. and a take-up speed of 1.0 m/min to produce a cast film having a thickness of 50 μm.

The physical properties of a film thus formed were measured and shown in Table 2.

Example 4

A cast film was formed in the same manner as in Example 3 except that the forming temperature (the cylinder temperature and the die temperature) was 270° C. The cast film was subjected to the same tests. Table 2 shows the results.

Example 5

A cast film was formed in the same manner as in Example 4 except that the forming speed (take-up speed) was 2.0 m/min. The cast film was subjected to the same tests. Table 2 shows the results.

Example 6

A cast film was formed in the same manner as in Example 3 except that (3-b) was used as the 4-methyl-1-pentene polymer. The cast film was subjected to the same tests. Table 2 shows the results.

Example 7

A cast film was formed in the same way as in Example 6 except that the forming temperature (the cylinder temperature and the die temperature) was 270° C. The cast film was subjected to the same tests. Table 2 shows the results.

Example 8

A cast film was formed in the same way as in Example 7 except that 70 parts by mass of the masterbatch pellets of PP alone produced in Example 3 were mixed (dry-blended) with 30 parts by mass of masterbatch pellets of a polypropylene/4-methyl-1-pentene polymer. The cast film was subjected to the same tests. Table 2 shows the results.

Example 9

Ninety-nine parts by mass of the polypropylene resin (Prime Polypro J702, manufactured by Prime Polymer Co., Ltd., block polypropylene, melt flow rate=2 g/10 minutes) mixed (dry-blended) with one part by mass of a 4-methyl-1-pentene polymer (3-b) was directly fed into a hopper of a 20 mmφ single-screw extruder equipped with a T-die having a lip width of 240 mm (manufactured by Tanaka Iron Works Co., Ltd.). A molten mixture was extruded from the T-die at a cylinder temperature of 230° C., a die temperature of 230° C., and a screw speed of 25 rpm. The extrudate was then taken up at a chill-roll temperature of 40° C. and a take-up speed of 1.0 m/min to produce a cast film having a thickness of 50 μm. Table 2 shows the results.

Comparative Example 1

The polypropylene resin (Prime Polypro B221WA, manufactured by Prime Polymer Co., Ltd., random polypropylene, melt flow rate=0.5 g/10 minutes) was melt-kneaded in a 20 mmφ single-screw extruder equipped with a T-die having a lip width of 240 mm (manufactured by Tanaka Iron Works Co., Ltd.) at a cylinder temperature of 210° C., a die temperature of 210° C., and a screw speed of 25 rpm to extrude a molten mixture from the T-die. The extrudate was then taken up at a chill-roll temperature of 20° C. and a take-up speed of 1.0 m/min to produce a cast film having a thickness of 50 p.m. Table 2 shows the results.

Comparative Example 2

A cast film was formed in the same manner as in Example 3 except that the 4-methyl-1-pentene polymer was not used. The cast film was subjected to the same tests. Table 2 shows the results.

Comparative Example 3

99.8 parts by mass of the polypropylene resin (Prime Polypro J702, manufactured by Prime Polymer Co., Ltd., block polypropylene, melt flow rate=2 g/10 minutes) and 0.2 parts by mass of an anti-blocking agent (silica) were melt-kneaded at 270° C. in a twin-screw extruder (intermeshing counter-rotating twin-screw, manufactured by Haake) to form masterbatch pellets. The melt flow rate was measured at a temperature of 230° C. under a load of 2.16 kg in accordance with ASTM D1238.

The masterbatch pellets were then melt-kneaded in a 20 mmφ single-screw extruder equipped with a T-die having a lip width of 240 mm (manufactured by Tanaka Iron Works Co., Ltd.) at a cylinder temperature of 230° C., a die temperature of 230° C., and at a screw speed of 25 rpm to extrude a molten mixture from the T-die. The extrudate was then taken up at a chill-roll temperature of 40° C. and a take-up speed of 1.0 m/min to produce a cast film having a thickness of 50 μm.

The physical properties of a film thus formed were measured and shown in Table 2.

Comparative Example 4

A cast film was formed in the same manner as in Comparative Example 3 except that the anti-blocking agent (silica) was replaced with a lubricant (erucamide). The cast film was subjected to the same tests. Table 2 shows the results.

Comparative Example 5

A cast film was formed in the same manner as in Comparative Example 4 except that the polypropylene resin was 99.5 parts by mass and the lubricant (erucamide) was 0.5 parts by mass. The cast film was subjected to the same tests. Table 2 shows the results.

The extrusion molding produced surging and oily smoke or malodor.

Comparative Example 6

Comparative Example 6 was the same as Comparative Example 4 except that the polypropylene resin was 99 parts by mass and the lubricant (erucamide) was 1 part by mass. The extrusion molding considerably produced surging and oily smoke or malodor and was difficult to perform. Table 2 shows the results.

TABLE 2

| | Physical properties of films | | | | | | | | |
| --- | --- | --- | --- | --- | --- | --- | --- | --- | --- |
| | Example 1 | Example 2 | Example 3 | Example 4 | Example 5 | Example 6 | Example 7 | Example 8 | Example 9 |
| Type of resin | 1-a | 1-a | 2-a | 2-a | 2-a | 2-a | 2-a | 2-a | 2-a |
| Mold-release additive | 1-b | 1-b | 2-b | 2-b | 2-b | 3-b | 3-b | 3-b | 3-b |
| Addition method | MB | MB | MB | MB | MB | MB | MB | MB | DB |
| Amount [wt %] | 0.5 | 1 | 1 | 1 | 1 | 1 | 1 | 3 | 1 |
| Forming temperature [° C.] | 210 | 210 | 230 | 270 | 270 | 230 | 270 | 270 | 230 |
| Forming speed [m/min] | 1 | 1 | 1 | 1 | 2 | 1 | 1 | 1 | 1 |
| Critical surface tension [mN/m] | 26.4 | 26.0 | 25.8 | 24.4 | 24.8 | 26.4 | 24.4 | 24.2 | 26.7 |
| Low-temperature mold releasability [mN/cm] | 0.69 | 0.64 | 2.2 | 3.1 | 3.8 | 2.5 | 2.4 | 1.5 | 4.0 |
| High-temperature mold releasability [N/15 mm] 170° C. | — | — | 1.3 | 0.7 | 1.4 | 3.9 | 1.1 | 0.2 | 4.9 |
| Total haze [%] | — | — | 79 | 79 | 78 | 79 | 78 | 79 | 79 |

TABLE 2-continued

| Physical properties of films | | | | | | | | | |
|---|---|---|---|---|---|---|---|---|---|
| Tensile strength [MPa] | — | — | 17/16 | 17/16 | 17/17 | 17/16 | 17/16 | 16/16 | 17/16 |

| | Comparative example 1 | Comparative example 2 | Comparative example 3 | Comparative example 4 | Comparative example 5 | Comparative example 6 |
|---|---|---|---|---|---|---|
| Type of resin | 1-a | 2-a | 2-a | 2-a | 2-a | 2-a |
| Mold-release additive | None | None | Silica | Erucamide | Erucamide | Erucamide |
| Addition method | — | — | MB | MB | MB | MB |
| Amount [wt %] | — | — | 0.2 | 0.2 | 0.5 | 1 |
| Forming temperature [° C.] | 210 | 230 | 230 | 230 | 230 | 230 |
| Forming speed [m/min] | 1 | 1 | 1 | 1 | 1 | 1 |
| Critical surface tension [mN/m] | 27.2 | 27.9 | 27.0 | 27.0 | 27.4 | — |
| Low-temperature mold releasability [mN/cm] | 0.72 | 5.2 | 4.3 | 4.6 | 2.6 | — |
| High-temperature mold releasability [N/15 mm] 170° C. | — | 17.1 | 17.3 | 17.5 | 17.4 | — |
| Total haze [%] | — | 79 | 78 | 78 | 78 | — |
| Tensile strength [MPa] | — | 17/16 | 17/16 | 17/16 | 17/16 | — |

1-a: random polypropylene resin
2-a: block polypropylene resin
Forming temperature: cylinder temperature and die temperature
Forming speed: take-up speed
MB: masterbatch
DB: dry blend In Comparative Example 5, extrusion molding produced surging and oily smoke or a malodor.
In Comparative Example 6, extrusion molding considerably produced surging and oily smoke or a malodor and was difficult to perform.

Example 10

Ninety-seven parts by mass of the polyamide resin (Amilan CM1041LO, manufactured by Toray Industries, Inc., melting point 225° C.) mixed (dry-blended) with three parts by mass of the 4-methyl-1-pentene polymer (1-b) was directly supplied into a hopper of a 20 mmφ single-screw extruder equipped with a T-die having a lip width of 240 mm (manufactured by Tanaka Iron Works Co., Ltd.). A molten mixture was extruded from the T-die at a cylinder temperature of 300° C., a die temperature of 300° C., and a screw speed of 25 rpm. The extrudate was then taken up at a chill-roll temperature of 40° C. and a take-up speed of 1.0 m/min to produce a cast film having a thickness of 50 μm.
The physical properties of a film thus formed were measured and shown in Table 3.

Example 11

A cast film was formed in the same way as in Example 10 except that 90 parts by mass of the polyamide resin (Amilan CM1041LO, manufactured by Toray Industries, Inc., melting point 225° C.) was mixed (dry-blended) with 10 parts by mass of the 4-methyl-1-pentene polymer (1-b).
The physical properties of a film thus formed were measured and shown in Table 3.

Example 12

A cast film was formed in the same way as in Example 10 except that 90 parts by mass of the polyamide resin (Amilan CM1041LO, manufactured by Toray Industries, Inc., melting point 225° C.) was mixed (dry-blended) with 10 parts by mass of the 4-methyl-1-pentene polymer (2-b).
The physical properties of a film thus formed were measured and shown in Table 3.

Reference Example 1

A cast film was formed in the same way as in Example 10 except that 97 parts by mass of the polyamide resin (Amilan CM1041LO, manufactured by Toray Industries, Inc., melting point 225° C.) was mixed (dry-blended) with 3 parts by mass of the 4-methyl-1-pentene polymer (4-b).
The physical properties of a film thus formed were measured and shown in Table 3.

Reference Example 2

A cast film was formed in the same way as in Example 10 except that 90 parts by mass of the polyamide resin (Amilan CM1041LO, manufactured by Toray Industries, Inc., melting point 225° C.) was mixed (dry-blended) with 10 parts by mass of the 4-methyl-1-pentene polymer (4-b).

The physical properties of a film thus formed were measured and shown in Table 3.

Reference Example 3

A cast film was formed in the same way as in Example 10 except that 80 parts by mass of the polyamide resin (Amilan CM1041LO, manufactured by Toray Industries, Inc., melting point 225° C.) was mixed (dry-blended) with 20 parts by mass of the 4-methyl-1-pentene polymer (4-b).

The physical properties of a film thus formed were measured and shown in Table 3.

Reference Example 4

A cast film was formed in the same way as in Example 10 except that 60 parts by mass of the polyamide resin (Amilan CM1041LO, manufactured by Toray Industries, Inc., melting point 225° C.) was mixed (dry-blended) with 40 parts by mass of the 4-methyl-1-pentene polymer (4-b).

The physical properties of a film thus formed were measured and shown in Table 3.

Comparative Example 7

The polyamide resin (Amilan CM1041LO, manufactured by Toray Industries, Inc., melting point 225° C.) was melt-kneaded in a 20 mmφ single-screw extruder equipped with a T-die having a lip width of 240 mm (manufactured by Tanaka Iron Works Co., Ltd.) at a cylinder temperature of 300° C., a die temperature of 300° C., and a screw speed of 25 rpm to extrude a molten mixture from the T-die. The extrudate was then taken up at a chill-roll temperature of 40° C. and a take-up speed of 1.0 m/min to produce a cast film having a thickness of 50 μm.

The physical properties of a film thus formed were measured and shown in Table 3.

Comparative Example 8

Comparative Example 8 was the same as Example 10 except that 40 parts by mass of the polyamide resin (Amilan CM1041LO, manufactured by Toray Industries, Inc., melting point 225° C.) was mixed (dry-blended) with 60 parts by mass of the 4-methyl-1-pentene polymer (4-b). However, a uniform film could not be formed. Thus, the critical surface tension and the high-temperature mold releasability could not be evaluated.

Table 3 shows the results.

Reference Examples 1 to 4 comply with the second aspect of the present invention.

TABLE 3

| | Example 10 | Example 11 | Example 12 | Reference example 1 | Reference example 2 | Reference example 3 | Reference example 4 | Comparative example 7 | Comparative example 8 |
|---|---|---|---|---|---|---|---|---|---|
| Type of resin | 3-a | 3-a | 3-a | 3-a | 3-a | 3-a | 3-a | 3-a | 3-a |
| Mold-release additive | 1-b | 1-b | 2-b | 4-b | 4-b | 4-b | 4-b | None | 4-b |
| Addition method | DB | DB | DB | DB | DB | DB | DB | — | DB |
| Amount [wt %] | 3 | 10 | 10 | 3 | 10 | 20 | 40 | — | 60 |
| Forming temperature [° C.] | 300 | 300 | 300 | 300 | 300 | 300 | 300 | 300 | 300 |
| Forming speed [m/min] | 1 | 1 | 1 | 1 | 1 | 1 | 1 | 1 | 1 |
| Critical surface tension [mN/m] | 29.8 | 29.2 | 29.9 | 23.3 | 22.9 | 22.8 | 22.5 | 40.5 | — |
| High-temperature mold releasability [N/15 mm] 190° C. | 0.4 | 0 | 0 | 0.1 | 0 | 0 | 0 | 0.5 | — |
| High-temperature mold releasability [N/15 mm] 230° C. | 18 | 2.0 | 1.0 | 9.2 | 0.5 | 0.2 | 0.1 | 23 | — |
| Film appearance | Good | Good | Good | Good | Good | Good | Good | Good | Poor |

3-a: polyamide resin
Forming temperature: cylinder temperature and die temperature
Forming speed: take-up speed
MB: masterbatch
DB: dry blend In Comparative Example 8, a uniform film could not be formed, and the critical surface tension and the high-temperature mold releasability could not be evaluated Example 13

Ninety parts by mass of a low-density polyethylene resin (Novatec LD LC600A, manufactured by Japan polyethylene Co., melt flow rate=7 g/10 minutes) and 10 parts by mass of the 4-methyl-1-pentene polymer (3-b) were melt-kneaded at 230° C. in a twin-screw extruder (co-rotating twin screw KZW-15, manufactured by Technovel Co.) to produce masterbatch pellets of a low-density polyethylene/4-methyl-1-pentene polymer. The melt flow rate was measured at a temperature of 190° C. under a load of 2.16 kg in accordance with ASTM D1238.

Ten parts by mass of the masterbatch pellets were then mixed (dry-blended) with 90 parts by mass of the low-density polyethylene resin (Novatec LD LC600A, manufactured by Japan polyethylene Co., melt flow rate=7 g/10 minutes). The resulting mixture was then fed to a 20 mmϕ single-screw extruder (manufactured by Tanaka Iron Works Co., Ltd.) equipped with a T-die having a lip width of 240 mm at a cylinder temperature of 230° C. and a die temperature of 230° C. to extrude a molten mixture from the T-die. The extrudate was then taken up at a chill-roll temperature of 40° C. and a take-up speed of 1.5 m/min to produce a cast film having a thickness of 50 μm.

The physical properties of a film thus formed were measured and shown in Table 4.

Example 14

Masterbatch pellets of a low-density polyethylene/4-methyl-1-pentene polymer were formed in the same manner as in Example 13 except that (5-b) was used as the 4-methyl-1-pentene polymer. Ten parts by mass of the masterbatch pellets were mixed (dry-blended) with 90 parts by mass of the low-density polyethylene resin (Novatec LD LC600A, manufactured by Japan polyethylene Co., melt flow rate=7 g/10 minutes). A cast film was formed in the same way as in Example 13 and was subjected to the same tests. Table 4 shows the results.

Example 15

Ninety-nine parts by mass of the low-density polyethylene resin (Novatec LD LC600A, manufactured by Japan polyethylene Co., melt flow rate=7 g/10 minutes) mixed (dry-blended) with one part by mass of a 4-methyl-1-pentene polymer (5-b) was directly fed into a hopper of a 20 mmϕ single-screw extruder equipped with a T-die having a lip width of 240 mm (manufactured by Tanaka Iron Works Co., Ltd.). A molten mixture was extruded from the T-die at a cylinder temperature of 230° C. and a die temperature of 230° C. The extrudate was then taken up at a chill-roll temperature of 40° C. and a take-up speed of 1.5 m/min to produce a cast film having a thickness of 50 μm. Table 4 shows the results.

Example 16

A cast film was produced in the same way as in Example 13 except that 30 parts by mass of the masterbatch pellets formed in Example 14 were mixed (dry-blended) with 70 parts by mass of the low-density polyethylene resin (Novatec LD LC600A, manufactured by Japan polyethylene Co., melt flow rate=7 g/10 minutes).

The physical properties of a film thus formed were measured and shown in Table 4.

Example 17

Masterbatch pellets of a low-density polyethylene/4-methyl-1-pentene polymer were formed in the same way as in Example 13 except that (6-b) was used as the 4-methyl-1-pentene polymer. Ten parts by mass of the masterbatch pellets were mixed (dry-blended) with 90 parts by mass of the low-density polyethylene resin (Novatec LD LC600A, manufactured by Japan polyethylene Co., melt flow rate=7 g/10 minutes). A cast film was formed in the same way as in Example 13 and was subjected to the same tests. Table 4 shows the results.

Comparative Example 9

The low-density polyethylene resin (Novatec LD LC600A, manufactured by Japan polyethylene Co., melt flow rate=7 g/10 minutes) was fed to a 20 mmϕ single-screw extruder equipped with a T-die having a lip width of 240 mm (manufactured by Tanaka Iron Works Co., Ltd.) at a cylinder temperature of 230° C. and a die temperature of 230° C. to extrude a molten mixture from the T-die. The extrudate was then taken up at a chill roll temperature of 40° C. and a take-up speed of 1.5 m/min to produce a cast film having a thickness of 50 μm.

The physical properties of a film thus formed were measured and shown in Table 4.

TABLE 4

| | Physical properties of films | | | | | |
| --- | --- | --- | --- | --- | --- | --- |
| | Example 13 | Example 14 | Example 15 | Example 16 | Example 17 | Comparative example 9 |
| Type of resin | 4-a | 4-a | 4-a | 4-a | 4-a | 4-a |
| Mold-release additive | 3-b | 5-b | 5-b | 5-b | 6-b | None |
| Addition method | MB | MB | DB | MB | MB | — |
| Amount [wt %] | 1 | 1 | 1 | 3 | 1 | — |
| Forming temperature [° C.] | 230 | 230 | 230 | 230 | 230 | 230 |
| Forming speed [m/min] | 1.5 | 1.5 | 1.5 | 1.5 | 1.5 | 1.5 |
| Critical surface | 26.2 | 25.5 | 25.7 | 25.3 | 26.4 | 26.7 |

TABLE 4-continued

| | Physical properties of films | | | | | |
|---|---|---|---|---|---|---|
| | Example 13 | Example 14 | Example 15 | Example 16 | Example 17 | Comparative example 9 |
| tension [mN/m] Low-temperature mold releasability [mN/cm] | 1.5 | 1.9 | 2.0 | 0.8 | 1.4 | 28.2 |
| High-temperature mold releasability [N/15 mm] 140° C. | 0.9 | 1.1 | 1.3 | 0.8 | 0.8 | 7.7 |
| Adhesive mold releasability [N/50 mm] | 3.6 | 3.8 | 4.0 | 3.4 | 3.1 | 5.5 |

4-a: Low-density polyethylene resin

Example 18

Ninety parts by weight of the propylene polymer (a-1-1) as the propylene polymer (A-1), 10 parts by weight of an isotactic homopolypropylene (a-2-1) (Tm=164° C., MFR (230° C.)=7.0 g/10 minutes, mmmm=96.5%, Mw/Mn=4.3) as the propylene polymer (A-2), and a heat stabilizer (500 ppm Irgafos 168 and 500 ppm Irganox 1076 both from Ciba Specialty Chemicals Co., Ltd. based on the propylene polymer (a-1-1) and the propylene polymer (a-2-1)) were melt-kneaded at 190° C. to produce a propylene resin composition (x-1).

A hundred parts by weight of the propylene resin composition (x-1) blended with one part by weight of the 4-methyl-1-pentene polymer (3-b) was melt-kneaded (forming temperature=230° C.) in a 40 mmφ single-screw extruder (L/D=26, full-flight screw) to extrude a sheet of a propylene resin composition (y1) having a thickness of 1 mm. The physical properties of the sheet were measured. Table 5 shows the physical properties.

Example 19

A propylene resin composition (x-2) was prepared in the same manner as in Example 18 except that 85 parts by weight of the propylene polymer (a-1-2) was used as the propylene polymer (A-1) in place of 90 parts by weight of the propylene polymer (a-1-1) and that the propylene polymer (a-2-1) was 15 parts by weight.

A hundred parts by weight of the propylene resin composition (x-2) blended with one part by weight of the 4-methyl-1-pentene polymer (3-b) was melt-kneaded (forming temperature=230° C.) in a 40 mmφ single-screw extruder (L/D=26, full-flight screw) to extrude a sheet of a propylene resin composition (y2) having a thickness of 1 mm. The physical properties of the sheet were measured. Table 5 shows the physical properties.

Comparative Example 10

A sheet of a propylene resin composition (y3) having a thickness of 1 mm was extruded in the same manner as in Example 18 except that the propylene resin composition (x-1) was not blended with the 4-methyl-1-pentene polymer (3-b). The physical properties of the sheet were measured. Table 5 shows the physical properties.

Comparative Example 11

A sheet of a propylene resin composition (y4) having a thickness of 1 mm was extruded in the same manner as in Example 18 except that the propylene resin composition (x-1) was blended with one part by weight of a polypropylene wax (grade NP505, manufactured by Mitsui Chemicals, Inc., melting point=151° C., melt viscosity (180° C.)=650 mPa·s) in place of the 4-methyl-1-pentene polymer (3-b). The physical properties of the sheet were measured. Table 5 shows the physical properties.

Comparative Example 12

A sheet of a propylene resin composition (y5) having a thickness of 1 mm was extruded in the same manner as in Example 18 except that the propylene resin composition (x-1) was blended with one part by weight of a polyethylene wax (grade 420P, manufactured by Mitsui Chemicals, Inc., melting point=113° C., melt viscosity (180° C.)=650 mPa·s) in place of the 4-methyl-1-pentene polymer (3-b). The physical properties of the sheet were measured. Table 5 shows the physical properties.

Comparative Example 13

A sheet of a propylene resin composition (y6) having a thickness of 1 mm was extruded in the same manner as in Example 18 except that the propylene resin composition (x-1) was blended with 1500 ppm (0.15 parts by weight) of erucamide (Alflow P-10, manufactured by NOF Co.) in place of the 4-methyl-1-pentene polymer (3-b). The physical properties of the sheet were measured. Table 5 shows the physical properties.

Comparative Example 14

A sheet of a propylene resin composition (y7) having a thickness of 1 mm was extruded in the same manner as in Example 19 except that the propylene resin composition (x-2) was not blended with the 4-methyl-1-pentene polymer (3-b).

The physical properties of the sheet were measured. Table 5 shows the physical properties.

Comparative Example 15

A sheet of a propylene resin composition (y8) having a thickness of 1 mm was extruded in the same manner as in Example 19 except that the propylene resin composition (x-2) was blended with one part by weight of a polypropylene wax (grade NP505, manufactured by Mitsui Chemicals, Inc., melting point=151° C., melt viscosity (180° C.)=650 mPa·s) in place of the 4-methyl-1-pentene polymer (3-b). The physical properties of the sheet were measured. Table 5 shows the physical properties.

Comparative Example 16

A sheet of a propylene resin composition (y9) having a thickness of 1 mm was extruded in the same manner as in Example 19 except that the propylene resin composition (x-2) was blended with one part by weight of a polyethylene wax (grade 420P, manufactured by Mitsui Chemicals, Inc., melting point=113° C., melt viscosity (180° C.)=650 mPa·s) in place of the 4-methyl-1-pentene polymer (3-b). The physical properties of the sheet were measured. Table 5 shows the physical properties.

Comparative Example 17

A sheet of a propylene resin composition (y10) having a thickness of 1 mm was extruded in the same manner as in Example 19 except that the propylene resin composition (x-2) was blended with 1500 ppm (0.15 parts by weight) of erucamide (Alflow P-10, manufactured by NOF Co.) in place of the 4-methyl-1-pentene polymer (3-b). The physical properties of the sheet were measured. Table 5 shows the physical properties.

TABLE 5

| | | Example 18 | Comparative example 10 | Comparative example 11 | Comparative example 12 | Comparative example 13 |
|---|---|---|---|---|---|---|
| Propylene polymer (A-1) | | | a-1-1 | | | |
| Amount | parts by weight | | 90 | | | |
| Comonomer composition | mol % | | ethylene/propylene/1-butene = 16.4/77.7/5.9 | | | |
| B value | | | 1.0 | | | |
| Isotactic triad fraction | % | | 90.3 | | | |
| Mw/Mn | | | 2.1 | | | |
| Tm | ° C. | | Not observed | | | |
| Tg | ° C. | | −29 | | | |
| Shore A hardness | | | 75 | | | |
| MFR (230° C.) | g/10 min | | 6.5 | | | |
| Propylene polymer (A-2) | | | a-2-1 | | | |
| Amount | parts by weight | | 10 | | | |
| Tm | ° C. | | 164.0 | | | |
| Isotactic pentad fraction | % | | 96.5 | | | |
| MFR (230° C.) | g/10 min | | 7.0 | | | |
| Mw/Mn | | | 4.3 | | | |
| Propylene composition (X) | | | x-1 | | | |
| Amount | parts by weight | | 100 | | | |
| Shore A hardness | | | 84 | | | |
| Internal haze (2 mmt pressed sheet) | % | | 4 | | | |
| Total light transmittance (2 mmt pressed sheet) | % | | 97 | | | |
| MFR (230° C.) | g/10 min | | 6.9 | | | |
| 4-methyl-1-pentene polymer (B) | | 3-b | — | — | — | — |
| Wax etc. | | | — | PP*1 | PE*2 | amide*3 |
| Amount | parts by weight | 1 | | 1 | 1 | 0.15 |
| Comonomer composition | | 4MP1 component 93.5 wt %, C16 and C18 components 6.5 wt % | | | | |
| Intrinsic viscosity [η] | dl/g | 0.13 | | | | |
| Mw/Mn | | 3.97 | | | | |
| Tm | ° C. | 192 | | | | |
| Critical surface tension | mN/m | 27.0 | | | | |
| 0.2 × [η]^(−1.5) | | 4.27 | | | | |
| A | | 2.86 | | | | |
| Number of terminal double bonds | | 0.2 | | | | |
| Propylene resin composition (Y) | | y1 | y3 | y4 | y5 | y6 |
| Tackiness, treated at 23° C. | N/cm | 0.4 | 0.7 | 0.6 | 0.7 | 0.2 |
| Tackiness, treated at 50° C. | N/cm | 1.4 | 4.5 | 4.4 | 3.5 | 6.9 |
| Shore A hardness | | 87 | 86 | 87 | 87 | 86 |
| Total haze (1 mmt extruded sheet) | % | 9.2 | 6.5 | 7.2 | 12.4 | 7.3 |
| Total light transmittance (1 mmt extruded sheet) | % | 90.2 | 91.5 | 91.3 | 89.4 | 91.3 |

TABLE 5-continued

|  |  | Example 19 | Comparative example 14 | Comparative example 15 | Comparative example 16 | Comparative example 17 |
|---|---|---|---|---|---|---|
| Propylene polymer (A-1) |  |  | a-1-2 |  |  |  |
| Amount | parts by weight |  | 85 |  |  |  |
| Comonomer composition | mol % |  | ethylene/propylene/1-butene = 13.7/67.0/19.3 |  |  |  |
| B value |  |  | 1.0 |  |  |  |
| Isotactic triad fraction | % |  | 92.1 |  |  |  |
| Mw/Mn |  |  | 2.1 |  |  |  |
| Tm | ° C. |  | Not observed |  |  |  |
| Tg | ° C. |  | −29 |  |  |  |
| Shore A hardness |  |  | 44 |  |  |  |
| MFR (230° C.) | g/10 min |  | 7.5 |  |  |  |
| Propylene polymer (A-2) |  |  | a-2-1 |  |  |  |
| Amount | parts by weight |  | 15 |  |  |  |
| Tm | ° C. |  | 164.0 |  |  |  |
| Isotactic pentad fraction | % |  | 96.5 |  |  |  |
| MFR (230° C.) | g/10 min |  | 7.0 |  |  |  |
| Mw/Mn |  |  | 4.3 |  |  |  |
| Propylene composition (X) |  |  | x-2 |  |  |  |
| Amount | parts by weight |  | 100 |  |  |  |
| Shore A hardness |  |  | 71 |  |  |  |
| Internal haze (2 mmt pressed sheet) | % |  | 6 |  |  |  |
| Total light transmittance (2 mmt pressed sheet) | % |  | 97 |  |  |  |
| MFR (230° C.) | g/10 min |  | 7.1 |  |  |  |
| 4-methyl-1-pentene polymer (B) |  | 3-b | — | — | — |  |
| Wax etc. |  |  | — | PP*1 | PE*2 | amide*3 |
| Amount | parts by weight | 1 |  | 1 | 1 | 0.15 |
| Comonomer composition |  | 4MP1 component 93.5 wt %, C16 and C18 components 6.5 wt % |  |  |  |  |
| Intrinsic viscosity [η] | dl/g | 0.13 |  |  |  |  |
| Mw/Mn |  | 3.97 |  |  |  |  |
| Tm | ° C. | 192 |  |  |  |  |
| Critical surface tension | mN/m | 27.0 |  |  |  |  |
| $0.2 \times [\eta]^{(-1.5)}$ |  | 4.27 |  |  |  |  |
| A |  | 2.86 |  |  |  |  |
| Number of terminal double bonds |  | 0.2 |  |  |  |  |
| Propylene resin composition (Y) |  | y2 | y7 | y8 | y9 | y10 |
| Tackiness, treated at 23° C. | N/cm | 0.6 | 4.8 | 4.5 | 3.1 | 0.2 |
| Tackiness, treated at 50° C. | N/cm | 1.9 | 8.5 | 8.8 | 6.6 | 8.5 |
| Shore A hardness |  | 74 | 74 | 76 | 75 | 74 |
| Total haze (1 mmt extruded sheet) | % | 8.4 | 8.5 | 8.2 | 14.3 | 7.5 |
| Total light transmittance (1 mmt extruded sheet) | % | 90.5 | 91.2 | 91.9 | 88.4 | 91.5 |

PP*1: Polypropylene wax
PE*2: Polyethylene wax
Amide*3: erucamide
4MP1: 4-methyl-1-pentene Examples of Third Aspect of the Present Invention

Example 20

Preparation of Catalyst Solution

A glass flask sufficiently purged with nitrogen was charged with 0.5 μmol isopropyl(3-t-butyl-5-methylcyclopentadienyl) (3,6-di-t-butylfluorenyl)zirconium dichloride and then 0.25 mmol (in terms of Al atom) of a solution of MMAO manufactured by Tosoh Finechem Co. (product name MMAO-3A) in hexane as a promoter to prepare a catalyst solution.

Polymerization

A glass autoclave having an internal volume of one liter equipped with a stirrer and sufficiently purged with nitrogen was charged with 400 ml of decane and 100 ml of 4-methyl-1-pentene and was left to stand at 30° C. for 10 minutes while hydrogen (six liter/h) was passed through the autoclave. 0.25 mmol triisobutylaluminum and then the catalyst solution prepared as described above were added to the autoclave to initiate polymerization. After the polymerization was performed at atmospheric pressure and 30° C. for one hour while hydrogen (six liter/h) was continuously supplied, a small amount of methanol was added to terminate the polymerization. The polymer solution was poured into four liter of a methanol/acetone mixture (volume ratio 4/1), and the polymer was recovered by filtration. The polymer was dried at 80° C. under reduced pressure for 10 hours, yielding 15.5 g of the polymer. The polymer had an intrinsic viscosity [η] of 0.08 dl/g and Mw=9040, Mn=4650, and Mw/Mn=1.94, as determined by GPC. The percentage A (% by mass) of a component having a polystyrene equivalent molecular weight of 1000 or less in the polymer was 1.37, and the number of terminal double bonds was 0.1/1000 carbon atoms. The mold releasability and the blocking resistance of the resulting 4-methyl-1-pentene polymer were evaluated.
Mold releasability for polypropylene: Excellent
Mold Releasability for Polyamide: Excellent
Blocking resistance: Excellent Example 21

Preparation of Catalyst Solution

A glass flask sufficiently purged with nitrogen was charged with 1 μmol isopropyl(3-t-butyl-5-methylcyclopentadienyl) (3,6-di-t-butylfluorenyl)zirconium dichloride and then 0.5 mmol (in terms of Al atom) of a solution of MMAO manufactured by Tosoh Finechem Co. (product name MMAO-3A) in hexane as a promoter to prepare a catalyst solution.
Polymerization A glass autoclave having an internal volume of one liter equipped with a stirrer and sufficiently purged with nitrogen was charged with 567 ml of decane, 180 ml of 4-methyl-1-pentene, and 3 ml of 1-decene and was left to stand at 30° C. for 10 minutes while hydrogen (six liter/h) was passed through the autoclave. 0.375 mmol triisobutylaluminum and then the catalyst solution prepared as described above were added to the autoclave to initiate polymerization. After the polymerization was performed at atmospheric pressure and 30° C. for one hour while hydrogen (six liter/h) was continuously supplied, a small amount of methanol was added to terminate the polymerization. The polymer solution was poured into four liter of a methanol/acetone mixture (volume ratio 4/1), and the polymer was recovered by filtration. The polymer was dried at 80° C. under reduced pressure for 10 hours, yielding 36.4 g of the polymer. The polymer had an intrinsic viscosity [η] of 0.11 dl/g and Mw=12000, Mn=5740, and Mw/Mn=2.09, as determined by GPC. The percentage A (% by mass) of a component having a polystyrene equivalent molecular weight of 1000 or less in the polymer was 1.16, and the number of terminal double bonds was 0.1/1000 carbon atoms. The mold releasability and the blocking resistance of the resulting 4-methyl-1-pentene polymer were evaluated.
Mold releasability for polypropylene: Excellent
Mold Releasability for Polyamide: Excellent
Blocking resistance: Excellent Example 22

Preparation of Catalyst Solution

A glass flask sufficiently purged with nitrogen was charged with 1 μmol isopropyl(3-t-butyl-5-methylcyclopentadienyl) (3,6-di-t-butylfluorenyl)zirconium dichloride and then 0.5 mmol (in terms of Al atom) of a solution of MMAO manufactured by Tosoh Finechem Co. (product name MMAO-3A) in hexane as a promoter to prepare a catalyst solution.
Polymerization A glass autoclave having an internal volume of one liter equipped with a stirrer and sufficiently purged with nitrogen was charged with 561 ml of decane, 180 ml of 4-methyl-1-pentene, and Dialen D168 (registered trademark), which is a mixture of high-purity hexadecene and octadecene, manufactured by Mitsubishi Chemical Co. (9 ml) and was left to stand at 30° C. for 10 minutes while hydrogen (six liter/h) was passed through the autoclave. 0.375 mmol triisobutylaluminum and then the catalyst solution prepared as described above were added to the autoclave to initiate polymerization. After the polymerization was performed at atmospheric pressure and 30° C. for one hour while hydrogen (six liter/h) was continuously supplied, a small amount of methanol was added to terminate the polymerization. The polymer solution was poured into four liter of a methanol/acetone mixture (volume ratio 4/1), and the polymer was recovered by filtration. The polymer was dried at 80° C. under reduced pressure for 10 hours, yielding 37.6 g of the polymer. The polymer had an intrinsic viscosity [η] of 0.13 dl/g and Mw=15900, Mn=4010, and Mw/Mn=3.97, as determined by GPC. The percentage A (% by mass) of a component having a polystyrene equivalent molecular weight of 1000 or less in the polymer was 2.86, and the number of terminal double bonds was 0.2/1000 carbon atoms. The mold releasability and the blocking resistance of the resulting 4-methyl-1-pentene polymer were evaluated.
Mold releasability for polypropylene: Excellent
Mold Releasability for Polyamide: Excellent
Blocking resistance: Excellent Reference Example 5

A 500 ml side-arm flask was charged with 150 g of a 4-methyl-1-pentene polymer (DX820 manufactured by Mitsui Chemicals, Inc.) and was heated to 360° C. on a sand bath while nitrogen was passed through the flask. After the polymer on the wall of the flask was melted, the temperature was held at this temperature for two hours while stirring to thermally decompose the 4-methyl-1-pentene polymer. Cooling to normal temperature yielded a pyrolysate of the 4-methyl-1-pentene polymer. The pyrolysate had an intrinsic viscosity [η] of 0.17 dl/g and Mw=21700, Mn=4840, and Mw/Mn=4.48, as determined by GPC. The percentage A (% by mass) of a component having a polystyrene equivalent molecular weight of 1000 or less in the polymer was 3.94, and the number of terminal double bonds was 3.6/1000 carbon atoms. The mold releasability and the blocking resistance of the resulting 4-methyl-1-pentene polymer were evaluated.
Mold releasability for polypropylene: Fair
Mold Releasability for Polyamide: Fair
Blocking resistance: Fair Reference Example 6

A pyrolysate was prepared in the same manner as in Reference Example 5 except that the thermal decomposition temperature was 375° C. The pyrolysate had an intrinsic viscosity [η] of 0.08 dl/g and Mw=7160, Mn=1860, and Mw/Mn=3.85, as determined by GPC. The percentage A (% by mass) of a component having a polystyrene equivalent molecular weight of 1000 or less in the polymer was 13.35, and the number of terminal double bonds was 8.2/1000 carbon atoms. The mold releasability and the blocking resistance of the resulting 4-methyl-1-pentene polymer were evaluated.
Mold releasability for polypropylene: Fair
Mold Releasability for Polyamide: Fair
Blocking resistance: Fair Reference Example 7

A pyrolysate was prepared in the same manner as in Reference Example 5 except that the 4-methyl-1-pentene polymer was DX310 manufactured by Mitsui Chemicals, Inc. The pyrolysate had an intrinsic viscosity [η] of 0.1 dl/g and Mw=10200, Mn=2440, and Mw/Mn=4.18, as determined by GPC. The percentage A (% by mass) of a component having a polystyrene equivalent molecular weight of 1000 or less in the polymer was 8.34, and the number of terminal double bonds was 5.7/1000 carbon atoms. The mold releasability and the blocking resistance of the resulting 4-methyl-1-pentene polymer were evaluated.

Mold releasability for polypropylene: Fair
Mold Releasability for Polyamide: Fair
Blocking resistance: Fair Reference Example 8

A pyrolysate was prepared in the same manner as in Reference Example 7 except that the thermal decomposition temperature was 375° C. The pyrolysate had an intrinsic viscosity [η] of 0.05 dl/g and Mw=3740, Mn=1130, and Mw/Mn=3.31, as determined by GPC. The percentage A (% by mass) of a component having a polystyrene equivalent molecular weight of 1000 or less in the polymer was 24.15, and the number of terminal double bonds was 11.1/1000 carbon atoms. The mold releasability and the blocking resistance of the resulting 4-methyl-1-pentene polymer were evaluated.

Mold releasability for polypropylene: Fair
Mold Releasability for Polyamide: Fair
Blocking resistance: Fair Reference Examples 5 to 8 were reference examples with respect to the first aspect of the present invention.

device, whereby the polymer was heated at 410° C. Thereafter, cooling to normal temperature yielded a pyrolysate of the 4-methyl-1-pentene polymer.

Intrinsic viscosity [η]=0.14 dl/g 4-methyl-1-pentene structural unit=95.9 wt %, C10 structural unit=4.1 wt %

Mw=14900, Mn=3290, Mw/Mn=4.53

Melting point=215° C.

Critical surface tension=25.4 mN/m

Number of terminal double bonds L=3.6/1000 carbon atoms

Synthesis Example 10

Synthesis of 4-Methyl-1-Pentene Polymer (8-b)

A 4-methyl-1-pentene polymer (DX310 manufactured by Mitsui Chemicals, Inc.) was thermally decomposed in the same way as the above and yielded a pyrolysate of the 4-methyl-1-pentene polymer.

Intrinsic viscosity [η]=0.15 dl/g 4-methyl-1-pentene structural unit=86.1 wt %, C16 and C18 structural units=13.9 wt %

Mw=18300, Mn=3660, Mw/Mn=4.99

Melting point=208° C.

TABLE 6

Properties of 4-methyl-1-pentene polymers

| | | | Example 20 | Example 21 | Example 22 | Reference example 5 | Reference example 6 | Reference example 7 | Reference example 8 |
|---|---|---|---|---|---|---|---|---|---|
| Composition of 4-methyl-1-pentene polymer | 4-methyl-1-pentene (wt %) | | 100 | 96.9 | 93.5 | 95.9 | 92.2 | 86.1 | 81.8 |
| | Olefin | Type | | decene | Dialen* | decene | decene | Dialen* | Dialen* |
| | | (wt %) | | 3.1 | 6.5 | 4.1 | 7.8 | 13.9 | 18.2 |
| Physical properties of 4-methyl-1-pentene polymer | Intrinsic viscosity | dl/g | 0.08 | 0.11 | 0.13 | 0.17 | 0.08 | 0.1 | 0.05 |
| | Mw/Mn | | 1.94 | 2.09 | 3.97 | 4.48 | 3.85 | 4.18 | 3.31 |
| | $0.2 \times [\eta]^{(-1.5)}$ | | 8.52 | 5.48 | 4.27 | 2.85 | 8.84 | 6.32 | 17.89 |
| | A value (molecular weight of 1000 or less) | | 1.37 | 1.16 | 2.86 | 3.94 | 13.35 | 8.34 | 24.15 |
| | Number of terminal double bonds | /1000 carbon atoms | 0.1 | 0.1 | 0.2 | 3.6 | 8.2 | 5.7 | 11.1 |
| Notes | | | *1 | *1 | *1 | *2 | *2 | *2 | *2 |

*Dialen D168: a mixture of hexadecene and octadecene
*1: Synthesis with metallocene catalyst
*2: Pyrolysate Synthesis Example 9

Synthesis of 4-Methyl-1-Pentene Polymer (7-b)

A 4-methyl-1-pentene polymer (DX820 manufactured by Mitsui Chemicals, Inc.) was thermally decomposed with a continuos thermal decomposition device (a monoaxial extruder screw diameter: 20 mmΦ, L/D=24, volume of thermal decomposer: 21.1 mmΦ×1769 mm). To be specific, the polymer was melt-kneaded with the continuos thermal decomposition device (cylinder temperature: 405° C.; feed amount: 2.6 kg/hr) while nitrogen was passed through the Critical surface tension=25.1 mN/m
Number of terminal double bonds L=5.7/1000 carbon atoms Synthesis Example 11

Synthesis of 4-Methyl-1-Pentene Polymer (9-b)

Preparation of Catalyst Solution

A glass flask sufficiently purged with nitrogen was charged with 1 μmol of isopropyl(3-t-butyl-5-methylcyclopentadienyl) (3,6-di-t-butylfluorenyl)zirconium dichloride and then 0.5 mmol in terms of Al atom of a solution of MMAO manufactured by Tosoh Finechem Co. (product name MMAO-3A) in hexane as a promoter to prepare a catalyst solution.

Polymerization

A glass autoclave having an internal volume of one liter equipped with a stirrer and sufficiently purged with nitrogen was charged with 567 ml of decane, 180 ml of 4-methyl-1-pentene and 3 ml of decene and was left to stand at 30° C. for 10 minutes while hydrogen (six liter/h) was passed through the autoclave. 0.375 mmol of triisobutylaluminum and then the catalyst solution prepared as described above were added to the autoclave to initiate polymerization. After the polymerization was performed at atmospheric pressure and 30° C. for one hour while hydrogen (six liter/h) was continuously supplied, a small amount of methanol was added to terminate the polymerization. The polymer solution was poured into four liter of a methanol/acetone mixture (volume ratio 4/1), and the polymer was recovered by filtration. The polymer was dried at 80° C. under reduced pressure for 10 hours, yielding 13.1 g of the polymer.

Intrinsic viscosity [η]=0.11 dl/g
4-methyl-1-pentene structural unit=97.5 wt %, C10 structural unit=2.5 wt %
Mw=12000, Mn=5740, Mw/Mn=2.09
Melting point=208° C.
Critical surface tension=26.3 mN/m
Number of terminal double bonds L=0.2/1000 carbon atoms
A-value=1.16

Example 23

100 parts by weight of a polyisobutylene resin (Oppanol B100, manufactured by BASF; the viscosity average molecular weight: Mv: $11 \times 10^5$) and 5 parts by weight of the 4-methyl-1-pentene polymer (7-b) was melt-kneaded at 240° C. for 20 minutes at 60 rpm with a mixer tester (LABO PLASTOMILL 4C150, manufactured by Toyo Seiki Seisaku-sho, Ltd.), yielding a resin composition of a polyisobutylene resin (A)'/4-methyl-1-pentene polymer (B).

Example 24

A resin composition was prepared in the same manner as in Example 23 except that the 4-methyl-1-pentene polymer (7-b) was added in an amount of 10 parts by weight.

Example 25

A resin composition was prepared in the same manner as in Example 23 except that the 4-methyl-1-pentene polymer (8-b) was added instead of the 4-methyl-1-pentene polymer (7-b).

Example 26

A resin composition was prepared in the same manner as in Example 1 except that the 4-methyl-1-pentene polymer (9-b) was added instead of the 4-methyl-1-pentene polymer (7-b).

Example 27

100 parts by weight of a butyl rubber resin (JSR Butyl 268, manufactured by JSR Corporation; the Mooney viscosity: $ML_{1+8}$ (125° C.): 51) and 0.5 part by weight of the 4-methyl-1-pentene polymer (8-b) were melt-kneaded at 220° C. for 20 minutes at 60 rpm with a mixer tester (LABO PLASTOMILL 4C150, manufactured by Toyo Seiki Seisaku-sho, Ltd.), yielding a resin composition of a butyl rubber resin (A)'/4-methyl-1-pentene polymer (B).

Example 28

A resin composition was prepared in the same manner as in Example 27 except that the 4-methyl-1-pentene polymer (8-b) was added in an amount of 1.0 part by weight.

Example 29

A resin composition was prepared in the same manner as in Example 27 except that the 4-methyl-1-pentene polymer (8-b) was added in an amount of 3.0 parts by weight.

Example 30

A resin composition was prepared in the same manner as in Example 27 except that the 4-methyl-1-pentene polymer (8-b) was added in an amount of 5.0 parts by weight.

Properties of the resin compositions obtained in Examples 23 to 30 were evaluated or measured in the following manner. The results thereof are shown in Table 7 and Table 8.

[Maximum Torque]

The maximum torque that was applied to a kneading tester (LABO PLASTOMILL 4C150, manufactured by Toyo Seiki Seisaku-sho, Ltd.) when the above resin composition was kneaded at 240° C. for 20 minutes at 60 rpm was obtained.

[Mold Releasability]

The releasability of the kneaded resin composition from the mold of the kneading tester were evaluated under the following criteria.

Easy: releasing from the mold is easy, with no resin residue in the mold or screw.

Difficult: releasing from the mold is difficult, with the resin composition being like starch syrup or resin residue present in the mold or screw.

[Blocking Tendency]

The blocking tendency of the kneaded resin composition was evaluated under the following criteria.

○: masses were less blocked and separation is easy x: masses were considerably blocked and separation is difficult

[Compatibility]

As preliminary treatment, the kneaded resin composition was trimmed and subjected to $RuO_4$ dyeing, and an ultra-thin section was prepared. Then, the ultra-thin section was reinforced with carbon. The preliminarily treated sample was observed with a transmission electron microscope (H-7650, manufactured by Hitachi High-Technologies Corporation) to see the dispersion state of the 4-methyl-1-pentene polymer present in the range of 30 μm×30 μm.

⊚: all of the dispersions observed have a dispersed particle diameter (the length of a long axis in the case of a flat shape) of less than 1 μm.

○: there are dispersions having a dispersed particle diameter (the length of a long axis in the case of a flat shape) of not less than 1 μm and less than 3 μm.

Δ: there are dispersions having a dispersed particle diameter (the length of a long axis in the case of a flat shape) of not less than 3 μm and less than 7 μm.

x: there are dispersions having a dispersed particle diameter (the length of a long axis in the case of a flat shape) of not less than 7 μm.

[Transparency]

The transparency, an indicator of the compatibility, of the kneaded resin composition was visually observed and evaluated in the following criteria.
◯: transparent and uniform
x: opaque and clouded

[Discoloration]

The discoloration of the kneaded resin composition was visually observed and evaluated under the following criteria.
◯: there is less discoloration due to heat and close to achroma
x: there is discoloration due to heat and brown color is developed.

[Peak Molecular Weight]

As the molecular weight of the compositions before and after kneaded, the peak molecular weights in terms of monodispersed polystyrene were obtained with the same chromatogram as the chromatogram used in the measurement of the molecular weight and molecular weight distribution of the 4-methyl-1-pentene polymer.

TABLE 7

| | Example 23 | Example 24 | Example 25 | Example 26 |
|---|---|---|---|---|
| Additive | 4-methyl-1-pentene polymer (7-b) | 4-methyl-1-pentene polymer (7-b) | 4-methyl-1-pentene polymer (8-b) | 4-methyl-1-pentene polymer (9-b) |
| Amount added | 5 parts by weight | 10 parts by weight | 5 parts by weight | 5 parts by weight |
| Mold Releasability | Easy | Easy | Easy | Easy |
| Blocking after kneading | ◯ | ◯ | ◯ | ◯ |
| Compatibility (Microscope Observation) | ◯ | ◯ | Not measured | Not measured |
| Transparency | ◯ | ◯ | ◯ | ◯ |
| Discoloration | ◯ | ◯ | ◯ | ◯ |
| Peak Molecular Weight before kneading (GPC in terms of PS) | 1,068,000 | 1,068,000 | 1,068,000 | 1,068,000 |
| Peak Molecular Weight after kneading (GPC in terms of PS) | 1,132,000 | 1,041,000 | 1,049,000 | 758,000 |

TABLE 8

| | Example 27 | Example 28 | Example 29 | Example 30 |
|---|---|---|---|---|
| Wax | 4-methyl-1-pentene polymer (8-b) | 4-methyl-1-pentene polymer (8-b) | 4-methyl-1-pentene polymer (8-b) | 4-methyl-1-pentene polymer (8-b) |
| Amount added | 0.5 part by weight | 1.0 part by weight | 3.0 parts by weight | 5.0 parts by weight |
| Maximum Torque(N·m) | 27 | 26 | 22 | 4 |
| Mold Releasability | Difficult | Difficult | Slightly Difficult | Easy |
| Blocking after kneading | xx | xx | x | ◯ |
| Transparency | ◯ | ◯ | ◯ | ◯ |
| Discoloration | x | x | ◯ | ◯ |
| Peak Molecular Weight before kneading (GPC in terms of PS) | — | — | — | — |
| Peak Molecular Weight after kneading (GPC in terms of PS) | — | — | 259,000 | — |

Comparative Example 18

A resin composition was prepared in the same manner as in Example 23 except that the 4-methyl-1-pentene polymer (7-b) was not added. The viscosity after the resin was kneaded was significantly lowered and discoloration due to heat was observed.

Comparative Example 19

A resin composition was prepared in the same manner as in Example 23 except that a polyethylene wax (Mitsui HiWax 200P, manufactured by Mitsui Chemicals, Inc.) was added instead of the 4-methyl-1-pentene polymer (7-b). The viscosity after the resin was kneaded was significantly lowered and the transparency of the resin was lost.

Comparative Example 20

A resin composition was prepared in the same manner as in Example 23 except that an aliphatic acid wax (a montanic acid ester, Licowax E (Clariant (Japan)K.K.)) was added instead of the 4-methyl-1-pentene polymer (7-b). The viscosity after the resin was kneaded was significantly lowered and significant discoloration due to heat was observed.

Comparative Example 21

A resin composition was prepared in the same manner as in Example 27 except that the 4-methyl-1-pentene polymer (8-b) was not added. The viscosity after the resin was kneaded was significantly lowered and discoloration due to heat was observed.

Comparative Example 22

A resin composition was prepared in the same manner as in Example 27 except that a polymer of 4-methyl-1-pentene (Mitsui TPX DX310 (Mitsui Chemicals, Inc.), [η]: 1.5) was added instead of the 4-methyl-1-pentene polymer (8-b).

The properties of the resin compositions obtained in Comparative Examples 18 to 22 were evaluated or measured in the same manner as in Examples. The results thereof are shown in Table 9 and Table 10.

TABLE 9

| | Comparative Example 18 | Comparative Example 19 | Comparative Example 20 |
|---|---|---|---|
| Additive | None(blank) | PE wax (Ziegler) | Aliphatic acid wax |
| Amount added | — | 5 parts by weight | 5 parts by weight |
| Mold Releasability | Difficult | Difficult | Difficult |
| Blocking after kneading | xx | x | xx |
| Compatibility (Microscope Observation) | Dispersions were not observed | x | Δ |
| Transparency | ○ | x | x |
| Discoloration | x | x | xx |
| Peak Molecular Weight before kneading (GPC in terms of PS) | 1,068,000 | 1,068,000 | 1,068,000 |
| Peak Molecular Weight after kneading (GPC in terms of PS) | 229,000 | 203,000 | 155,000 |

TABLE 10

| | Comparative Example 21 | Comparative Example 22 |
|---|---|---|
| Wax | None(blank) | 4-methyl-1-pentene polymer (Polymer) |
| Amount added | — | 3 parts by weight |
| Maximum Torque(N·m) | 29 | 32 |
| Mold Releasability | Difficult | Difficult |
| Blocking after kneading | xx | xx |
| Transparency | ○ | x |
| Discoloration | x | x |
| Peak Molecular Weight before kneading (GPC in terms of PS) | 449,000 | — |
| Peak Molecular Weight after kneading (GPC in terms of PS) | 161,000 | 180,000 |

As shown in Table 7, the polyisobutylene resin containing 4-methyl-1-pentene polymer achieved good releasability from a mold and inhibited blocking, and moreover, good compatibilty and thus high transparency. It is also found that in Examples 23 to 25, the decomposition of the polyisobutylene resin was almost inhibited. As shown in Table 8, the same can be said with regard to the butyl rubber containing 4-methyl-1-pentene polymer, too.

On the other hand, as shown in Table 9, the mold releasability was not improved and the blocking was observed when the polyisobutylene rubber did not contain an additive in Comparative Example 18, contained a polyethylene wax in Comparative Example 19, and contained an aliphatic acid wax in Comparative Example 20. It is also found that the polyisobutylene resin was thermally decomposed and dicolored. As shown in Table 10, the same can be said with regard to the butyl rubber, too.

The invention claimed is:

1. A resin composition containing a 4-methyl-1-pentene polymer, comprising 0.01 to 10 parts by mass of a 4-methyl-1-pentene polymer (B-1) per 100 parts by mass of butyl-based rubbers,
wherein the 4-methyl-1-pentene polymer (B-1) has (B1) an intrinsic viscosity [η] of 0.01 or more but less than 0.50 dl/g measured at 135° C. in a decalin solvent, and
(B4) a melting point (Tm) in the range of 120° C. to 245° C. as measured with a differential scanning calorimeter.

2. The resin composition containing a 4-methyl-1-pentene polymer according to claim 1,
wherein the 4-methyl-1-pentene polymer (B-1) is
(B2) a 4-methyl-1-pentene polymer having 50% to 100% by weight of a constitutional unit derived from 4-methyl-1-pentene and 0% to 50% by weight in total of constitutional units derived from at least one olefin selected from olefins having 2 to 20 carbon atoms other than 4-methyl-1-pentene,
and has
(B3) a ratio (Mw/Mn) of weight-average molecular weight (Mw) to number-average molecular weight (Mn) in the range of 1.0 to 5.0 as measured by gel permeation chromatography (GPC),
and
(B5) a critical surface tension in the range of 22 to 28 mN/m.

3. The resin composition containing a 4-methyl-1-pentene polymer according to claim 1,
wherein the 4-methyl-1-pentene polymer (B-1)
(B6) satisfies the relationship expressed by the following formula (I):

$$A \leq 0.2 \times [\eta]^{(-1.5)} \qquad (I)$$

wherein A denotes the percentage (% by mass) of a component having a polystyrene equivalent molecular weight of 1,000 or less in the 4-methyl-1-pentene polymer as measured by gel permeation chromatography (GPC), and [η] denotes the intrinsic viscosity (dl/g) of the 4-methyl-1-pentene polymer measured in a decalin solvent at 135° C.

4. The resin composition containing a 4-methyl-1-pentene polymer according to claim 1, wherein the 4-methyl-1-pentene polymer (B-1) has (B7) 0.001 to 0.5 terminal double bonds per 1000 carbon atoms in the 4-methyl-1-pentene polymer as determined by $^1$H-NMR.

5. The resin composition containing a 4-methyl-1-pentene polymer according to claim 1, wherein the 4-methyl-1-pentene polymer (B-1) is a 4-methyl-1-pentene polymer polymerized in the presence of a metallocene catalyst.

6. The resin composition containing a 4-methyl-1-pentene polymer according to claim 1, wherein the butyl-based rubbers has a melting point (Tm) of 200° C. or more.

7. The resin composition containing a 4-methyl-1-pentene polymer according to claim 1, comprising 0.1 to 7 parts by mass of the 4-methyl-1-pentene polymer (B-1) per 100 parts by mass of the butyl-based rubbers.

8. A resin composition containing a 4-methyl-1-pentene polymer, comprising 0.01 to 100 parts by mass of a 4-methyl-1-pentene polymer (B-2) per 100 parts by mass of butyl-based rubbers,
wherein the 4-methyl-1-pentene polymer (B-2) has
(B11) an intrinsic viscosity [η] of 0.01 or more but less than 3.0 dl/g measured at 135° C. in a decalin solvent, and
(B6) satisfies the relationship expressed by the following formula (I):

$$A \leq 0.2 \times [\eta]^{(-1.5)} \qquad (I)$$

wherein A denotes the percentage (% by mass) of a component having a polystyrene equivalent molecular weight of 1,000 or less in the 4-methyl-1-pentene polymer as measured by gel permeation chromatography (GPC), and [η] denotes the intrinsic viscosity (dl/g) of the 4-methyl-1-pentene polymer measured in a decalin solvent at 135° C., and (B4) a melting point (Tm) in the range of 120° C. to 245° C. as measured with a differential scanning calorimeter.

9. The resin composition containing a 4-methyl-1-pentene polymer according to claim 8, comprising 0.01 to 50 parts by mass of the 4-methyl-1-pentene polymer (B-2) per 100 parts by mass of the butyl-based rubbers.

10. The resin composition containing a 4-methyl-1-pentene polymer according to claim 8, wherein the 4-methyl-1-pentene polymer (B-2) is (B2) a 4-methyl-1-pentene polymer having 50% to 100% by weight of a constitutional unit derived from 4-methyl-1-pentene and 0% to 50% by weight in total of constitutional units derived from at least one olefin selected from olefins having 2 to 20 carbon atoms other than 4-methyl-1-pentene, and has (B3) a ratio (Mw/Mn) of weight-average molecular weight (Mw) to number average molecular weight (Mn) in the range of 1.0 to 5.0 as measured by gel permeation chromatography (GPC), and (B5) a critical surface tension in the range of 22 to 28 mN/m.

11. The resin composition containing a 4-methyl-1-pentene polymer according to claim 8, wherein the 4-methyl-1-pentene polymer (B-2) has (B7) 0.001 to 0.5 terminal double bonds per 1000 carbon atoms in the 4-methyl-1-pentene polymer as determined by $^1$H-NMR.

12. The resin composition containing a 4-methyl-1-pentene polymer according to claim 8, wherein the 4-methyl-1-pentene polymer (B-2) is a 4-methyl-1-pentene polymer polymerized in the presence of a metallocene catalyst.

13. The resin composition containing a 4-methyl-1-pentene polymer according to claim 8, wherein the butyl-based rubbers is a resin having a melting point (Tm) of 200° C. or more.

* * * * *

UNITED STATES PATENT AND TRADEMARK OFFICE
CERTIFICATE OF CORRECTION

| | | |
|---|---|---|
| PATENT NO. | : 8,765,872 B2 | Page 1 of 1 |
| APPLICATION NO. | : 12/987510 | |
| DATED | : July 1, 2014 | |
| INVENTOR(S) | : Kawabe et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this
Fifteenth Day of March, 2016

Michelle K. Lee
*Director of the United States Patent and Trademark Office*